(12) United States Patent
Sakakura et al.

(10) Patent No.: US 8,205,708 B2
(45) Date of Patent: Jun. 26, 2012

(54) HYDRAULIC TRANSAXLE

(75) Inventors: Shinya Sakakura, Amagasaki (JP); Takeshi Okazaki, Amagasaki (JP); Koji Iwaki, Amagasaki (JP)

(73) Assignee: Kanzaki Kokyukoki Mfg. Co., Ltd., Amagasaki-Shi, Hyogo (JP)

( * ) Notice: Subject to any disclaimer, the term of this patent is extended or adjusted under 35 U.S.C. 154(b) by 855 days.

(21) Appl. No.: 12/204,458

(22) Filed: Sep. 4, 2008

(65) Prior Publication Data

US 2009/0049833 A1 Feb. 26, 2009

Related U.S. Application Data

(63) Continuation-in-part of application No. 10/917,557, filed on Aug. 13, 2004, now Pat. No. 7,431,122, which is a continuation of application No. PCT/JP03/16635, filed on Dec. 24, 2003.

(30) Foreign Application Priority Data

Jan. 8, 2003 (JP) .................................... 2003-1935
Jul. 15, 2003 (JP) ................................ 2003-274809
Nov. 26, 2003 (JP) ................................ 2003-394862

(51) Int. Cl.
*B60K 17/10* (2006.01)
(52) U.S. Cl. ........................................ 180/305; 180/307
(58) Field of Classification Search ................ 180/305, 180/307
See application file for complete search history.

(56) References Cited

U.S. PATENT DOCUMENTS

| | | | | |
|---|---|---|---|---|
| 3,159,041 A * | 12/1964 | Firth et al. | ......................... | 74/60 |
| 3,774,505 A * | 11/1973 | McLeod | ........................ | 91/506 |
| 3,830,593 A * | 8/1974 | Chanal | ......................... | 417/203 |
| 5,466,130 A * | 11/1995 | Kobelt | ......................... | 417/269 |
| 6,220,144 B1* | 4/2001 | Manring et al. | .................... | 92/57 |
| 6,915,872 B2* | 7/2005 | Wiley et al. | .................... | 180/170 |
| 6,923,092 B1* | 8/2005 | Wiley et al. | ................ | 74/606 R |
| 6,926,111 B1* | 8/2005 | Irikura | ......................... | 180/234 |
| 6,955,046 B1* | 10/2005 | Holder et al. | ................... | 60/487 |
| 7,082,759 B1* | 8/2006 | Tsukamoto et al. | ............ | 60/456 |
| 7,086,227 B2* | 8/2006 | Yano et al. | ..................... | 60/433 |
| 7,111,545 B1* | 9/2006 | Langenfeld | .................... | 92/12.2 |
| 7,204,779 B2* | 4/2007 | Irikura et al. | ................ | 475/230 |
| 7,357,750 B2* | 4/2008 | Okada | ........................... | 475/248 |
| 7,503,161 B1* | 3/2009 | Mizukawa et al. | ............ | 56/14.7 |
| 7,503,172 B2* | 3/2009 | Sakakura et al. | ............... | 60/427 |
| 7,503,174 B1* | 3/2009 | Reid et al. | ....................... | 60/487 |
| 7,510,035 B1* | 3/2009 | Irikura | ......................... | 180/6.48 |
| 7,533,753 B2* | 5/2009 | Tsukamoto et al. | .......... | 180/242 |
| 7,588,103 B2* | 9/2009 | Iwaki et al. | .................... | 180/6.32 |
| 7,647,770 B2* | 1/2010 | Iwaki et al. | ..................... | 60/487 |
| 7,654,083 B2* | 2/2010 | Iida et al. | ........................ | 60/456 |
| 7,673,712 B2* | 3/2010 | Iida et al. | ........................ | 180/53.1 |
| 7,798,259 B2* | 9/2010 | Iida et al. | ......................... | 180/6.2 |
| 7,841,176 B1* | 11/2010 | Langenfeld et al. | ............ | 60/435 |
| 7,841,429 B2* | 11/2010 | Irikura | ......................... | 180/6.48 |
| 7,849,689 B2* | 12/2010 | Sakakura et al. | ............... | 60/488 |
| 7,866,152 B2* | 1/2011 | Iida | ................................ | 60/487 |

(Continued)

*Primary Examiner* — Jeffrey J Restifo
(74) *Attorney, Agent, or Firm* — Sterne, Kessler, Goldstein & Fox P.L.L.C.

(57) ABSTRACT

A hydraulic transaxle has an axle casing and a pair of hydraulic motors disposed in the axle casing. The hydraulic motors have respective motor shafts and respective moveable swash plates. An axis of tilt of each moveable swash plate is offset with respect to a longitudinal axis of the respective motor shaft, and the moveable swash plates are operatively engaged to a steering operation device.

10 Claims, 50 Drawing Sheets

U.S. PATENT DOCUMENTS

| | | | |
|---|---|---|---|
| 7,900,735 B2 * | 3/2011 | Iwaki et al. | 180/253 |
| 7,908,850 B1 * | 3/2011 | Reid et al. | 60/399 |
| 7,908,960 B2 * | 3/2011 | Daigre | 92/12.2 |
| 7,921,643 B2 * | 4/2011 | Kline et al. | 60/487 |
| 7,921,956 B2 * | 4/2011 | Tsukamoto et al. | 180/242 |
| 7,954,316 B2 * | 6/2011 | Sakata et al. | 60/445 |
| 7,954,907 B1 * | 6/2011 | Wieber et al. | 303/3 |
| 7,971,435 B2 * | 7/2011 | Sumomozawa et al. | 60/464 |
| 7,971,675 B2 * | 7/2011 | Ishii et al. | 180/242 |
| 7,980,339 B2 * | 7/2011 | Ishii et al. | 180/53.4 |
| 7,980,351 B2 * | 7/2011 | Iwaki et al. | 180/305 |
| 7,987,669 B2 * | 8/2011 | Irikura et al. | 60/484 |
| 8,001,883 B1 * | 8/2011 | Langenfeld | 92/12.2 |
| 2009/0301076 A1 * | 12/2009 | Yasuda et al. | 60/491 |
| 2010/0050625 A1 * | 3/2010 | Iida et al. | 60/435 |
| 2010/0147616 A1 * | 6/2010 | Iwaki et al. | 180/252 |
| 2010/0222172 A1 * | 9/2010 | Ishii et al. | 475/83 |

* cited by examiner

Fig. 27
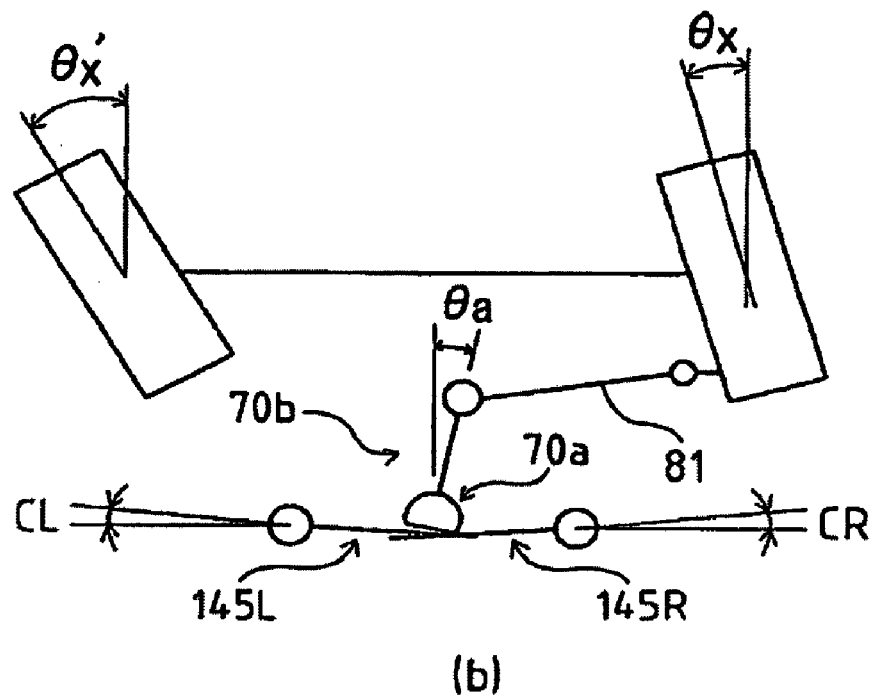
(a)
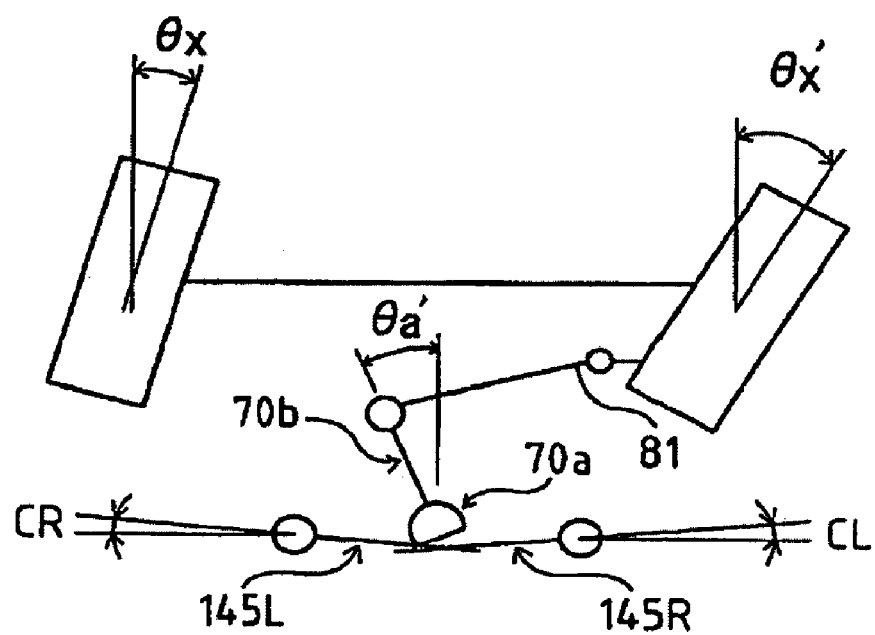
(b)

Fig.28
(a)
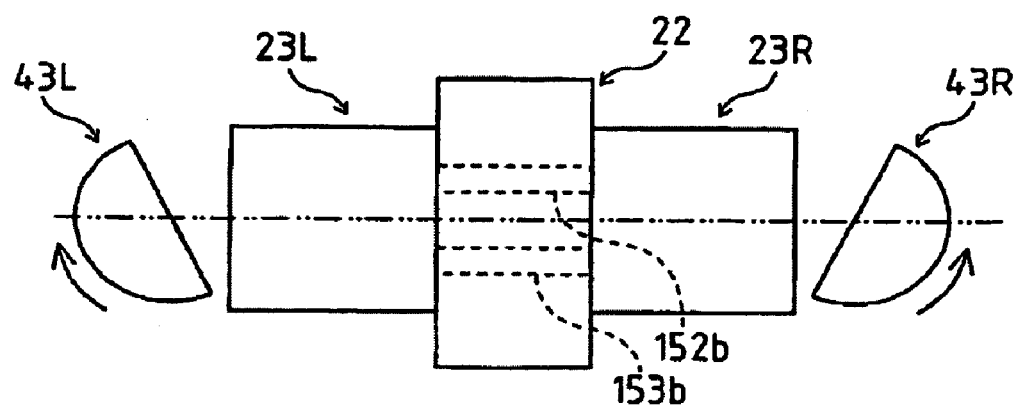
(b)
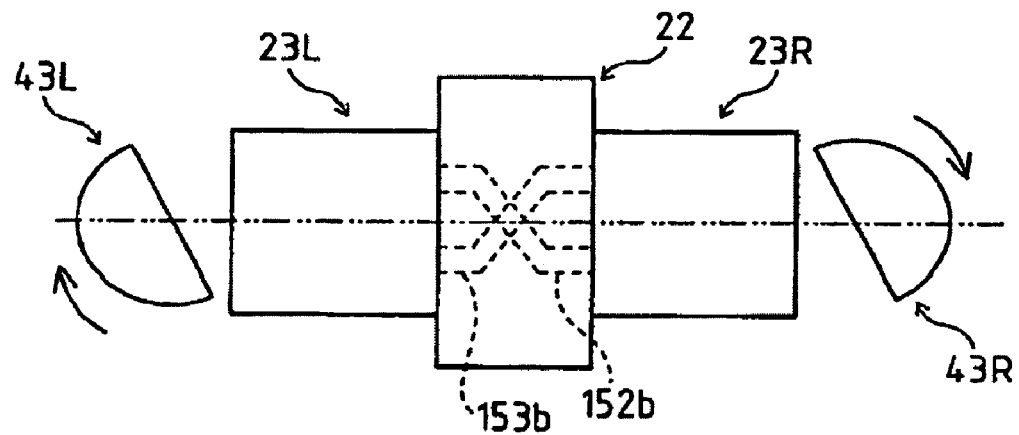

HYDRAULIC TRANSAXLE

CROSS-REFERENCE TO RELATED APPLICATION

This application is a continuation-in-part of U.S. application Ser. No. 10/917,557, filed Aug. 13, 2004, which is a continuation of International Application No. PCT/JP2003/016635, filed Dec. 24, 2003, the entire disclosures of which are hereby incorporated herein by reference thereto.

BACKGROUND OF THE INVENTION

1. Field of the Invention

The present invention relates to a center-pivoted transaxle, which is mounted onto a vehicle frame so as to be turnable around an axis oriented in a fore-and-aft direction of a vehicle, being applicable for various four-wheel-drive/two-wheel-steering (4WD/2WS) industrial vehicles and four-wheel-drive/four-wheel-steering (4WD/4WS) industrial vehicles, such as agricultural tractors, riding lawn mowers and construction vehicles. The transaxle can be provided for driving front wheels of a tractor, for example.

2. Background Art

Conventionally, there are many disclosed characteristic arts concerning various industrial vehicles equipped with a hydraulic transaxle, e.g., agricultural tractors, riding lawn mowers and construction vehicles.

Especially, Japanese Patent Application Publication No. Sho 55-132325 discloses a center-pivoted transaxle, including a pair of hydraulic motors for differentially driving respective left and right axles, typically serving as a transaxle for driving front wheels of a tractor.

In the transaxle disclosed in the document, the left and right hydraulic motors having respective vertical motor shafts are mounted upright on a top of an axle casing, in which a pair of left and right front-wheel driving shafts are supported to be drivingly connected to the respective motor shafts, thereby expanding a ground clearance of the front wheel axles.

However, the height of the left and right hydraulic motors projecting upward from the axle casing directly causes increase of the height of an entire vehicle traveling system including the transaxle. Furthermore, the hydraulic motors, disposed out of the axle casing and oriented perpendicular to the axle casing, are disadvantageous in assembly and compactness.

Also, conventionally, there are many documents disclosing arts of front-wheel acceleration for the above-mentioned working vehicles, wherein rotary speeds of front wheels are increased during turning of a vehicle so as to smoothen the turning of the vehicle.

For example, Japanese Patent Application Publication No. 2001-178208 discloses a vehicle equipped with a front-wheel transmission including a friction clutch, wherein, when front wheels are turned rightward or leftward at an angle equal to or beyond a predetermined value, the friction clutch is engaged so as to accelerate rotation of a drive shaft for front wheels faster than rotation of a drive shaft for rear wheels.

However, in this art, the front wheels are not accelerated before a manipulation degree of a steering manipulator reaches the predetermined value. Namely, the reaction of front-wheel acceleration does not cover the entire manipulation range of the steering manipulator, whereby an operator may feel discomfort. Furthermore, the front-wheel transaxle including the friction clutch complicates a vehicle configuration and increases a vehicle weight. From this viewpoint, the front-wheel transaxle has a room for improvement.

Further, the vehicle is disadvantageous to have a mid-mount mower below a middle portion thereof because the drive shaft narrows a space for attachment and maintenance of the mower. Another disadvantage of the drive shaft is to prevent lowering a footplate of the vehicle.

Further, the transmission system interposed between the drive shaft and the front wheels includes a mechanical differential unit requiring a large space in the axle casing, thereby, reducing a ground clearance.

SUMMARY OF THE INVENTION

A main object of the present invention is to provide a compact center-pivoted transaxle mounted onto a vehicle frame so as to be turnable around an axis oriented in a fore-and-aft direction of a vehicle, wherein the transaxle, including a pair of hydraulic motors for driving respective left and right wheels, has a small vertical length while ensuring a sufficient ground clearance therebelow.

To achieve the main object, a transaxle according to the present invention comprises: an axle casing; a pair of wheel support units supported on respective opposite ends of the axle casing, each of the wheel support units steerably supporting each of right and left travel wheels; a pair of hydraulic motors having respective motor shafts, the pair of hydraulic motors being disposed in the axle casing; and connection means disposed in the axle casing so as to fluidly connect the hydraulic motors to each other and to a hydraulic oil source out of the axle casing. The motor shafts are disposed in a longitudinal direction of the axle casing, journalled by the axle casing, and drivingly connected to the respective travel wheels.

Preferably, the axle casing is suspended from a vehicle frame so as to be turnable around a turning-center axis oriented in a fore-and-aft direction of a vehicle.

Since the hydraulic motors are not disposed out of the axle casing, the above-mentioned transaxle is minimized in vertical width so as to increase its ground clearance and to ensure compactness of a vehicle having it. Further, a vehicle having the transaxle, e.g., a lawn-mower tractor, can be easily equipped with a mid-mount mower and can ensure a space for vertically moving the mower, because it has no drive shaft between front wheels and rear wheels. Further, the hydraulic circuit having the mutually fluidly connected pump and motors can also serve as a torque limiter, which absorbs peak torque occurring when an axle is excessively loaded.

Preferably, in the above transaxle, the axle casing is formed therein with a chamber for containing the pair of hydraulic motors on one lateral side of the turning-center axis oriented in the fore-and-aft direction of the vehicle, thereby being vertically minimized.

The chamber for containing the pair of hydraulic motors serves as an oil sump fluidly-tightly separated from the wheel support units. Therefore, hydraulic oil for driving the hydraulic motors is prevented from flowing into the wheel support units, i.e., from leaking causing the amount thereof to dissipate.

Preferably, the transaxle further comprises a pair of deceleration gear trains for decelerating rotation of the respective motor shafts and for transmitting the decelerated rotation to the respective travel wheels. Further preferably, each of the deceleration gear trains includes a planetary gear assembly.

Further preferably, each of the deceleration gear trains includes a bevel gear assembly, and the motor shafts are vertically offset from center shafts of the respective travel wheels and drivingly connected to the respective center shafts via the respective bevel gear assemblies. In this configuration, further preferably, each of the deceleration gear trains includes a planetary gear assembly disposed in the axle casing.

Therefore, output rotation of the hydraulic motors can be efficiently decelerated, so that hydraulic motors small-sized in displacement can be used, thereby minimizing the transaxle. Further, the deceleration gear trains can be disposed coaxially to the motor shafts so as to ensure the vertically minimized axle casing.

In a first aspect of the above-mentioned transaxle concerning arrangement of the pair of hydraulic motors and concerned elements, the connection means includes a center section. The center section has opposite outer surfaces serving as motor attachment surfaces to which the respective hydraulic motors are attached. The center section is also provided therein with a pair of oil passages for hydraulically connecting the hydraulic motors to each other.

Accordingly, the center section may be a single member shared between the hydraulic motors, thereby reducing the number of parts and the length of the transaxle in a transverse direction of a vehicle. Preferably, the center section is inserted and supported between axle casing parts, thereby minimizing the transaxle in a radial direction thereof centered on the axis thereof oriented in the transverse direction of a vehicle. Alternatively, preferably, the center section is disposed in the housing portion, thereby optimally sealing oil in the hydraulic drive unit.

Preferably, in the first aspect, the axle casing includes at least two casing parts separably joined to each other along a surface substantially perpendicular to the longitudinal direction of the axle casing, and the center section is separably attached to insides of the casing parts adjacent to mutually joined portions of the casing parts. Therefore, the center section can be removed only by removing the axle casings, thereby ensuring maintenance facility.

Alternatively, in the first aspect, the axle casing includes at least two casing parts separated from each other along a surface substantially perpendicular to the longitudinal direction of the axle casing, and the center section is inserted between the casing parts. Therefore, the center section can be easily attached or detached to and from the axle casing, and the axle casing can be minimized in the direction perpendicular to the longitudinal direction of the axle casing. Further, a port for connecting the hydraulic motors to the hydraulic oil source can be formed by the center section so as to not require processing of the axle casing for forming the port, thereby simplifying the axle casing.

In a second aspect of the transaxle concerning arrangement of the hydraulic motors and concerned elements, the connection means includes a pair of center sections formed with respective motor attachment surfaces to which the respective hydraulic motors are attached. Each of the center section is formed therein with a pair of oil passages: one for hydraulically connecting the corresponding hydraulic motor to the other hydraulic motor; and the other for hydraulically connecting the corresponding hydraulic motor to the hydraulic oil source.

Therefore, each of the center section provided for the respective left and right hydraulic motors can be compact, and can have a simple oil passage so as to be simplified in processing thereof.

In the second aspect, the axle casing includes at least two casing parts separably joined to each other along a surface substantially perpendicular to the longitudinal direction of the axle casing, and each of the center sections is disposed in each of the casing parts. Therefore, pair of the hydraulic motors can be easily assembled in the axle casing only by mutually joining the casing parts each of which contains the corresponding hydraulic motor and center section. Further, each of the casing parts can be separated from the other for easy maintenance of the corresponding hydraulic motor and center section.

In the second aspect, the motor attachment surfaces of the center sections face each other. The hydraulic motors attached on the respective motor attachment surfaces are provided with respective swash plates opposite to the respective corresponding center sections. The swash plates are tilted symmetrically with respect to a surface disposed therebetween perpendicular to the longitudinal direction of the axle casing.

Preferably, the hydraulic motors are variable in displacement, and the swash plates are movably supported by the axle casing. A support block is disposed between the swash plates, and adjusting means is provided on the support block so as to adjust tilt angles of the swash plates in correspondence to steered angles of the travel wheels.

Therefore, the pair of swash plates can be collected and supported between the hydraulic motors. In the case that the swash plates are movable, the support block may be a single member for supporting the movable swash plates so as to easily make an interlocking connection between the movable swash plates.

A second object of the present invention is to provide a hydraulic transaxle having a pair of hydraulic motors, installed into an axle casing joined to left and right wheel support units supporting respective travel wheels, as mentioned above, wherein the transaxle uses a mechanism for changing speeds of travel wheels (especially, accelerating front wheels), i.e., changing outputs of the hydraulic motors, during turning of a vehicle having the transaxle, thereby ensuring smooth turning of the vehicle, such as to prevent dragging of the travel wheels (if a vehicle having the transaxle is a lawn mower, for preventing turf from being damaged by the dragging of travel wheels).

In a first aspect of the present invention to achieve the second object, the pair of hydraulic motors have variable displacements adjusted according to the steered angles of the travel wheels.

Therefore, the left and right travel wheels supported by the transaxle are speed-changed (shifted) according to change of the steered angles thereof. For, example, a vehicle may use the present transaxle for driving front wheels, which are accelerated so as to smoothen turning of the vehicle.

In a second aspect of the invention to achieve the second object, the pair of hydraulic motors are variable in displacement, and the transaxle is provided with flow control means for limiting flow rate of hydraulic oil supplied from the hydraulic oil source to the hydraulic motors.

In this way, to ensure smooth turning of a vehicle, the flow control means controls flow of hydraulic fluid to the hydraulic motors so as to control output rotation of the hydraulic motors, in addition to the displacement control of the hydraulic motors with their movable swash plates. Therefore, the hydraulic motors can be minimized in displacement, and gear trains for transmitting outputs of the hydraulic motors can be compacted.

In a third aspect of the invention to achieve the second object, the hydraulic motors are fixed in displacement, and flow rate of hydraulic oil supplied from the hydraulic oil source to the hydraulic motors is adjusted in correspondence to steered angles of the travel wheels.

Therefore, the simple fixed displacement hydraulic motors, with no complicated mechanism for controlling movable swash plates, are convenient for simplifying the transaxle while ensuring smooth turning of a vehicle having the transaxle.

In a transaxle having a pair of hydraulic motors for differential driving of respective travel wheels, each of the above-mentioned mechanisms for controlling displacements of the hydraulic motors or flow rates to the hydraulic motors in association with steering operation serves as a mechanism for speed-changing of the travel wheels (e.g., acceleration of front wheels) during turning of a vehicle. Thus, no special space for arranging a conventional drive shaft for driving the travel wheels is required, thereby facilitating assembly of the transaxle, simplification of a vehicle, and lightening of a vehicle.

A third object of the present invention is to provide a hydraulic transaxle having a pair of hydraulic motors for differentially driving respective left and right axles that is improved in ease of assembly.

To achieve the object, in the transaxle according to the present invention, an axle casing supporting the pair of axles has an opening at front or rear side thereof, and an assembly including a pair of hydraulic motors for driving the respective axles is attached to the axle casing so as to install the pair of hydraulic motors into the axle casing through the opening.

Therefore, the pair of hydraulic motors are integrated with the assembly so as to be easily installed in the axle casing.

Preferably, the assembly includes a cover supporting the pair of hydraulic motors, and the cover covers the opening of the axle casing by attaching the assembly to the axle casing.

Therefore, the opening is closed simultaneously with attaching the assembly to the axle casing, thereby reducing the number of processes for assembling and facilitating assembly.

Preferably, the front or rear side of the axle casing provided with the opening is proximal in a fore-and-aft direction of the vehicle. The hydraulic motors are hydraulically connected to each other via a pair of oil passages in the axle casing. Each of the oil passages can be hydraulically connected through the cover to a hydraulic oil source disposed out of the axle casing.

Such utilization of the cover simplifies a configuration for hydraulically connecting the hydraulic motors to the hydraulic oil source.

Preferably, the assembly includes a center section, to which the hydraulic motors are attached so as to be disposed substantially symmetrically with respect to the center section.

Therefore, axial load caused by reciprocation of pistons in a cylinder block of one of the hydraulic motors cancels that of the other hydraulic motor, thereby appropriately balancing the hydraulic motors in load.

Preferably, the assembly includes a support portion for supporting the swash plates, and wherein the support portion has a portion fitted to the axle casing.

Therefore, the assembly can be further easily positioned relative to the axle casing, thereby facilitating assembly and preventing axial deviation of motor shafts.

A fourth object of the present invention is to provide a hydraulic transaxle having a pair of variable displacement hydraulic motors for differentially driving respective left and right axles, ensuring compactness of a control system for controlling movable swash plates of the hydraulic motors during steering operation.

To achieve the object, a hydraulic transaxle according to the present invention comprises: a pair of left and right axles; a pair of variable displacement hydraulic motors for driving the respective axles, hydraulically connected in parallel to a common hydraulic oil source; and a pair of travel wheels steerably attached to the respective axles. Displacements of the hydraulic motors are changed according to a steered angle of at least one of the travel wheels.

Detection of the steered angle of one of the travel wheels for changing displacements of the hydraulic motors during steering operation does not use a linkage mechanism between a steering operation device and movable swash plates of the hydraulic motors. Further, a mechanism for the detection can be integrally assembled in the transaxle.

Preferably, the transaxle further comprises: a pair of displacement control members for changing displacements of the respective hydraulic motors; and a pair of biasing means for biasing the respective displacement control members to predetermined positions. The displacement control members are interlockingly connected to a movable portion of a operation system between a steering operation device and the travel wheels, so that the displacement control members are shifted against the biasing force of the biasing means as the steered angle of the at least one of the travel wheels is increased.

Therefore, if a vehicle has the transaxle for driving front wheels, the front wheels are accelerated according to the steered angles of the axles so as to smoothen turning of the vehicle.

Further preferably, each of the biasing means has a fixed portion, and the transaxle further comprises a mechanism for adjusting a position of the fixed portion of each of the biasing means so as to adjust the predetermined position of each of the displacement control members.

Therefore, the mechanism can cancel a wrong speed difference between motor shafts of the left and right hydraulic motors. If a vehicle having the transaxle is configured to travel by four-wheel drive, the mechanism can harmonize rotary speeds of the axles of the transaxle with rotary speed of an axle of another transaxle.

Preferably, the hydraulic transaxle further comprises: a pair of control arms for changing positions of the respective displacement control members; a common link arm turned according to the steered angle of the at least one of the travel wheels; and a cam mechanism for operatively connecting the common link arm to the control arms. The cam mechanism reduces the rotation degree of the link arm according to the steered angle of the at least one of the travel wheels, and transmits the reduced rotation of the link arm to the control arms. This configuration is advantageous when motion of a linkage is large relative to operation degree of the control arm.

The cam mechanism has a cam ratio set so as to equalize the rotation degrees of the control arms when the travel wheels are steered rightward to those when the travel wheels are steered leftward. Therefore, the cam mechanism may have a single camshaft interlocking with one of the travel wheels so as to equalize the acceleration whether a vehicle turns left or right.

A hydraulic transaxle comprises: a pair of left and right axles; a pair of hydraulic motors for the respective axles; a pair of steerable travel wheels; and a tie rod for interlockingly connecting the steerable travel wheels to each other. The tie rod is disposed on a proximal side of the transaxle in a fore-and-aft direction of a vehicle.

Therefore, the tie rod and hydraulic piping are distributed in front and rear of the axle casing, so as to be efficiently disposed in a limited space. Even if the transaxle is interfered with by an obstacle in front of the transaxle, the obstacle does not damage the tie rod behind the transaxle. In this way, a vehicle having the transaxle can be designed appropriately in protection so as to ensure the interlocking connection of the left and right travel wheels.

Preferably, in this configuration, a power steering actuator is disposed on the proximal side of the transaxle in the fore-and-aft direction of the vehicle.

Therefore, the power steering actuator (such as a hydraulic cylinder) can be integrally assembled with the transaxle, thereby reducing the number of processes required for mounting the transaxle onto a vehicle and facilitating its handling.

A fifth object of the present invention is to provide a transaxle having a pair of variable displacement hydraulic motors for differentially driving respective left and right axles, further improved in compactness and reduction of the number of parts.

To achieve the object, a transaxle comprises: a pair of left and right axles; an axle casing supporting the axles; and a hydraulic drive unit disposed in the axle casing. The hydraulic drive unit includes a pair of hydraulic motors for driving the respective axles, and a common movable swash plate disposed between the hydraulic motors. The hydraulic drive unit is configured so as to hydraulically connect the pair of hydraulic motors in parallel to a common hydraulic oil source. The movable swash plate is slantingly moved so as to simultaneously increase a displacement of one of the hydraulic motors and decrease a displacement of the other hydraulic motor.

Therefore, the common movable swash plate may be a single member for simultaneously controlling the pair of hydraulic motors so as to simplify a system for controlling tilt angles of the movable swash plate, thereby simplifying and compacting the hydraulic drive unit, and reducing the number of parts.

Preferably, the hydraulic drive unit further includes: a pair of center sections, each of which has a supply/discharge port of each of the hydraulic motors; and a motor housing formed with a passage for connecting the supply/discharge ports of the hydraulic motors to each other. The hydraulic drive unit is assembled in the motor chamber so as to be unified with the motor control housing.

Therefore, the transaxle is improved in assembly, and such unification of the transaxle improves wide-applicability thereof. The motor housing formed with the passage does not use external piping, thereby improving the transaxle in durability and in clear appearance.

Preferably, the movable swash plate is slantingly moved according to steering the travel wheels steerably supported on the respective axles.

Therefore, a tilt angle of the movable swash plate can be changed simultaneously with change of steered angle of the travel wheels, so as to change rotary speeds of front wheels during turning of the vehicle, thereby smoothening turning of the vehicle.

Further preferably, the tilt position of the swash plate is the same whether the same steering angle is decided during right or left turning of a vehicle.

Therefore, whether the same steering angle is decided during right or left turning of a vehicle, the same tilt position of the swash plate equalizes output of each of the hydraulic motors. In other words, the speed-change rate of the axles according to change of right steering angle is equaled to that according to change of left steering angle, so as not to discomfort an operator.

Preferably, the hydraulic transaxle further comprises: a power steering telescopically movable actuator for steering the travel wheels; and a linkage interposed between the actuator and the movable swash plate. If a stroke of the actuator becomes different whether it is extended or contracted, the linkage is set to change its link ratio such as to correspond to the difference of the stroke whether the actuator is extended or contracted.

Therefore, even if a vehicle has left and right steerable travel wheels which become different in their steered angles during turning of the vehicle, and the power steering telescopically movable actuator has different extension stroke and contraction stroke, speed-change rate of the axles are equalized whether the vehicle turns left or right.

Preferably, the axle casing includes a plurality of casing parts separably joined to one another along surfaces substantially perpendicular to a longitudinal direction of the axle casing, and wherein the number of the casing parts can be changed so as to change a tread of a vehicle having the transaxle.

Therefore, vehicles having various treads matching with user's needs can be provided, so that the hydraulic drive unit is improved in wide-applicability.

These, further and other objects, features and advantages will appear more fully from the following description with reference to accompanying drawings.

BRIEF DESCRIPTION OF THE DRAWINGS

FIG. 27(a) is a diagram of turn angle of the camshaft arm when a steering wheel is turned leftward.

FIG. 27(b) is a diagram of turn angle of the camshaft arm when the steering wheel is turned rightward.

FIG. 28(a) is a diagram of tilting of movable swash plates in the configuration of FIG. 16.

FIG. 28(b) is a diagram of tilting of movable swash plates in the configuration of FIG. 26.

DETAILED DESCRIPTION OF THE INVENTION

First, a configuration of a working vehicle according to the present invention will be described.

Figure 1:
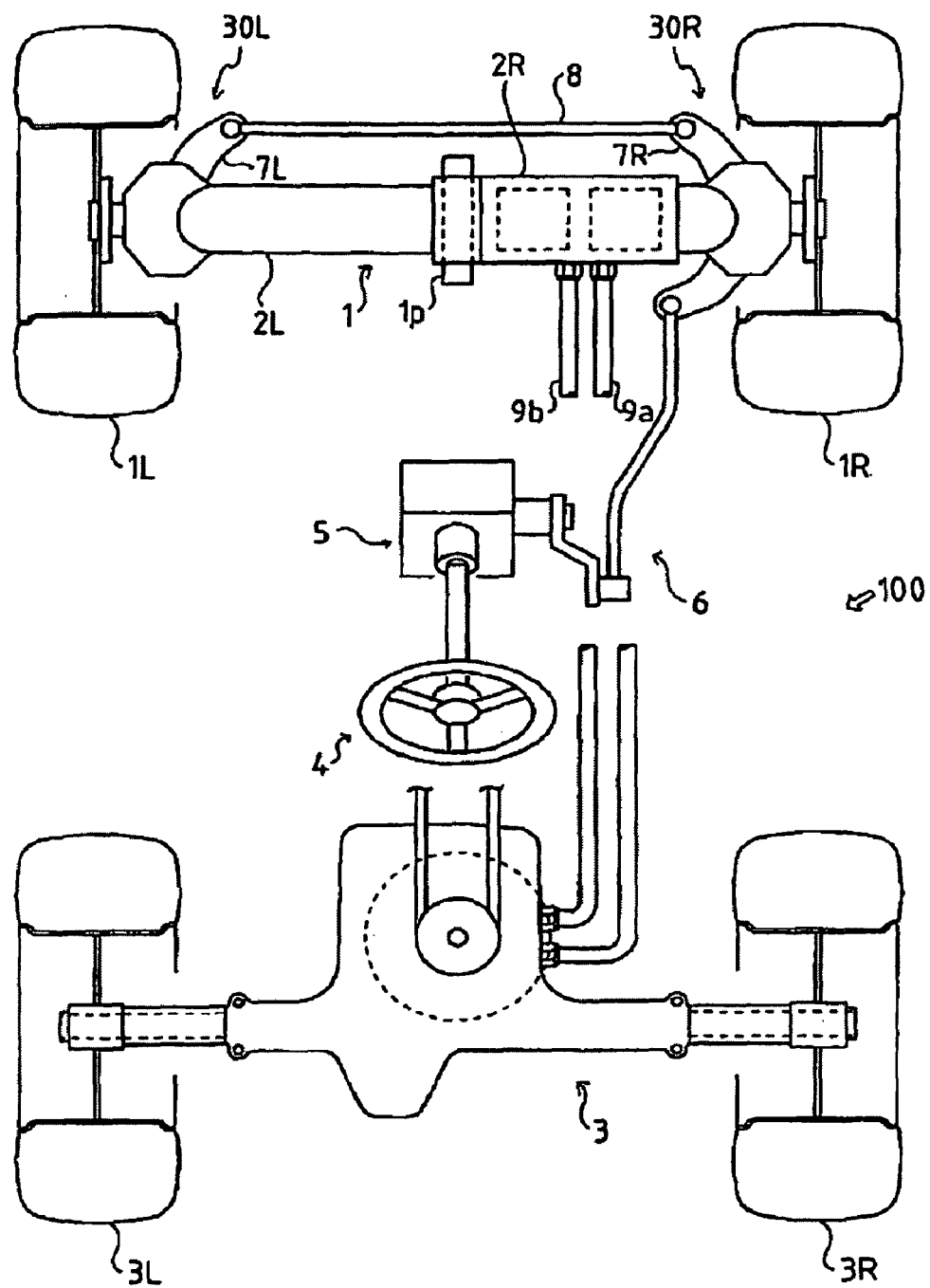
FIG. 1 is a plan view of a vehicle equipped with a hydraulic transaxle according to the present invention.

FIG. 1 is a schematic view of a structure of a traveling drive system of a working vehicle 100 such as a tractor. It is assumed that the vehicle faces forward in its traveling direction. The vehicle is provided with a front transaxle 1 in its front portion to drivingly and steerably support front wheels 1L and 1R as running wheels and a rear transaxle 3 in its rear portion to drivingly and unsteerably support rear wheels 3L and 3R as running wheels. In rear transaxle 3, a hydraulic pump is driven by power inputted from an engine (not shown) and discharges hydraulic oil to drive a hydraulic motor, thereby driving rear wheels 3L and 3R. Meanwhile, the hydraulic pump in rear transaxle 3 is hydraulically connected to hydraulic motors disposed in the front transaxle 1 via hydraulic hoses 9a and 9b so as to drive the hydraulic motors by hydraulic oil, thereby driving front wheels 1L and 1R. Thus, a hydraulic four-wheel-drive vehicle is configured in such a way that the hydraulic pump disposed in rear transaxle 3 drives the hydraulic motors disposed in front and rear transaxles 1 and 3.

Furthermore, control force of a steering system 4 disposed at the substantially longitudinally middle portion of the vehicle is transmitted via a steering gear box 5 and a link 6 to a steering arm 7R attached to a wheel support unit 30R which supports right front wheel 1R, and is further transmitted via a tie rod 8 to a steering arm 7L attached to a wheel support unit 30L which supports left front wheel 1L. Tie rod 8 equalizes the steered angle positions of left and right wheels 1L and 1R.

Next, configurations of front transaxle 1 will be described in detail.

Hereafter, it should be noted that front transaxle 1 may be alternatively placed in the rear side of the vehicle, depending upon the configuration of the vehicle, which means that the transaxle 1 is not only intended to be placed in the front side of the vehicle but also can be configured to support the rear wheels. Therefore, descriptions hereafter will be given of a transaxle 1 adaptable on the rear wheels side as well as on the front wheels side.

Embodiment 1

First, a description will be given of transaxle 1 according to Embodiment 1.

Figure 2:
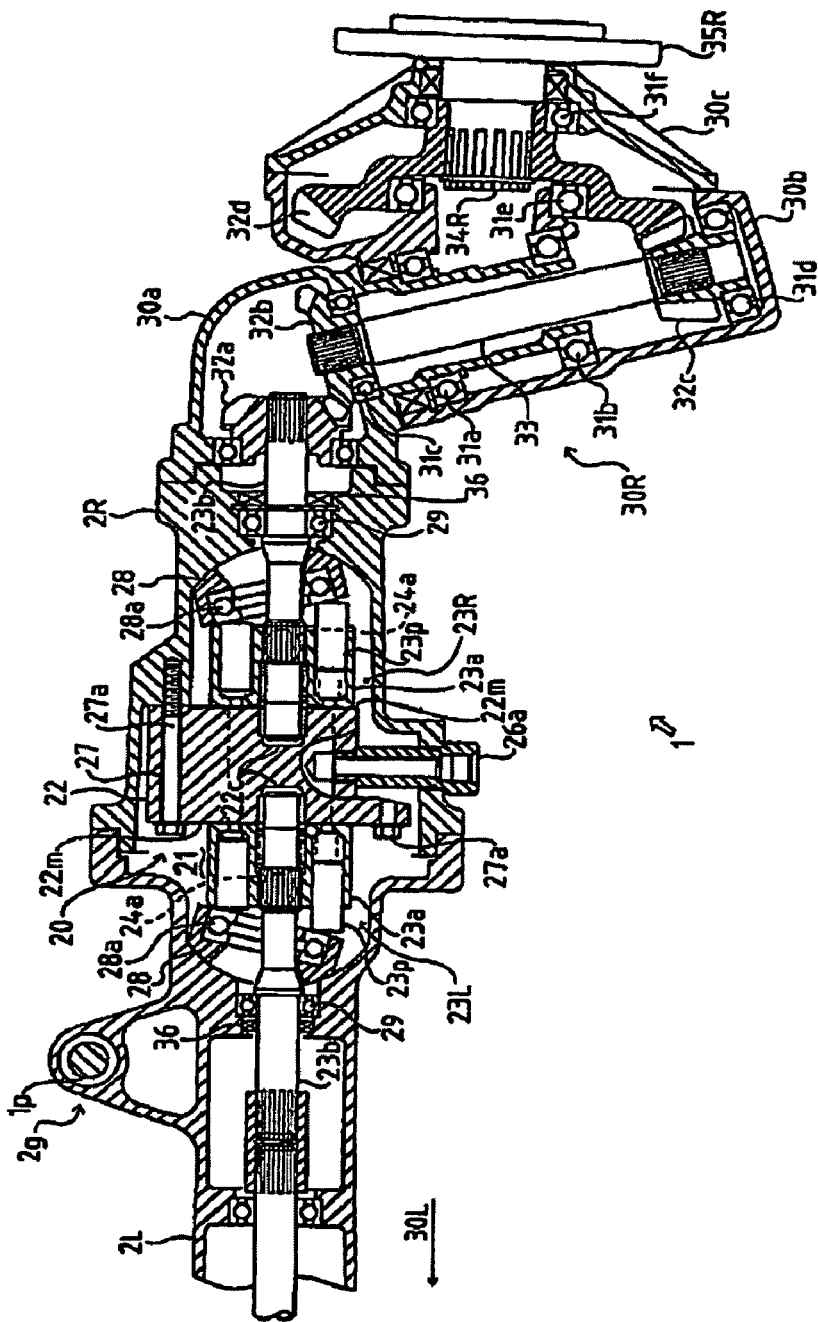
FIG. 2 is a fragmentary sectional front view of the transaxle.

As shown in FIG. 2, transaxle 1 consists of a hydraulic drive unit 20 and a pair of left and right wheel support units 30L and 30R drivingly and steerably supporting respective left and right front wheels 1L and 1R. Hydraulic drive unit 20 is comprised of a left axle casing 2L, a right axle casing 2R, a housing 21, a center section 22, a pair of left and right variable displacement hydraulic motors 23L and 23R, and a linkage system 24. Left axle casing 2L serves as a first axle casing part which is provided with a suspended portion 2g suspended by a center pin 1p fixed at the laterally substantially middle portion of the vehicle frame. Right axle casing 2R serves as a second axle casing part whose left end surface is joined to a flange portion formed on the right end surface of left axle casing 2L. Housing 21 is formed at a joint portion between left and right axle casings 2L and 2R. Center section 22 is disposed inside of housing 21. Center section 22 is formed on the left and right sides thereof with vertical motor attachment surfaces. Each of hydraulic motors 23L and 23R has a cylinder block 23 and a motor shaft 23b which is non-relatively rotatably connected to cylinder block 23a. Each of cylinder blocks 23a and 23a is rotatably slidably attached to each of the motor attachment surfaces. Motor shafts 23b and 23b output driving forces to drive respective left and right front wheels 1L and 1R. Linkage system 24 interlockingly connects movable swash plates 28 and 28 of left and right variable displacement hydraulic motors 23L and 23R to each other so as to tilt swash plates 28 and 28 at the same tilt angle. Wheel support units 30L and 30R are attached to the right end surface of right axle casing 2R and the left end surface of left axle casing 2L, respectively, wherein transaxle 1 is suspended pivotally around the longitudinal axis of the vehicle frame via center pin 1p.

Since the pair of wheel support units 30L and 30R are distributed left and right, description will be given referring to representative right wheel unit 30R hereafter.

As shown in FIG. 2, a housing 21 is formed at a joint portion between left and right axle casings 2L and 2R, and left axle casing 2L has an upwardly jutting suspended portion 2g to be pivotally suspended via a center pin 1p. Housing 21 and suspended portion 2g are laterally offset from each other. In other words, transaxle 1 has a chamber for containing a pair of hydraulic motors 23L and 23R, disposed on lateral one side of center pin 1p that serves as a fore-and-aft directed rotational axis of transaxle 1.

Therefore, expansion in vertical width of left and right axle casings 2L and 2R caused by overlapping of lateral positions of housing 21 and suspended portion 2g is avoided, whereby the vertical widths of left and right axle casings 2L and 2R can be minimized.

In the present embodiment, suspended portion 2g is formed on left axle casing 2R. Alternatively, suspended portion 2g may be formed on right axle casing 2R, and housing 21 may be disposed on the left side of center pin 1p in the vehicle body.

Furthermore, axle casings 2L and 2R are fitted to each other in a spigot and recess form, whereby axle casings 2L and 2R are settled in their relative positions so as to enable centering of motor shafts 23b and 23b.

Furthermore, transaxle 1 is configured in such a way that the chamber (housing 21) containing hydraulic motors 23L and 23R is fluidly isolated from wheel support units 30L and 30R by sealing members 36 and 36, so as to prevent hydraulic oil to be filled in housing 21 for driving hydraulic motors 23L and 23R from flowing into wheel support units 30L and 30R, thereby preventing defects, such as malfunction of hydraulic motors 23L and 23R, due to leakage of hydraulic oil.

Figure 4:
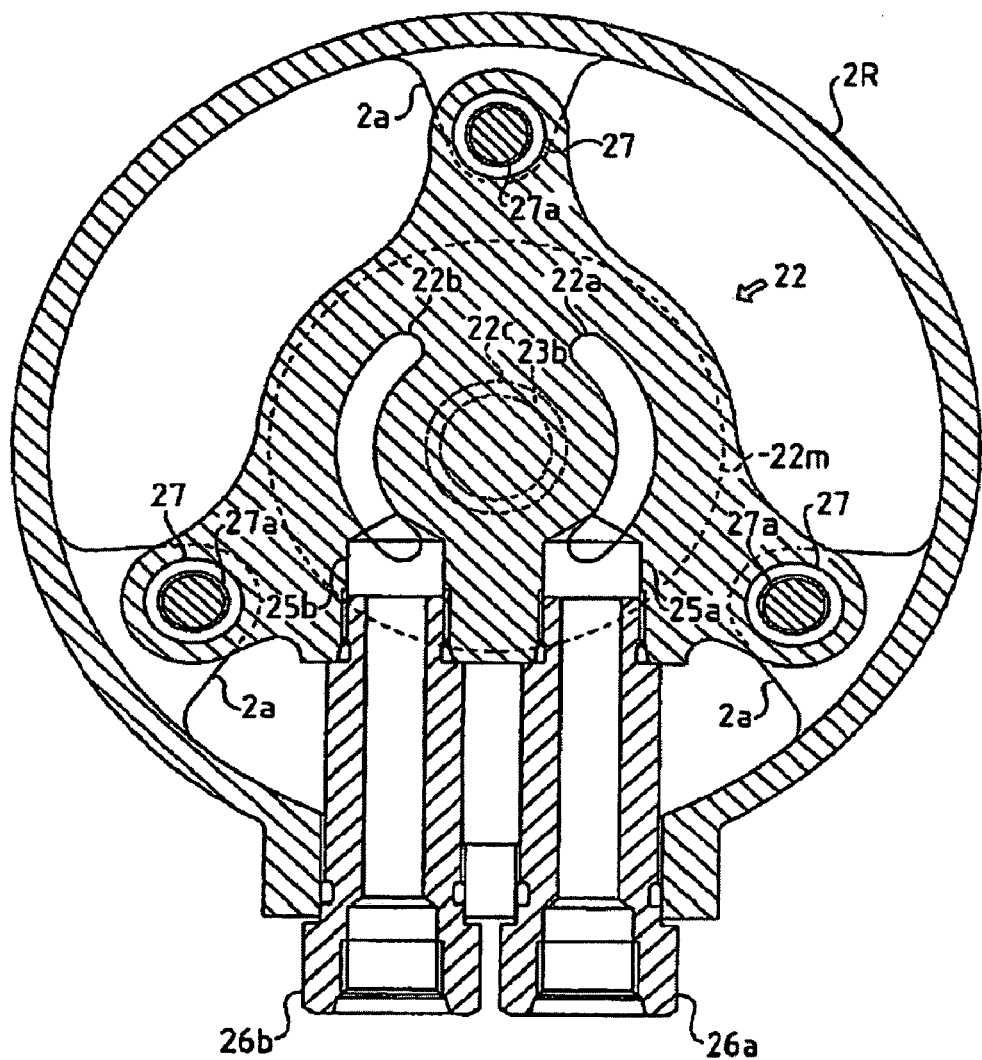
FIG. 4 is a sectional side view of the transaxle showing a center section thereof and its surroundings.

As shown in FIG. 4, center section 22 is formed with left and right motor attachment surfaces 22m and 22m having centers bored by respective shaft bores 22c and 22c, into which one end of each of motor shafts 23b and 23b of hydraulic motors 23L and 23R is inserted and supported. A pair of kidney ports 22a and 22b are formed and extended laterally through center section 22. Kidney-shaped ports 22a and 22b are disposed on the left and right sides of shaft bores 22c and 22c, respectively, in a sectional view. Kidney ports 22a and 22b are open on motor attachment surfaces 22m and 22m so as to face multiple cylinder bores of cylinder blocks 23a and 23a, thereby supplying and discharging hydraulic oil to and from the cylinder bores.

Oil passages 25a and 25b are bored perpendicularly from laterally intermediate portions of respective kidney ports 22a and 22b, oil passages 25a and 25b to the outside. Connecting plugs 26a and 26b are fitted into respective oil passages 25a and 25b so as to be open to the outside of right axle casing 2R.

As shown in FIG. 4, center section 22 is laterally penetrated by bolt holes 27, 27 and 27 at plural points thereof in a sectional side view, through which bolts 27a, 27a and 27a are passed to fasten center section 22 to inwardly jutting portions 2a, 2a and 2a formed on the inside surface of right axle casing 2R.

As shown in FIG. 2, front axle casings 2L and 2R are provided with respective bearings 29 and 29 in boundary portions thereof against housing 21. Motor shafts 23b and 23b are journalled by respective bearings 29, and inserted at one end of each thereof into respective shaft bores 22c and 22c bored at the center of center section 22. Cylinder blocks 23a and 23a, non-relatively rotatably fitting respective motor shafts 23a and 23b, are rotatably and slidably attached to motor attachment surfaces 22m and 22m, thereby providing the pair of left and right hydraulic motors 23L and 23R.

Pistons 23p, 23p, . . . are reciprocatingly fitted in the multiple cylinder bores formed in cylinder blocks 23a and 23a. Thrust bearings 28a and 28a of respective movable swash plates 28 and 28 are contacted by heads of pistons 23p, 23p, . . . .

In this way, center section 22 within housing 21 is formed with motor attachment surfaces 22m and 22m on the left and right vertical surfaces thereof, and supports horizontal motor shafts 23b and 23b serving as output shafts. As a result, hydraulic motors 23L and 23R are laid horizontally inside of left and right axle casings 2L and 2R. This arrangement of hydraulic motors, which are not disposed out of the axle casings, has the advantage of minimizing transaxle 1 and increasing the ground clearance.

Furthermore, control arms (not shown) are fitted onto side faces of respective cradle-type movable swash plates 28 and 28, as usual. Tilt angles of movable swash plates 28 and 28 are controlled by rotating control shafts 24a and 24a serving as rotary shafts of the control arms. Alternatively, movable swash plates 28 and 28 can be of the trunnion type.

Figure 3:
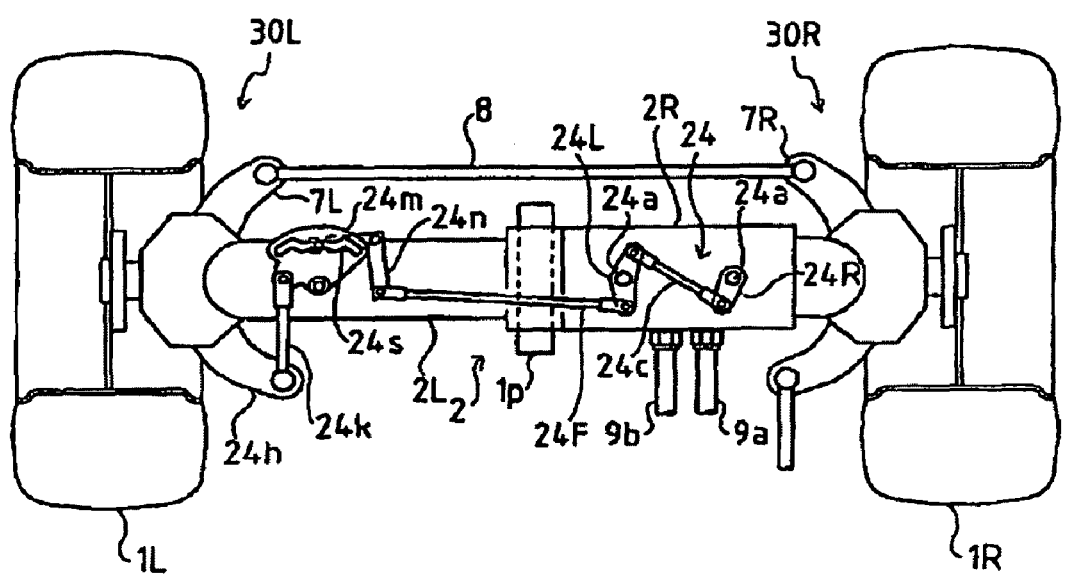
FIG. 3 is a plan view of the transaxle showing an interlocking mechanism thereon.

As shown in FIG. 3, control arms 24L and 24R are fixed onto outer ends of control shafts 24a and 24a outside of the axle casings, respectively. One end of control arm 24L of left hydraulic motor 23L is interlockingly connected to one end of control arm 24R of right hydraulic motor 23R, so that left and right hydraulic motors 23L and 23R are accelerated and decelerated at the same rate, as the tilt angles of left and right movable swash plates 28 and 28 are synchronously increased and decreased within one-sided ranges thereof.

Furthermore, control arm 24L is coupled at opposite ends thereof to a steering connection link 24F and a connection link 24c. Thus, control arm 24R is interlocked with steering connection link 24F via control arm 24L and connection link 24c.

Steering connection link 24F is moved by operation of steering operation device 4 (or steered angles of the front wheels), so that the movement degree of steering connection link 24F is increased as the operational degree of steering apparatus 4 is increased so as to accelerate left and right hydraulic motors 23L and 23R.

Furthermore, left and right hydraulic motors 23L and 23R are accelerated at the same rate by the effect of connection link 24c, so that peripheral speeds of front wheels 1L and 1R are substantially equalized to those of rear wheels 3L and 3R when the vehicle travels straight, whereas the peripheral speeds of front wheels 1L and 1R are increased higher than those of rear wheels 3L and 3R according to the steering operational angle of steering operation device 4, thereby improving turning performance of the vehicle.

As described above, control shafts 24a and 24a, control arms 24L and 24R, connection link 24c and steering connection link 24F constitute a linkage system 24 for synchronously controlling left and right hydraulic motors 23L and 23R.

Incidentally, the only requirement to steering connection link 24F is to respond to information input of the steered angle of front wheels 1L and 1R, which may be inputted from any portion, such as steering operation device 4, tie rod 8, and housings of wheel support units 30L and 30R, illustrated in FIG. 1.

For example, as shown in FIG. 3, steering link 24F is interlockingly connected to a steering interlocking arm 24h attached on left wheel support unit 30L via a link 24k, a pivoted sector link 24m formed with a cam 24s, and a turnable L-shaped link 24n.

Furthermore, as shown in FIG. 2, right wheel support unit 30R comprises a doglegged gear casing 30a, a steerable casing 30b, and an axle casing 30c. These casings outline right wheel support unit 30R. Gear casing 30a is joined to the right end portion of right axle casing 2R. Steerable casing 30b is pivotally supported on bearings 31a and 31b which are fixedly fitted onto the outside surface of a lower portion of gear casing 30a. Axle casing 30c is joined to a vertical joint surface of steerable casing 30b.

In the bent corner portion of gear casing 30a, a bevel gear 32a fixed onto an end of motor shaft 23b is engaged with a bevel gear 32b fixed onto an upper end of a transmission shaft 33 disposed along the top-to-bottom direction of gear casing 30a, thereby transmitting driving force to transmission shaft 33 from motor shaft 23b. Transmission shaft 33 is rotatably supported by a bearing 31c attached at the bent corner portion of gear casing 30a and bearing 31d attached at the bottom portion of steerable casing 30b.

Furthermore, in the lower portion of steering case 30b, a bevel gear 32c fixed onto the lowermost end of transmission shaft 33 is engaged with a bevel gear 32d fixed onto a front wheel axle 34R, thereby transmitting the driving force to front wheel axle 34R from transmission shaft 33. A portion of bevel gear 32d projecting from the end surface of front wheel axle 34R is supported on the periphery of a bearing 31e fitted onto an expanded side part of steering case 30b. A wheel-hub disk 35R is fixedly attached to front wheel axle 34R outside of axle case 30c.

In wheel support unit 30R structured as described above, the driving force of motor shaft 23b generated by rotation of hydraulic motor 23R is transmitted to front wheel axle 34R from transmission shaft 33. Then, front wheel 1R, which is attached onto wheel-hub disk 35R fixed to front wheel axle 34R, is driven by front wheel axle 34R and steered by turning of steerable casing 30b.

It should be noted that the structure of right wheel support unit 30R described above is also applicable to left wheel support unit 30L.

Figure 5:
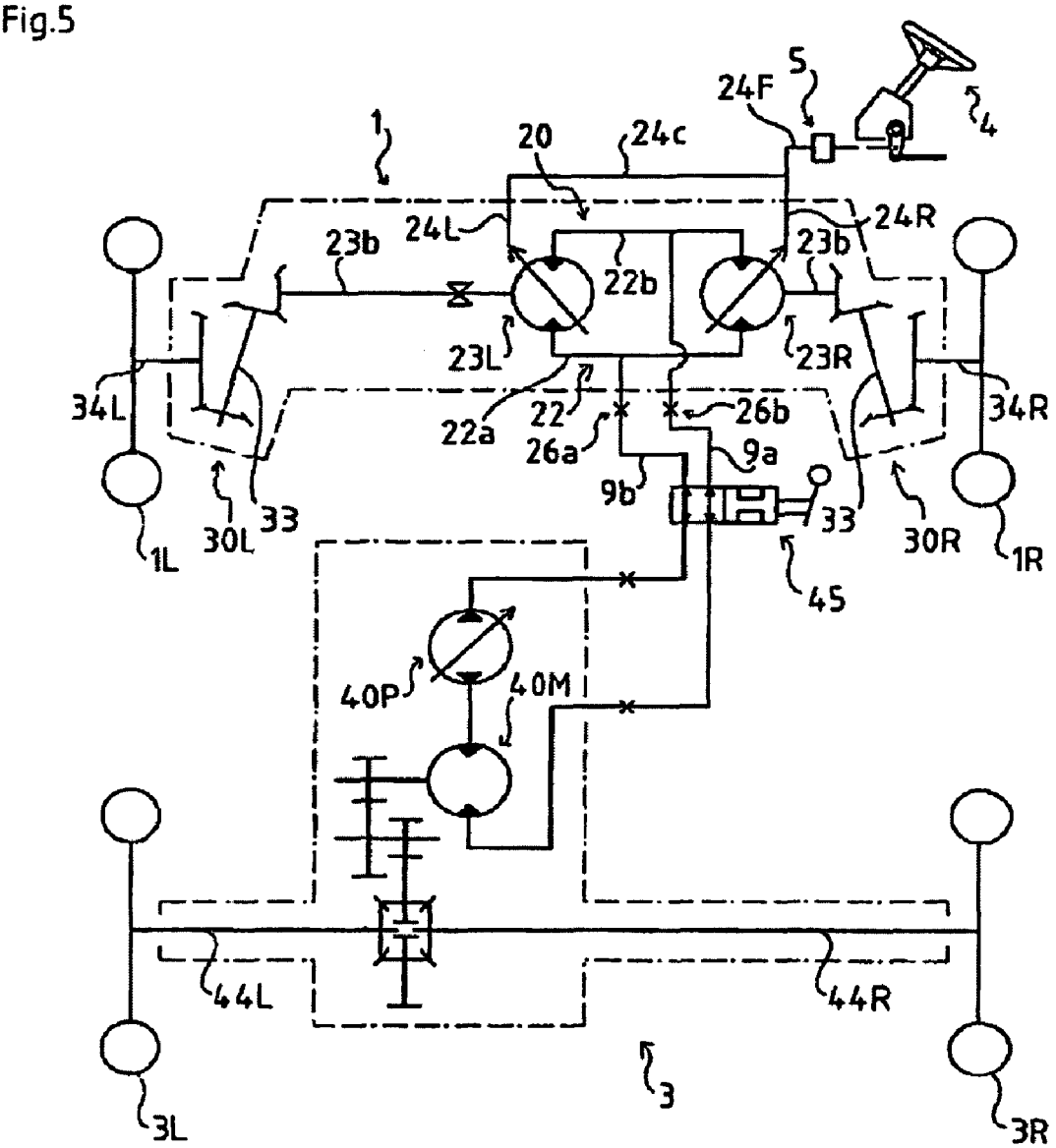
FIG. 5 is a hydraulic circuit diagram of a drive system of a vehicle having the transaxle.

FIG. 5 shows a hydraulic circuit diagram of the drive system of the vehicle equipped with transaxle 1 described above.

In the arrangement shown in FIG. 5, a rear transaxle 3 is equipped with a hydraulic pump 40P and a hydraulic motor 40M. Driving force from hydraulic motor 40M drives rear axles 44L and 44R, thereby driving rear wheels 3L and 3R. Hydraulic pump 40P is also hydraulically connected to hydraulic motors 23L and 23R via a control valve 45 and kidney port 22a in center section 22. Similarly, hydraulic motor 40M is hydraulically connected to hydraulic motors 23L and 23R via control valve 45 and kidney port 22b in center section 22. By operation of control valve 45, the operation mode of the drive system is switched between a four-wheel drive mode, in which all hydraulic motors 23L, 23R and 40M are driven, and a two(rear)-wheel drive mode, in which only hydraulic motor 40M is driven while hydraulic motors 23L and 23R run idle.

Hydraulic motors 23L and 23R are connected in parallel via kidney ports 22a and 22b, so that, during forward travel of the vehicle, for example, hydraulic oil supplied through connecting plug 26a is distributed between hydraulic motors 23L and 23R through kidney port 22a, and hydraulic oil discharged from hydraulic motors 23L and 23R is discharged from connection plug 26b through kidney port 22b.

Driving forces from hydraulic motors 23L and 23R are transmitted to front wheel axles 23L and 34R through motor shafts 23b and 23b and transmission shafts 33 and 33 so as to drive front wheels 1L and 1R, respectively.

In the above-described hydraulic circuit, changes in load of front wheels 1L and 1R against hydraulic motors 23L and 23R change the distributed flows into hydraulic motors 23L and 23R, thereby generating differential action of left and right front wheels 1L and 1R.

Furthermore, steering connection link 24F is arranged so as to respond to the information input of the operation degree of steering operation device 4 (a steering angle from the angle for straight travel). The movement of steering connection link 24F, cooperating with connection link 24c, makes control arms 24L and 24R tilt their swash plates by the same angle to the speed-increasing direction. In this way, the front wheels are accelerated during turning of the vehicle.

Embodiment 2

Description will now be given of transaxle 1 according to Embodiment 2.

Figure 6:
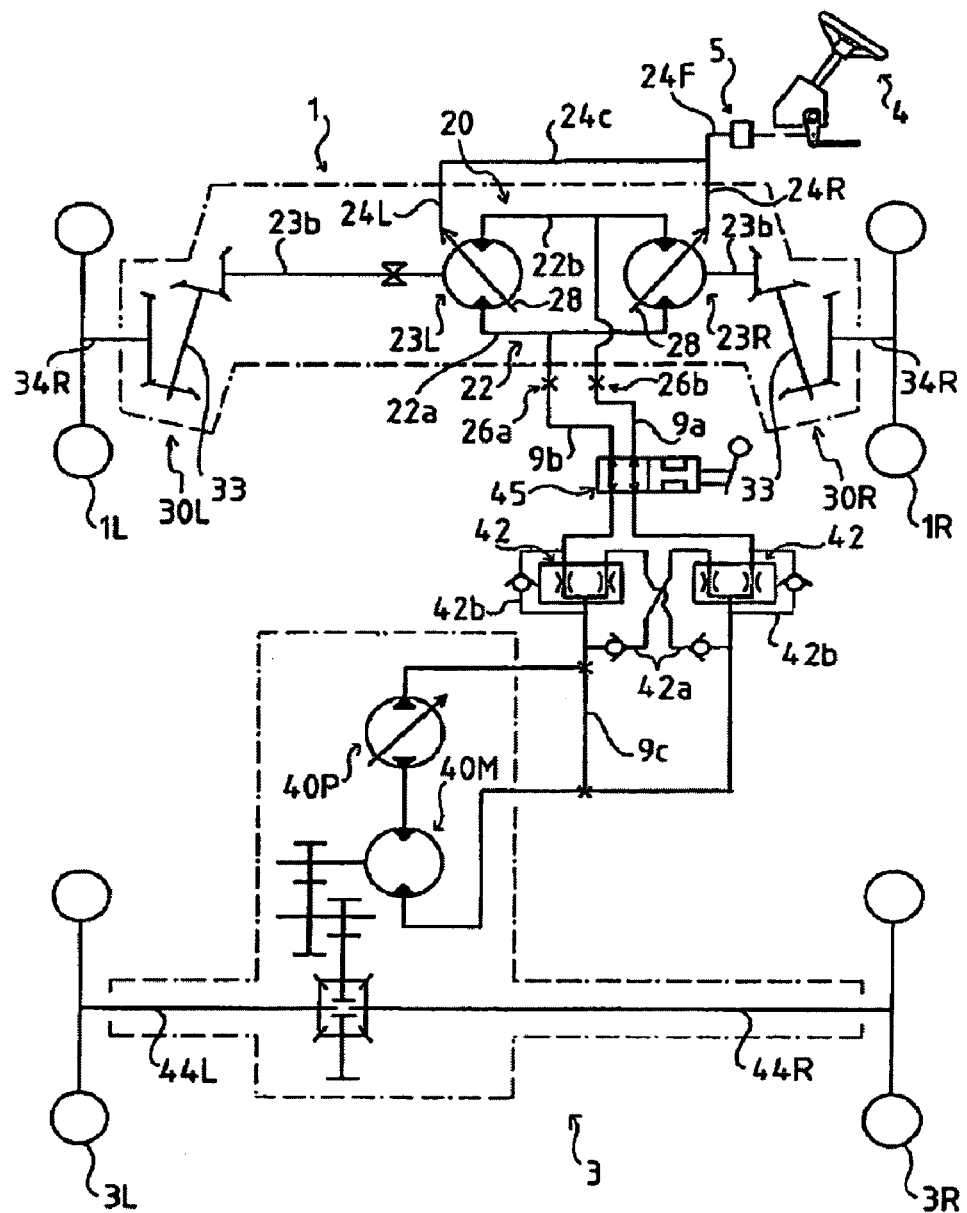
FIG. 6 is a hydraulic circuit diagram of a drive system according to a second embodiment.

FIG. 6 shows a hydraulic circuit diagram of the traveling drive system of the vehicle according to Embodiment 2.

In this configuration, the pair of hydraulic motors 23L and 23R in hydraulic drive unit 20 are of the variable displacement type, having movable swash plates 28 and 28. The flow rate of hydraulic oil supplied to center section 22 for driving the hydraulic motors is controlled by volumetric flow control means (including flow dividing valves 42 and 42).

As shown in FIG. 6, flow dividing valves 42 and 42 are interpositioned at middle portions of respective hydraulic hoses 9a and 9b between rear transaxle 3 and control valve 45, so as to bypass a part of flow of hydraulic oil, supplied toward front transaxle 1 from hydraulic pump 40P, via respective relief circuits 42a and 42a. Also, returning oil passages 42b and 42b are provided to release pressure between control valve 45 and respective flow dividing valves 42a and 42a. In addition, hydraulic hoses 9a and 9b are connected to each other via a bypass oil passage 9c.

According to the above-described configuration, the flow rate of hydraulic oil supplied to front transaxle 1 from rear transaxle 3 can be limited, or controlled by means of flow dividing valves 42 and 42. Due to the deceleration effect of flow dividing valves 42 and 42, while keeping the ratio of rotational frequency of front wheels 1L and 1R to that of rear wheels 3L and 3R, displacements of hydraulic motors 23L and 23R in front transaxle 1 may be smaller than that of hydraulic motor 40M in rear transaxle 3. That is, hydraulic drive unit 20 including hydraulic motors 23L and 23R may be compact while ensuring sufficient torque capacity needed for traction.

In addition, returning oil passages 42b and 42b can also serve as a torque limiter for cutting peak torque that occurs during heavy-duty traction. Therefore, strength level of the entire gear train can be reduced so as to minimize entire transaxle 1.

It should be noted that the above-mentioned effect of flow dividing valves 42 and 42 is based on their function of limiting (throttling) the flow supplied to front transaxle 1 to a constant rate, and on their returning passages. Such an effect can be achieved by any flow control valves including general throttle valves, having the throttling function and returning passages, as well as flow control valves 42.

Embodiment 3

Description will be given of transaxle 1 according to Embodiment 3.

Figure 7:
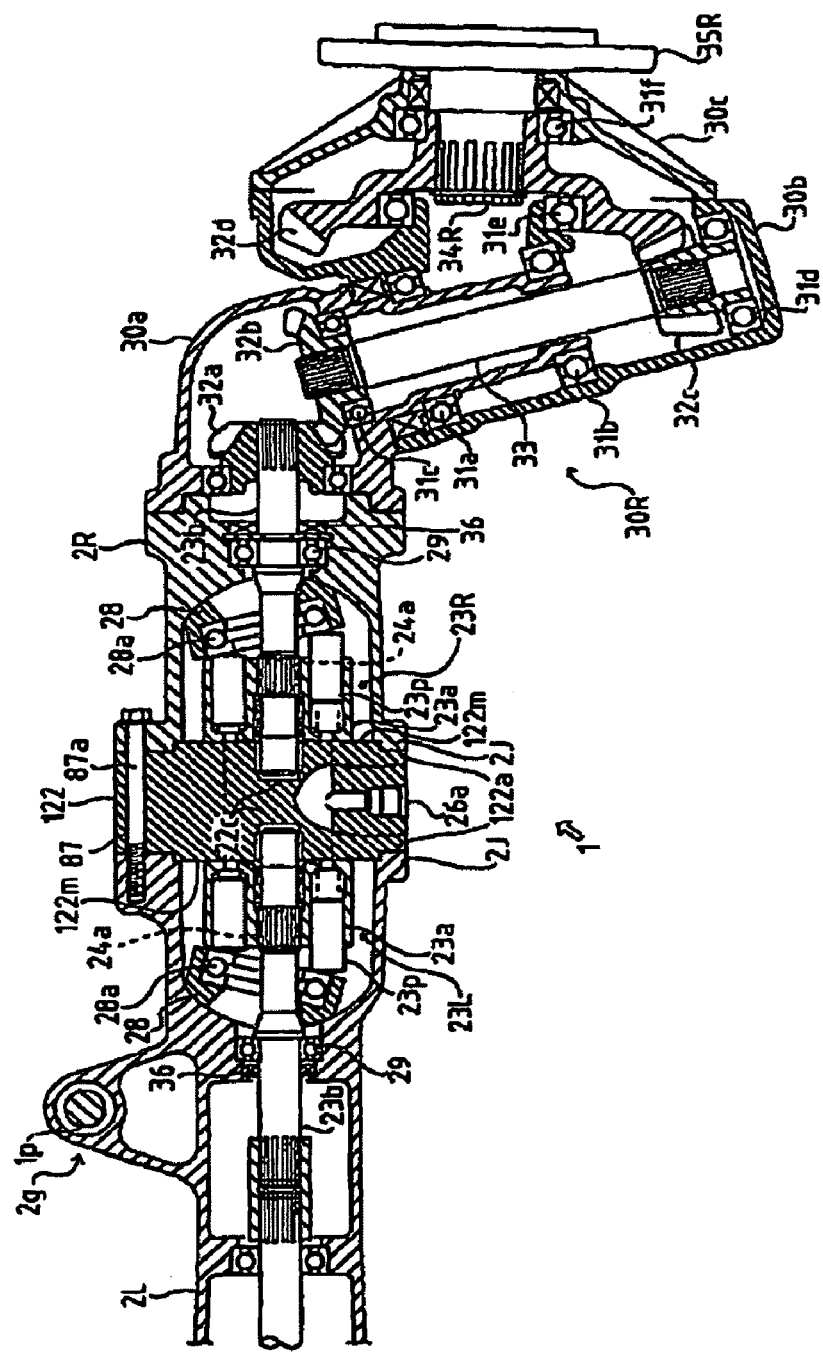
FIG. 7 is a fragmentary sectional front view of a transaxle according to a third embodiment.

In a configuration shown in FIG. 7, a center section 122 is inserted between joint surfaces of left and right axle casings 2L and 2R.

Figure 8:
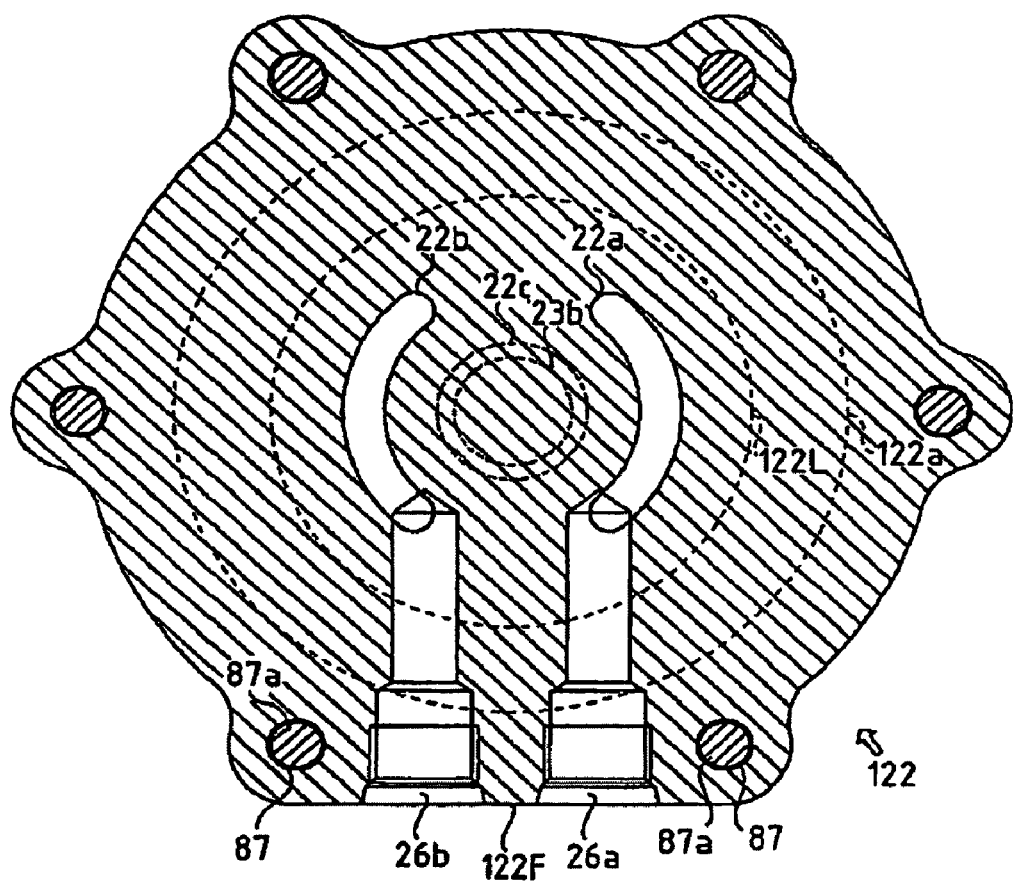
FIG. 8 is a sectional side view of the transaxle showing a center section thereof and its surroundings.

As shown in FIGS. 7 and 8, center section 122 is formed with left and right annular stepped portions 122a ad 122a having respective distally projecting vertical motor attachment surfaces 122m and 122m. Axle casings 2L and 2R are formed with flanges 2J and 2J expanded from the joint surfaces thereof. Flanges 2J and 2J are fitted onto respective annular stepped portions 122a and 122a so as to fix motor attachment surfaces 122m and 122m in position.

Furthermore, in a sectional side view, bolt holes 87, 87 and 87 are bored laterally through center section 122 at plural positions. Bolts 87a, 87a and 87a are inserted into the respective bolt holes 87, 87 and 87 from the right axle casing 2R side, and are screwed into tapped holes in left axle casing 2L. In this way, left and right axle casings 2L and 2R are fixedly joined to each other via center section 122 therebetween.

In this configuration, left and right axle casings 2L and 2R are joined via center section 122 with an exposed outer peripheral surface 122F of center section 122, so that the joint portion between axle casings 2L and 2R is reduced in vertical width in comparison with the configuration in which center section 122 is disposed within front axle casings 2L and 2R.

Embodiment 4

Description will be given of transaxle 1 according to Embodiment 4.

Figure 9:
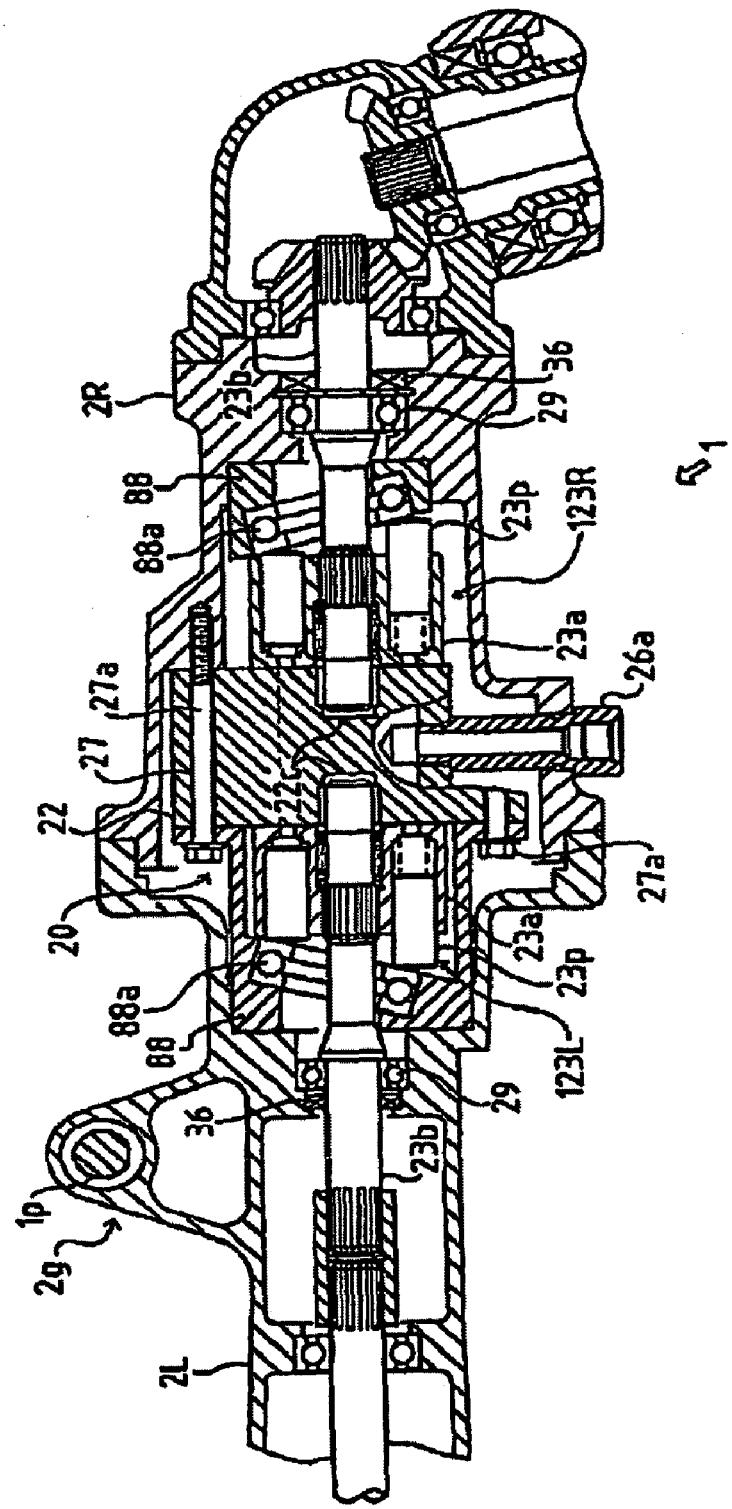
FIG. 9 is a fragmentary sectional front view of a transaxle according to a fourth embodiment.

A configuration shown in FIG. 9 is not provided with variable displacement hydraulic motors 23L and 23R having movable swash plates 28 and 28 as used in above-described Embodiment 1, but with fixed displacement hydraulic motors 123L and 123R having fixed swash plates 88 and 88. In this case, hydraulic circuits shown in FIGS. 10 and 11 can acceleration the front wheels during turning of the vehicle.

Figure 10:
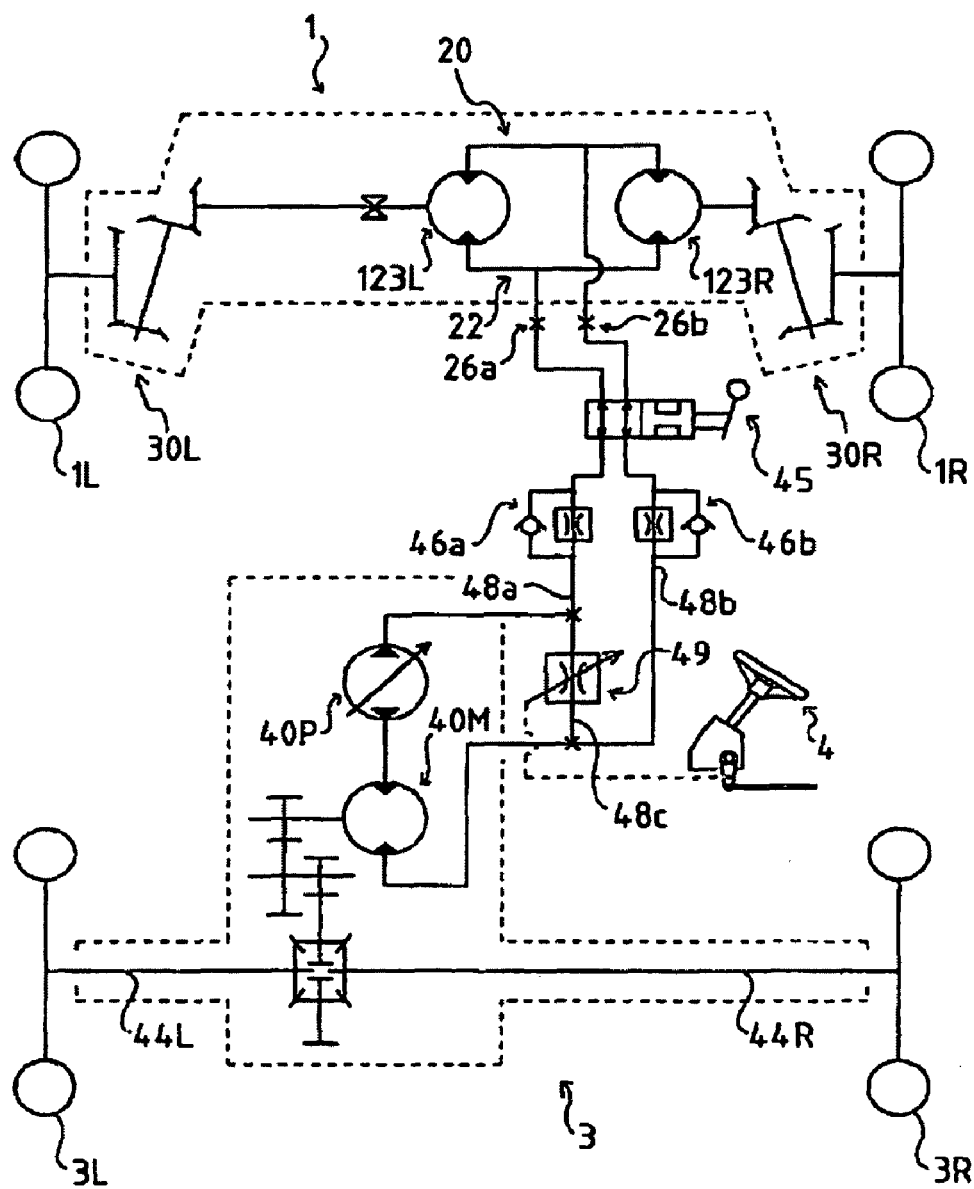
FIG. 10 is a hydraulic circuit diagram of a drive system of a vehicle having the transaxle.

First, in the hydraulic circuit shown in FIG. 10, front and rear transaxles 1 and 3 are hydraulically connected to each other via control valve 45, wherein an oil passage 48a, which connects hydraulic pump 40P to control valve 45, and an oil passage 48b, which connects hydraulic motor 40M to control valve 45, are hydraulically connected to each other via a hydraulic oil passage 48c provided with a variable throttle valve 49 on the midway thereof. The opening of variable throttle valve 49 is controlled in response to the input information of the steered angles of front wheels 1L and 1R. More specifically, the opening of variable throttle valve 49 is decreased as the steered angles of front wheels 1L and 1R are increased.

Here, it should be noted that the opening of variable throttle valve 49 can be controlled by anything that responds to the input information of the steered angles of front wheels 1L and 1R. Thus, the information of the steered angles can be inputted from any of steering operation device 4, tie rod 8 and the housings of wheel support units 30L and 30R shown in FIG. 1.

Furthermore, oil passages 48a and 48b are provided with respective relief systems 46a and 46b, each of which includes a throttle valve and a check valve.

In this hydraulic circuit configuration, oil passages 48a and 48b, which connect rear transaxle 3 and front transaxle 1, are connected to each other via oil passage 48c, through which a part of hydraulic oil flows from the higher-pressured passage into the lower-pressured passage.

It is now assumed that, during turning of the vehicle, oil passage 48a is higher pressured and oil passage 48b is lower pressured, for example. As the steered angles of front wheels 1L and 1R are increased, the opening of variable throttle valve 49 is decreased to decrease the volumetric flow of hydraulic oil into oil passage 48b through oil passage 48c, thereby increasing the flow rate of hydraulic oil supplied to front transaxle 1, in comparison with the case where steered angles are zero. Consequently, the front wheels are accelerated.

According to the above hydraulic circuit configuration, the height of transaxle 1 having fixed displacement hydraulic motors 123L and 123R can be minimized so as to increase the ground clearance, as well as that in Embodiment 1.

In particular, this configuration with fixed displacement hydraulic motors 123L and 123R has the merit of reduction in costs because it achieves reduction of the number of parts and assembly facilitation, in comparison with the configurations with the variable displacement hydraulic motors.

Furthermore, hydraulic motors 123L and 123R using fixed swash plates can be installed in axle casings 2L and 2R before assembly of entire transaxle 1, thereby improving ease of assembly.

Figure 11:
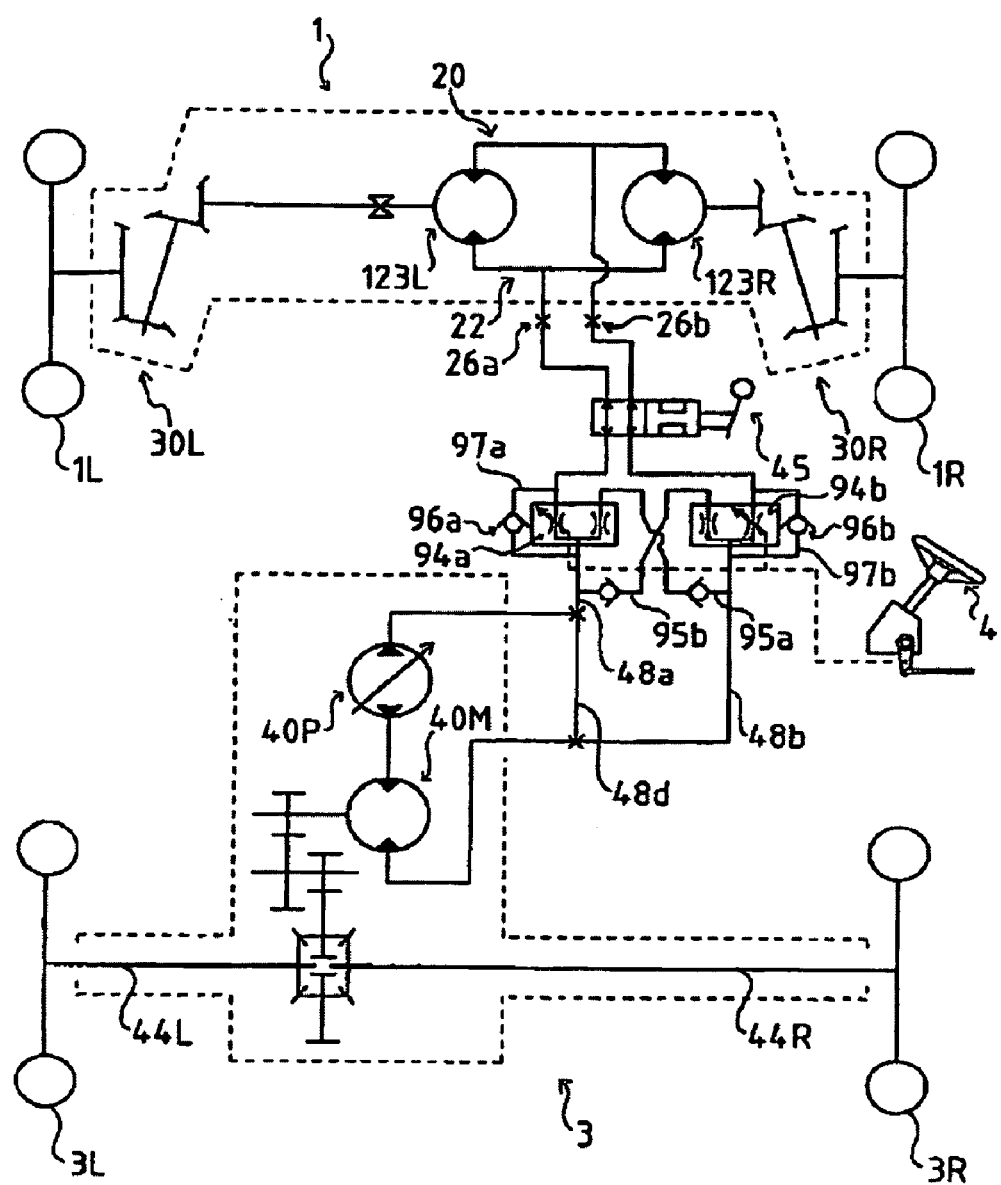
FIG. 11 is a hydraulic circuit diagram of another drive system of a vehicle having the transaxle.

Alternatively, in another configuration shown in FIG. 11, control valve 45 for hydraulically connecting front transaxle 1 to rear transaxle 3 is hydraulically connected to hydraulic pump 40P through oil passage 48a, and also hydraulically connected to hydraulic motor 40M through oil passage 48b, and an oil passage 48d hydraulically connects oil passages 48a and 48b to each other. Oil passages 48a and 48b are provided on the midway thereof with variable throttle valves 94a and 94b, relief circuits 95a and 95b and returning oil passages 97a and 97b, respectively. Each of relief circuits 95a and 95b passes oil from corresponding one of passages 48a and 48b to the other passage 48b or 48a via a throttle valve and a check valve. Returning oil passages 97a and 97b are intended for bypassing variable throttle valves 94a and 94b via check valves 96a and 96b, allowing only flow of hydraulic oil from the front transaxle 1 side to the rear transaxle 3 side. The openings of variable throttle valves 94a and 94b are controlled in response to the steered angles of front wheels 1L and 1R, so as to be increased as the steered angles of front wheels 1L and 1R are increased.

Here, it should be noted that the openings of variable throttle valves 94a and 94b can be controlled by anything that responds to the input information of the steered angles of front wheels 1L and 1R, similar to the above.

In the present hydraulic circuit configuration, variable throttle valves 94a and 94b are provided to oil passages 48a and 48b which connect rear transaxle 3 and front transaxle 1 so that the openings of variable throttle valves 94a and 94b are controlled so as to control flow rate of hydraulic oil supplied to front transaxle 1.

Therefore, on turning of the vehicle, as the steered angles of front wheels 1L and 1R gets increased, the openings of variable throttle valves 94a and 94b get increased to increase the volumetric flow of hydraulic oil supplied to front transaxle 1 from rear transaxle 3. Consequently, the front wheels get accelerated.

In addition, hydraulic oil is released to the lower pressured side through relief circuit 95a or 95b while the steered angles of front wheels 1L and 1R are small. Besides, in the present configuration, even when the circuit for sending hydraulic oil from front transaxle 1 back to rear transaxle 3 gets narrowed because both variable throttle valves 94a and 94b act simultaneously responding to change of the steered angles, hydraulic oil can pass through returning oil passage 97a or 97b with check valve 96a or 96b so as to bypass variable throttle valves 94a and 94b.

According to the above hydraulic circuit configuration, the height of transaxle 1 having fixed displacement hydraulic motors 123L and 123R can be minimized. As a result, the ground clearance therebelow can be increased, as well as that in Embodiment 1.

Further similarly, this particular configuration with fixed displacement hydraulic motors 123L and 123R has the merit of reduction in costs, in comparison with the configurations using the variable displacement hydraulic motors, from the viewpoint of reduction of the number of parts and ease of assembly.

Furthermore, the present configuration using hydraulic motors 123L and 123R with fixed swash plates has another merit of ease of assembly since entire transaxle 1 can be assembled after installation of hydraulic motors in axle casings 2L and 2R has been completed.

Embodiment 5

Description will be given of transaxle 1 according to Embodiment 5.

Figure 12:
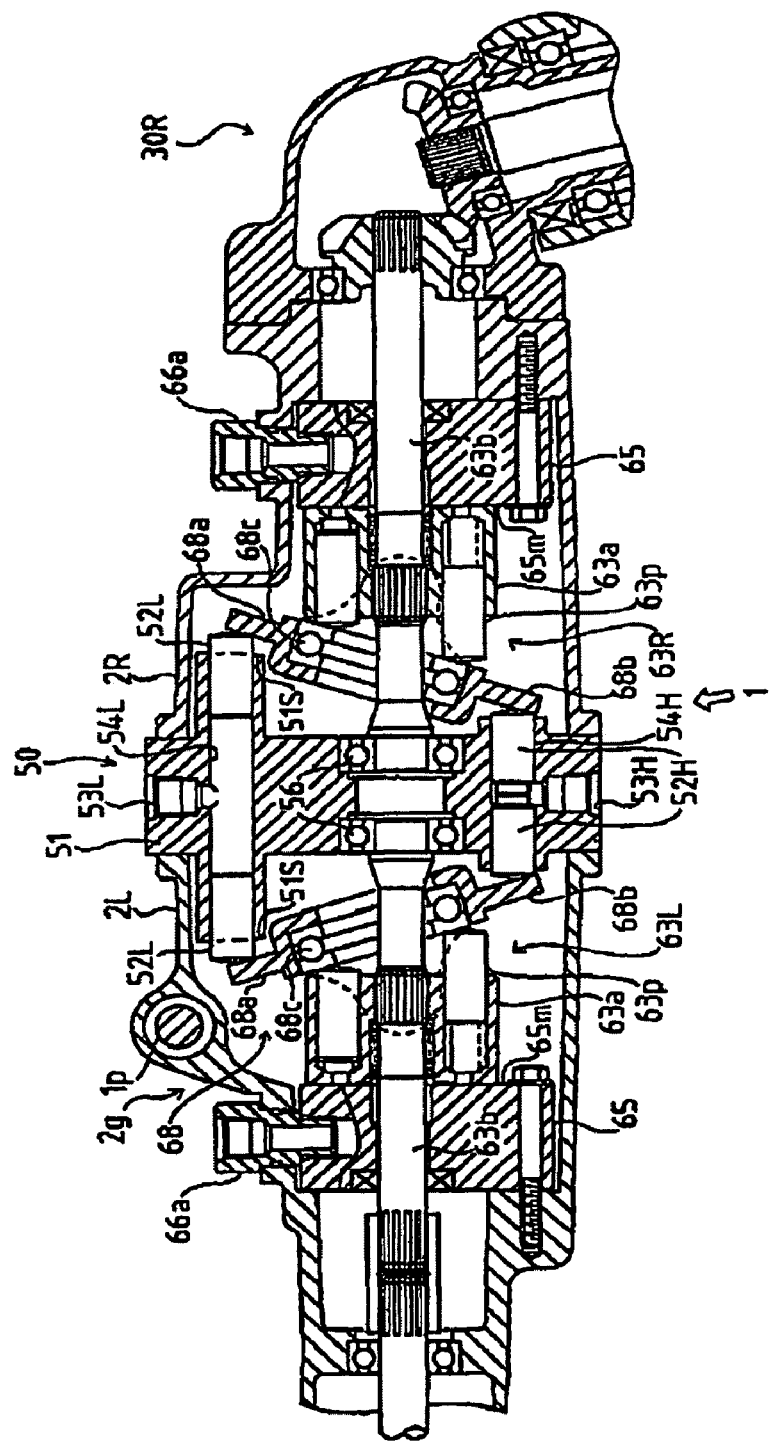
FIG. 12 is a fragmentary sectional front view of a transaxle according to a fifth embodiment.

As shown in FIG. 12, transaxle 1 comprises a hydraulic swash plate angle adjusting device 50, variable displacement hydraulic motors 63L and 63R, a pair of left and right wheel support units 30L and 30R. Hydraulic swash plate angle adjusting device 50 has a support block 51 supported between left axle casing 2L and right axle casing 2R. Variable displacement hydraulic motors 63L and 63R are disposed within left and right axle casings 2L and 2R, and have respective movable swash plates whose tilt angles are adjusted by hydraulically operated acceleration pistons 52H and deceleration pistons 52L, belonging to hydraulic swash plate angle adjusting device 50. The left and right wheel support units 30L and 30R are joined onto the left end surface of left axle casing 2L and the right end surface of right axle casing 2R, respectively, so as to drivingly and steerably support respective left and right front wheels 1L and 1R. Transaxle 1 also includes suspended portion 2g formed on one of left and right axle casings 2L and 2R to be hung on center pin 1p of the vehicle. The pair of wheel support units 30L and 30R are the same as those shown in FIG. 2.

As shown in FIG. 12, hydraulic motors 63L and 63R according to the present embodiment are configured as follows. Cylinder blocks 63a and 63a having several cylinder bores are rotatably slidably attached onto motor attachment surfaces 65m and 65m. Motor attachment surfaces 65m and 65m are formed on inward surfaces of center sections 65 and 65 fixed in left and right front transaxles 2L and 2R. Pistons 63p, 63p . . . are reciprocally fitted into the cylinder bores of cylinder blocks 63a and 63a, and abut at heads thereof against thrust bearings 68c and 68c of respective movable swash plates 68 and 68. Motor shafts 63b and 63b are non-relatively rotatably fitted to respective cylinder blocks 63a and 63a so as to output rotary forces thereof for driving left and right front wheels 1L and 1R. In this way, the pair of left and right variable displacement hydraulic motors 63L and 63R are disposed within left and right axle casings 2L and 2R, respectively. In addition, center sections 65 and 65 are provided therein with respective connecting plugs 66a and 66a leading to the outside of axle casings 2L and 2R.

Furthermore, each of the movable swash plates 68 and 68 is formed with upper and lower contact portions 68a and 68b, which contact utmost ends of respective pistons 52H and 52L protruding from support block 51 of hydraulic swash plate angle adjusting device 50.

Hydraulic swash plate angle adjusting device 50 includes support block 51, the pair of left and right deceleration pistons 52L and 52L, and the pair of left and right acceleration pistons 52H and 52H. Support block 51 rotatably supports inward ends of motor shafts 63b and 63b with bearings 56 and 56 at a center portion thereof. Support block 51 is laterally penetrated so as to form parallel deceleration cylinder 54L and acceleration cylinder 54H, with the rotary axes of motor shafts 63b and 63b therebetween. Further, support block 51 is bored therein with externally open deceleration suction port 53L and acceleration suction port 53H, extended from laterally middle portions of respective deceleration cylinder 54L and acceleration cylinder 54H. The pair of deceleration pistons 52L and 52L are slidably fitted in deceleration cylinder 54L, and the pair of acceleration pistons 52H and 52H are reciprocally slidably fitted in acceleration cylinder 54H.

Left and right side surfaces of support block 51 contact end surfaces of left and right respective axle casings 2L and 2R, so that support block 51 is supported between left and right axle casings 2L and 2R. Hydraulically operated deceleration pistons 52L and 52L, slidably fitted in deceleration cylinder 54L, are disposed so as to abut at heads thereof protruding from support block 51 against contact portions 68a and 68a of movable swash plates 68 and 68 of hydraulic motors 63L and 63R, respectively. Hydraulically operated acceleration pistons 52H and 52H, slidably fitted in acceleration cylinder 54H, are disposed so as to abut at heads thereof protruding from support block 51 against contact portions 68b and 68b of movable swash plates 68 and 68 of hydraulic motors 63L and 63R, respectively.

Due to hydraulic oil flow sucked into one of ports 53L and 53H, and discharged from the other, deceleration pistons 52L and 52L are moved laterally equally from the laterally middle portion of deceleration cylinder 54L, and acceleration pistons 52H and 52H are moved laterally equally from the laterally middle portion of acceleration cylinder 54H.

Support block 51 is substantially T-shaped in a front view so that deceleration cylinder 54L becomes laterally longer than acceleration cylinder 54H. Therefore, when acceleration pistons 52H and 52H are protruded out and deceleration pistons 52L and 52L are contracted inward from the open ends of deceleration cylinder 54L, the heads of acceleration pistons 52H and 52H push respective lower contact portions 68b and 68b of movable swash plates 68 and 68, and contact portions 68a and 68a come to contact respective left and right end edges 51S and 51S of deceleration cylinder 54L. In this way, left and right end edges 51S and 51S of deceleration cylinder 54L serve as stoppers against the tilting of movable swash plates 68 and 68. When end edges 51S and 51S come to function as stoppers, movable swash plates 68 and 68 get at the minimum tilt angles to give the maximum rotation speeds of motor shafts 63b and 63b.

By contrast, when deceleration pistons 52L and 52L are protruded at the maximum, the heads of deceleration pistons 52L and 52L push upper contact portions 68a and 68a of movable swash plates 68 and 68. Simultaneously, acceleration pistons 52H and 52H abut at protruding heads against lower contact portions 68b and 68b, and also abut against each other in acceleration cylinder 54H, thereby being stationary. In this way, the protruding heads of acceleration pistons 52H and 52H now function as stoppers against the tilting of movable swash plates 68 and 68. When acceleration pistons 52H and 52H come to function as stoppers, movable swash plates 68 and 68 get at the maximum tilt angles to give the minimum rotation speeds of motor shafts 63b and 63b.

Figure 13:
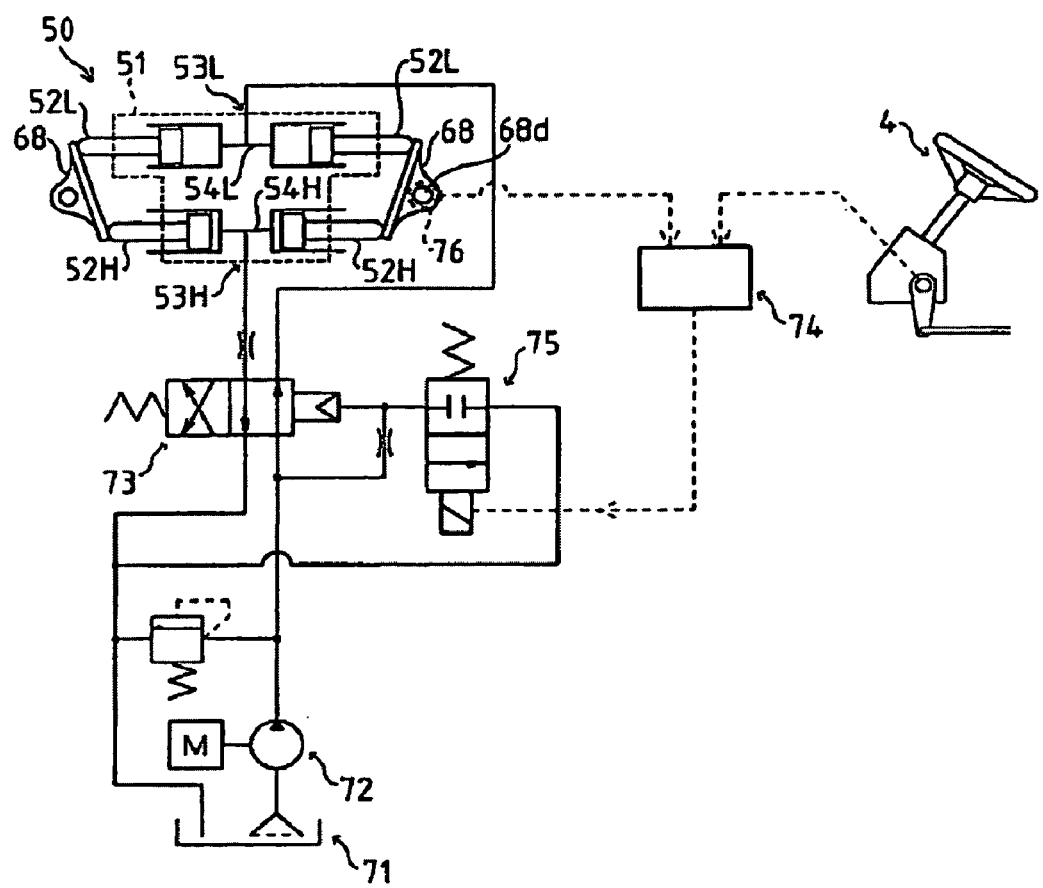
FIG. 13 is a hydraulic circuit diagram for operating a hydraulic swash plate angle adjusting device.

FIG. 13 shows the hydraulic circuit diagram relating to the hydraulic operation of the above-described hydraulic swash plate angle adjusting device 50 provided to transaxle 1 according to Embodiment 5.

In the hydraulic circuit system shown in FIG. 13, hydraulic oil is pumped up from a hydraulic oil tank 71 by means of a pump 72 and subsequently supplied via a second control valve 73 to support block 51 of hydraulic swash plate angle adjusting device 50. The hydraulic pilot of the second control valve 73 is controlled by a first control valve 75 connected to a controller 74. Alternatively, the hydraulic oil can be supplied to support block 51 by bypassing the oil supply circuit for supplying hydraulic oil to hydraulic motors 63L and 63R, instead of pumping up from hydraulic oil tank 71 by pump 72.

Controller 74 receives inputs of the steered angles of front wheels 1L and 1R, and the tilt angles of movable swash plates 68 and 68 of hydraulic motors 63L and 63R. For example, the steered angles can be computed from the operation degree of steering operation device 4, and the tilt angles can be inputted from potentiometers 76 which measure the rotation angles of respective control shafts 68d of movable swash plates 68. In this way, controller 74 is informed of actual tilt angles of movable swash plates 68 and 68 by the input from potentiometer 76, and compares the actual tilt angles with target tilt angels relative to the operation degree of steering operation device 4, thereby determining and outputting a control degree of first control valve 75.

The above control will be described in more detail. On turning of the vehicle, as the operation degree of steering operation device 4 increases, controller 74 changes a position of second control valve 72 by operating first control valve 75, so as to supply hydraulic oil to acceleration suction port 53H of support block 51. More specifically, hydraulic oil supply to acceleration suction port 53H is switched on and off in response to the operation of steering operation device 4 and also determines time of the oil supply in correspondence to the operation degree of steering operation device 4.

In this way, if the steering angle of front wheels 1L and 1R is increased on turning of the vehicle, the position of the second control valve 72 is changed, and hydraulic oil is supplied to acceleration suction port 53H, thereby tilting movable swash plates 68 and 68 for accelerating the front wheels. On the other hand, if the steering angle of front wheels 1L and 1R is decreased, hydraulic oil is supplied to deceleration suction port 53L from the second control valve 72, thereby tilting movable swash plates 68 and 68 for decelerating the front wheels.

According to Embodiment 5, the front wheels are accelerated by hydraulic pressure. Furthermore, similar to the above other embodiments, hydraulic motors 63L and 63R are laid horizontally in left and right axle casings 2L and 2R, so that transaxle 1 can be minimized in height and can increase its ground clearance.

Embodiment 6

Description will be given of transaxle 1 according to Embodiment 6.

Figure 14:
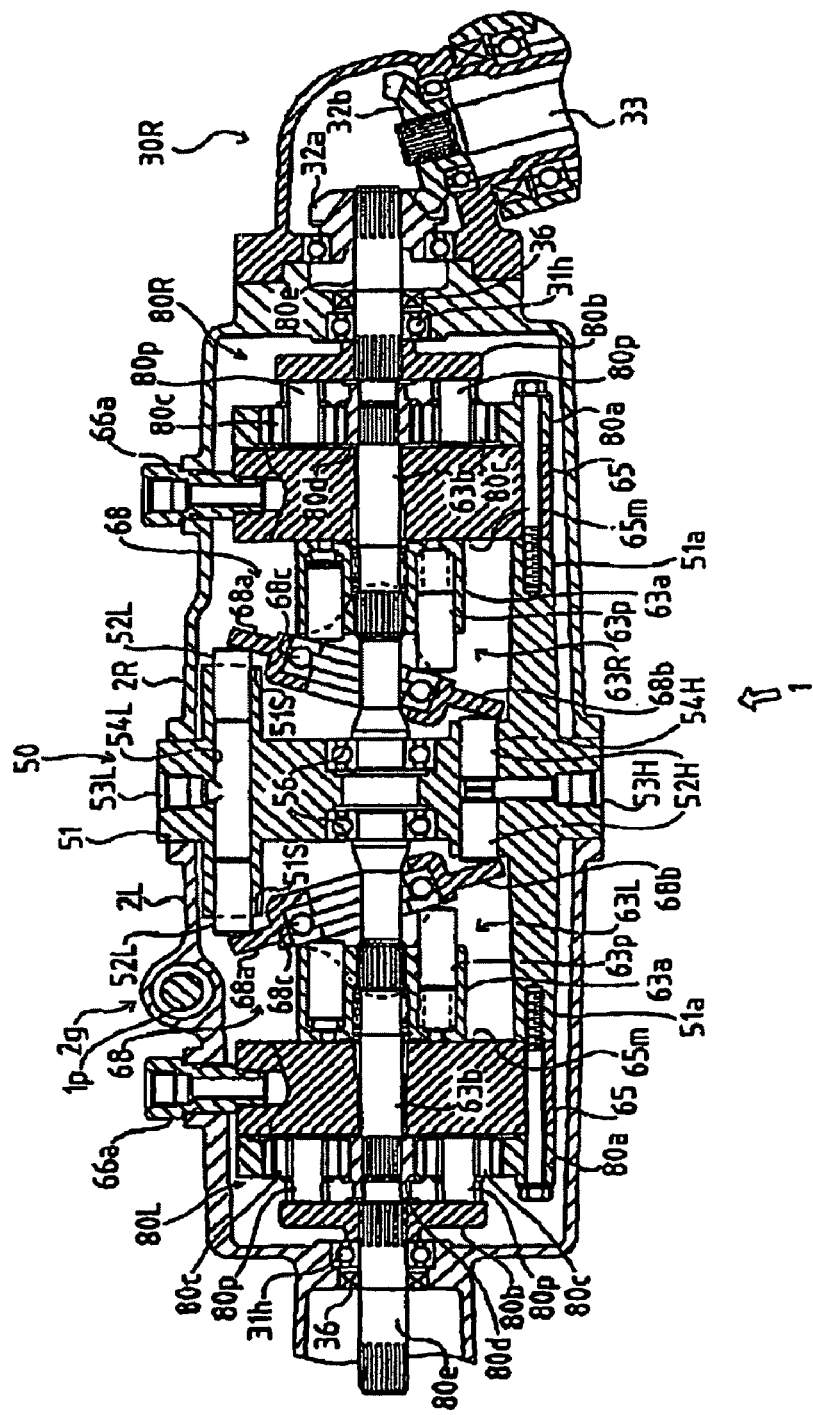
FIG. 14 is a fragmentary sectional front view of a transaxle according to a sixth embodiment.

The configuration of the present embodiment shown in FIG. 14 is a modified version of the above-described Embodiment 5. In this configuration, rotary powers of motor shafts 63b and 63b are transmitted to wheel support units 30L and 30R via planetary gear mechanisms 80L and 80R.

As shown in FIG. 14, each of planetary gear mechanisms 80L and 80R is comprised of an internal gear 80a, several planetary gears 80c, 80c, ..., a sun gear 80d and an output shaft 80e. Internal gear 80a is attached onto the outside vertical surface of center section 65. Planetary gears 80c, 80c, ... are engaged with the internal gear teeth of internal gear 80a, and are rotatably supported by each of carriers 80b via respective planetary shafts 80p, 80p, .... Sun gear 80d is encircled by planetary gears 80c, 80c, ..., and non-relatively rotatably connected to motor shaft 63b. Each of carriers 80b is non-relatively rotatably fitted on each of output shafts 80e along the rotary center axis thereof. Output shaft 80e is extended toward each of wheel support unit 30L and 30R, thereby transmitting driving force to transmission shaft 33 via bevel gear 32a provided on the outside end of output shaft 80e and via bevel gear 32b. Output shafts 80e are rotatably supported by bearings 31h and 31h fitted in axle casings 2L and 2R, respectively.

In the present configuration, the bottom part of support block 51 of hydraulic swash plate angle adjusting device 50 is extended both leftwards and rightwards to form support portions 51a and 51a. Center sections 65 and 65, with hydraulic motors 63L and 63R attached thereon, are bolted together with support portions 51a and 51a.

As described above, the rotation speeds of motor shafts 63b and 63b can be reduced by planetary gear mechanisms 80L and 80R between hydraulic motors 63L and 63R and wheel support units 30L and 30R. Therefore, hydraulic motors 63L and 63R with smaller displacements can be used. Furthermore, the deceleration gear trains with the planetary gear mechanisms 80L and 80R can be disposed coaxially to motor shafts 63b and 63b, while keeping the compactness of axle casings 2L and 2R in vertical width.

Further, each of the above-described transaxles according to Embodiments 1 to 6 does not require a vehicle equipped with it to greatly change its original design.

Embodiment 7

Description will be given of transaxle 1 according to Embodiment 7.

Figure 15:
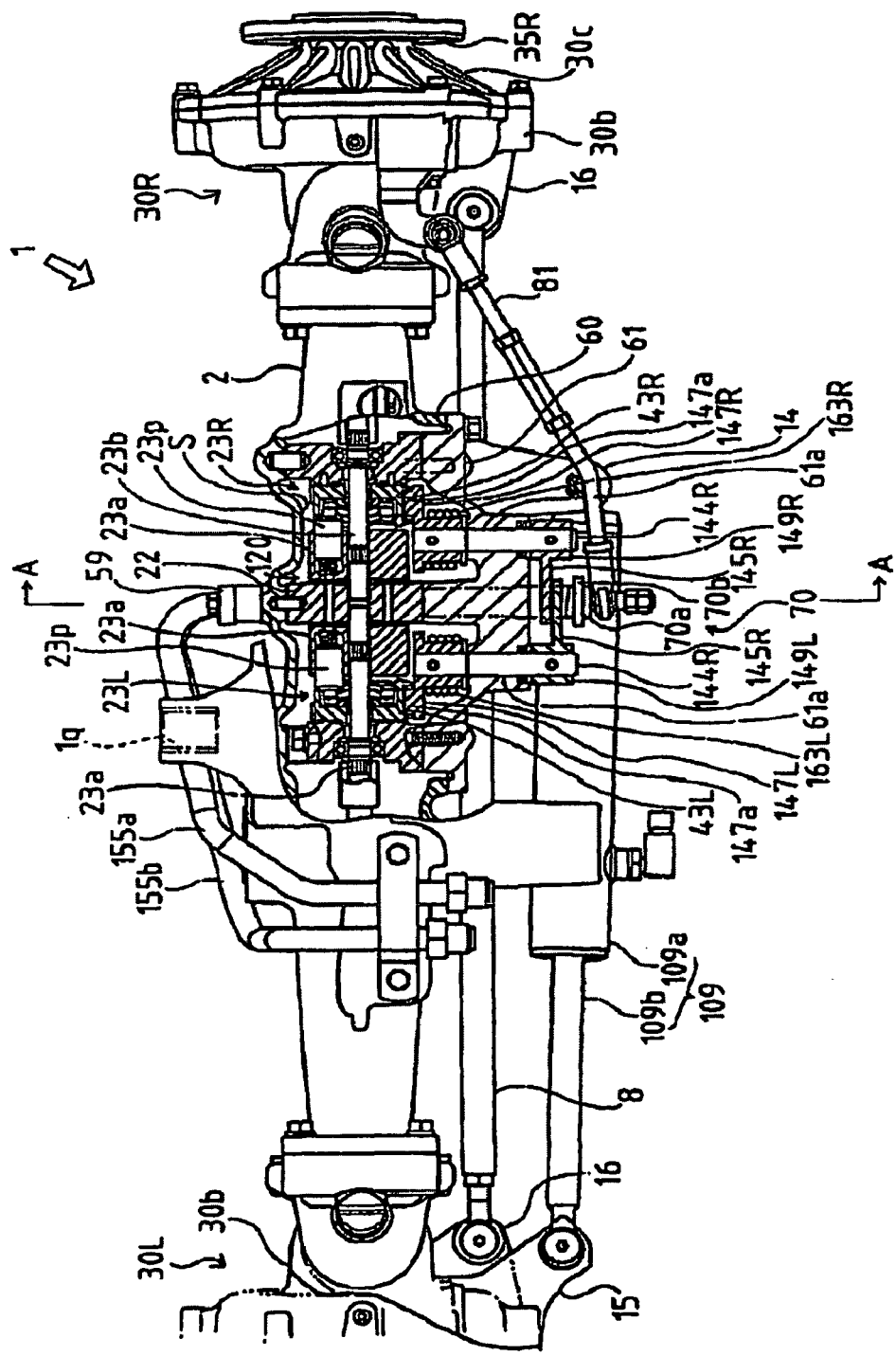
FIG. 15 is a plan view partly in section of a transaxle according to a seventh embodiment.

As shown in FIG. 15, transaxle 1 comprises an axle casing 2, a left and right pair of wheel support units 30L and 30R, a cover 61, a cam mechanism 70 and a link 81. Axle casing 2 is flanked with wheel support units 30L and 30R which are interlockingly connected to each other via tie rod 8 to be steered. Cover 61 shuts an opening 60 which is formed on either front or back side of axle casing 2. Cover 61 is provided thereon with a hydraulic drive unit 120 having two opposite variable displacement hydraulic motors (cf. FIG. 19). Cam mechanism 70 is provided for equally controlling the tilt angles of the swash plates of the variable displacement hydraulic motors. Link 81 is provided for inputting the steered angles of wheel support units 30L and 30R to cam mechanism 70.

Figure 16:
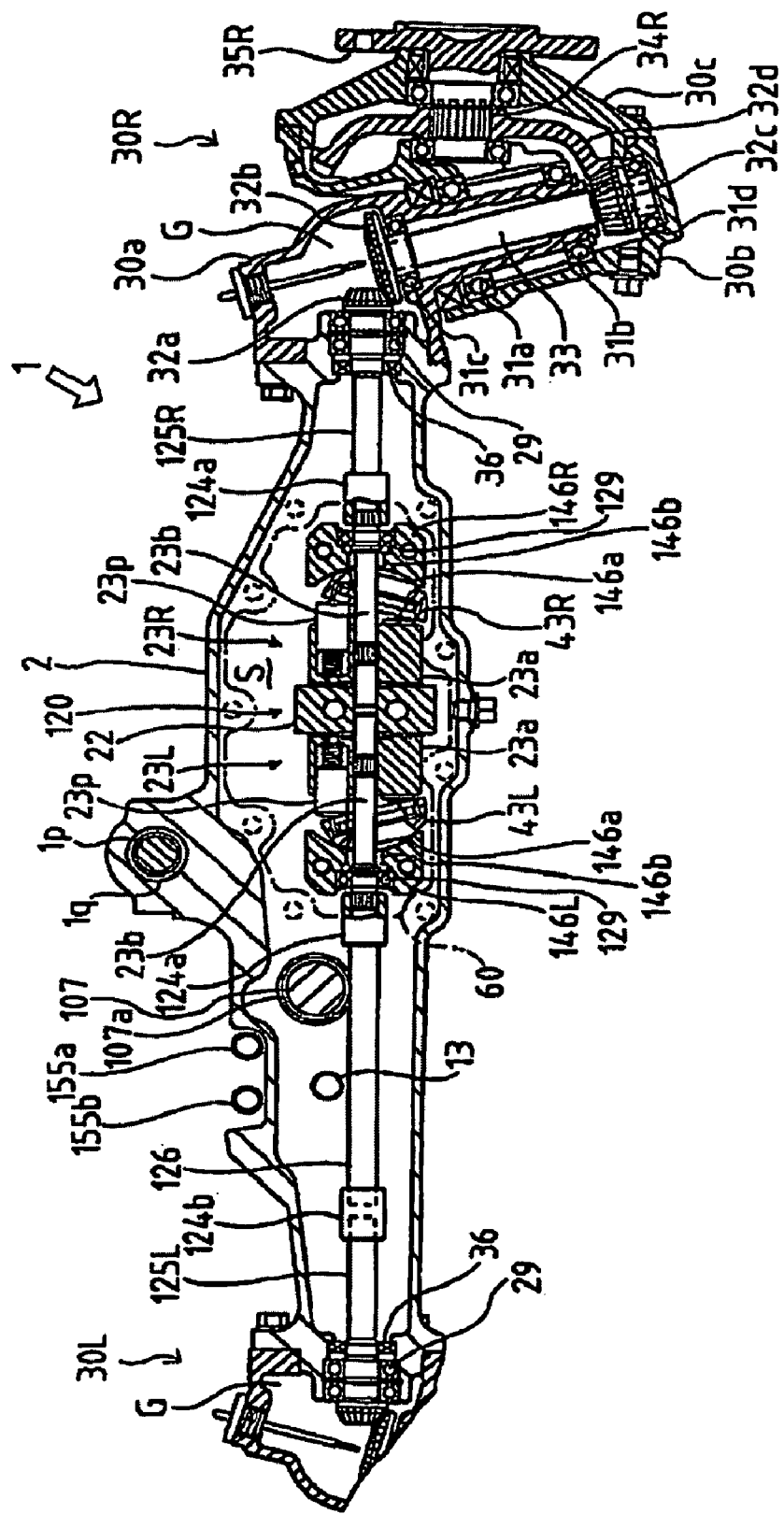
FIG. 16 is a fragmentary sectional rear view of the transaxle.

The present embodiment will now be described more fully hereinafter. As shown in FIGS. 15 and 16, wheel support units 30L and 30R disposed on the left and right sides of axle casing 2 are interlockingly connected to each other so as to be steered to change angles of the wheels supported thereon.

In axle casing 2 is formed a hydraulic motor chamber S which contains hydraulic drive unit 120, comprised of hydraulic motors 23L and 23R, center section 22, etc.

In FIG. 16, motor shaft 23b of right hydraulic motor 23R is interlockingly connected via a spline sleeve 124a to a right axle drive shaft 125R, whereby driving force is transmitted to wheel support unit 30R from right axle shaft 125R to drive wheel-hub disk 35R.

On the other hand, in FIG. 16, motor shaft 23b of left hydraulic motor 23L is interlockingly connected to a left axle drive shaft 125L via spline sleeves 124a and 124b and a connecting shaft 126, whereby driving force is transmitted to wheel support unit 30L from the left axle shaft 125L to drive the wheel-hub disk (not shown).

The pair of left and right wheel support units 30L and 30R, joined to the respective left and right ends of axle casing 2, are similar to those shown in FIG. 2.

Left and right axle drive shafts 125L and 125R are rotatably supported by bearings 29 and 29 fitted in the left and right end portions of axle casing 2, respectively. Seal 36 closes a gap between axle casing 2 and each of axle shafts 125L and 125R, thereby sealing motor chamber S containing hydraulic drive unit 120 off from a gear chamber G in gear casing 30a of each of wheel support units 30L and 30R.

Due to the sealing, hydraulic oil in motor chamber S in hydraulic drive unit 120 is prevented from mixing with gear-lubrication oil in gear chamber G. Therefore, driving of the hydraulic motor and lubricating of the gears are stably performed in the respective chambers, thereby improving drive efficiency and prolonging lifetimes of the gears and bearings.

Figure 18:
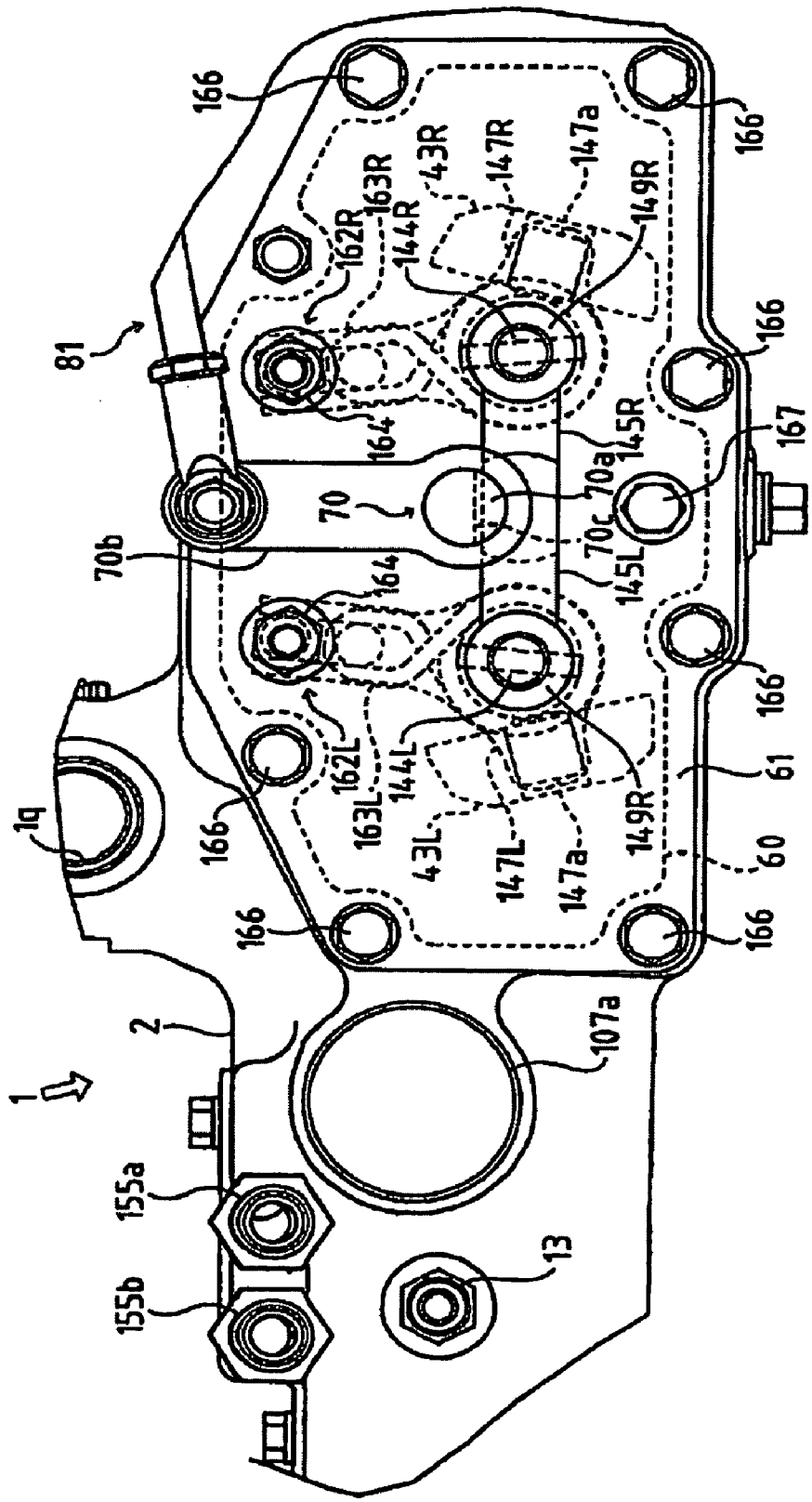
FIG. 18 is a rear view of a part of the transaxle showing a cover thereon.

As shown in FIGS. 16 and 18, a drain port 13 protrudes from the rear side of axle casing 2, so as to drain surplus hydraulic oil in axle casing 2 to an oil sump of an hydraulic oil source (cf. FIG. 37) via a piping 17.

As shown in FIG. 16, a laterally middle portion of axle casing 2 is bored by a hole 1q for passing center pin 1p therethrough. Center pin 1p is disposed in a fore-and-aft direction so as to determine the position of transaxle 1 relative to the vehicle frame, permitting vertical turning of the left and right travel wheels.

Axle casing 2 is also bored by a hole 107a for passing a PTO shaft 107 (for driving a working machine) in the fore-and-aft direction. If a vehicle is equipped with a working machine in front of transaxle 1, for example, power is transmitted to the working machine from PTO shaft 107 on the rear side of transaxle 1.

Figure 17:
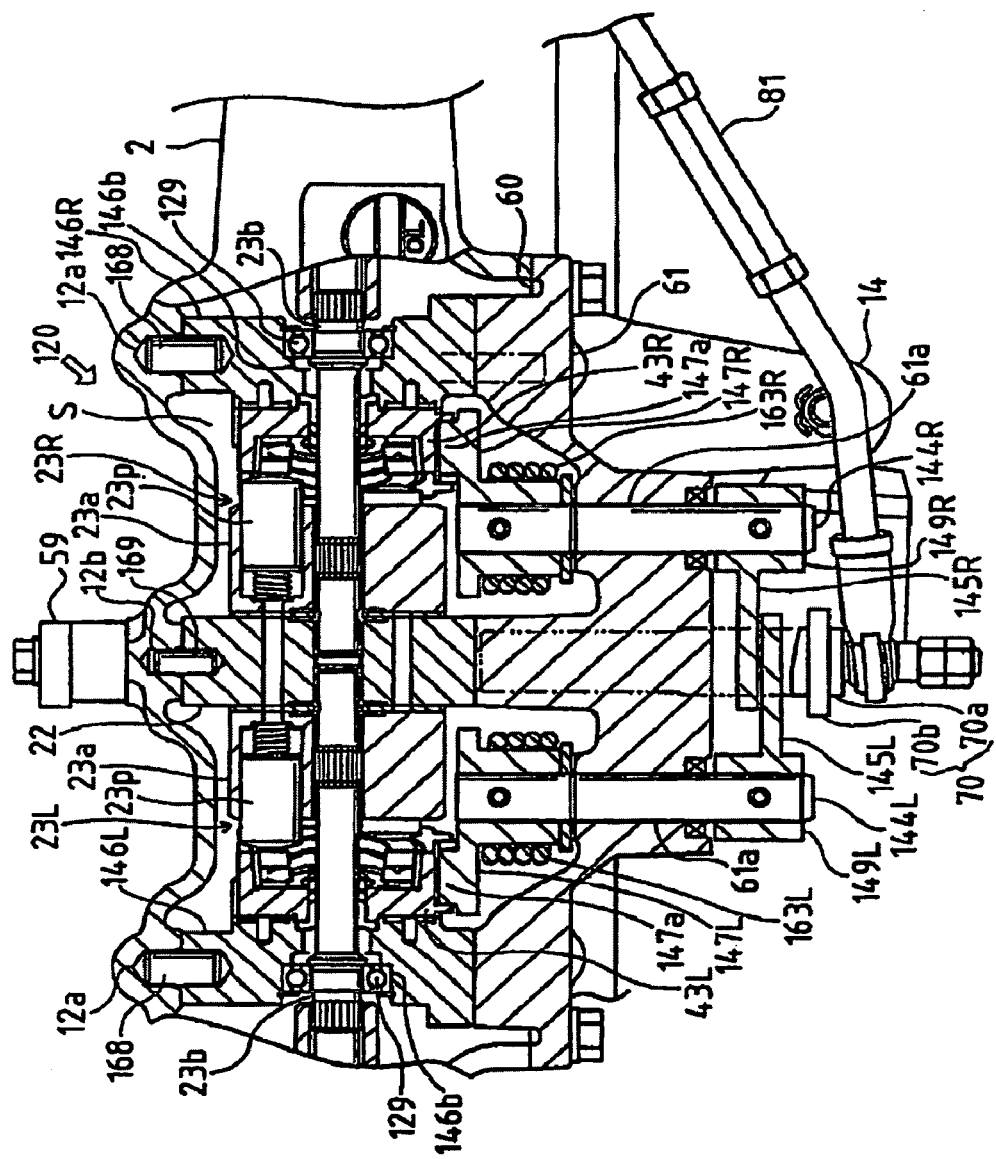
FIG. 17 is a plan view partly in section of a part of the transaxle showing a hydraulic drive unit therein.
Figure 21:
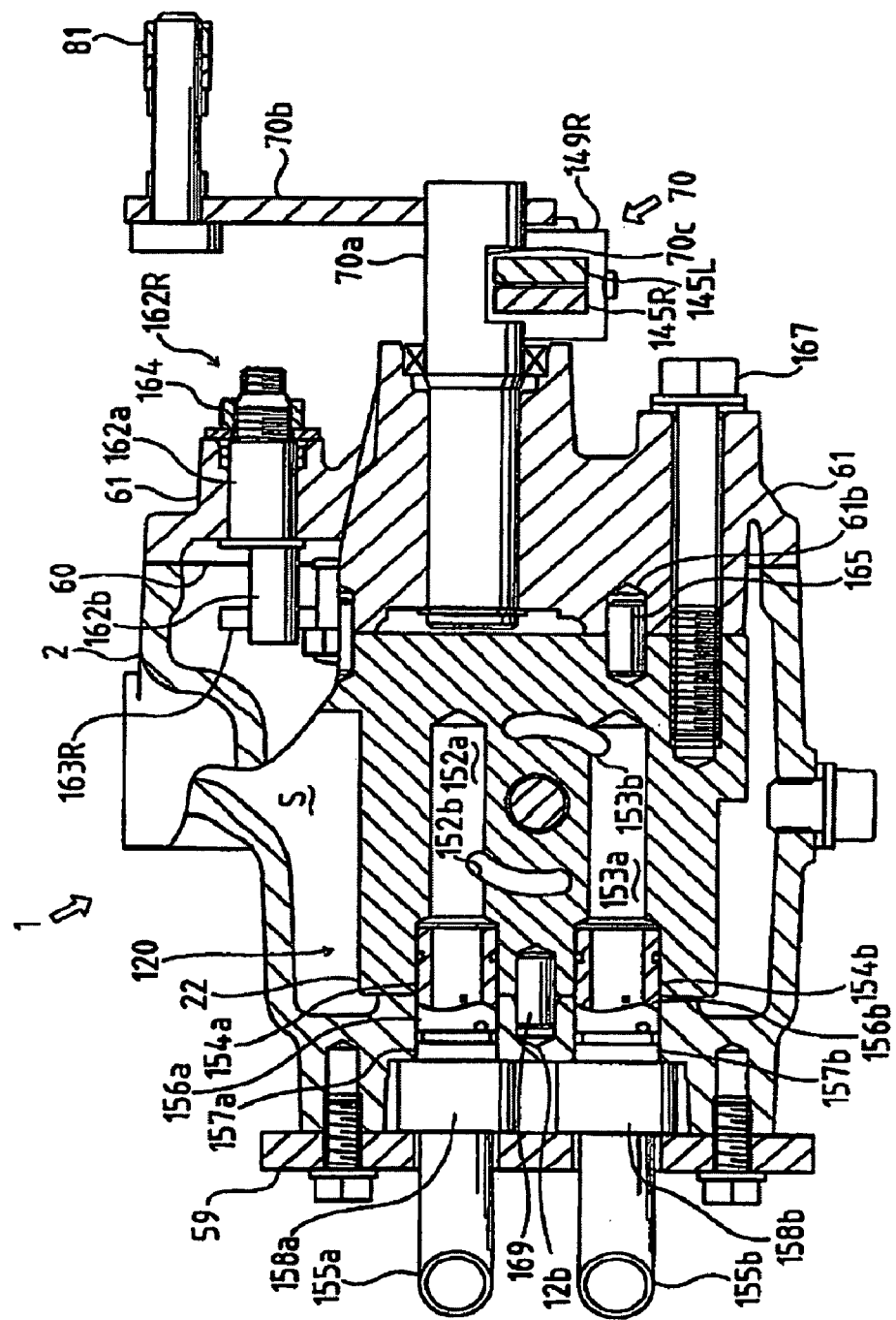
FIG. 21 is a cross sectional view taken along an A-A line of FIG. 15.

As shown in FIGS. 17 and 21, axle casing 2 is provided on the rear side thereof with opening 60 for outwardly opening motor chamber S. Opening 60 is closed by cover 61 so as to enclose motor chamber S. Here, as shown in FIG. 18, cover 61 is fastened to axle casing 2 with bolts 166 and 166.

Figure 19:
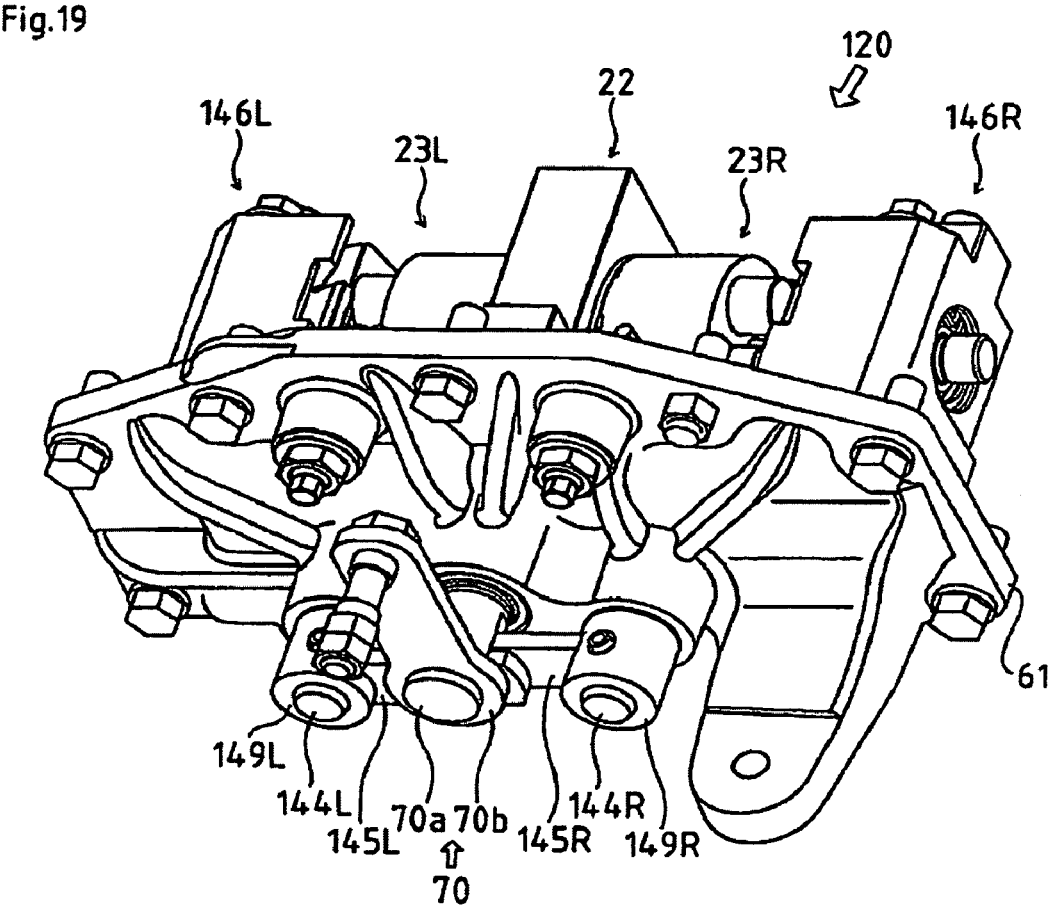
FIG. 19 is a perspective view of an assembly including the hydraulic drive unit and the cover.

As shown in FIG. 19, cover 61 is assembled with hydraulic drive unit 120 comprising hydraulic motors 23L and 23R and center section 22. Therefore, these integrated parts constitute an assembly. Here, as shown in FIGS. 18 and 21, cover 61 is fixed to center section 22 with a bolt 167.

As shown in FIG. 17, left and right symmetric hydraulic motors 23L and 23R are axial piston-type variable displacement hydraulic motors, having respective cylinder blocks 23a and 23a, which are non-relatively rotatably fitted on respective motor shafts 23b and 23b as output shafts, and reciprocally provided therein with pistons 23p, 23p, . . . , whose strokes are adjusted by respective movable swash plates 43L and 43R.

Movable swash plates 43L and 43R are engaged with control arms 147L and 147R which are turnable with control shafts 144L and 144R, respectively, so that the tilt angles of movable swash plates 43L and 43R are changed by rotating control shafts 144L and 144R with respective control arms 145L and 145R, thereby changing rotation speeds of motor shafts 23b and 23b for accelerating or decelerating the travel wheels (not shown).

As shown in FIG. 21, center section 22 is formed therein with aligned separate oil passages 152a and 153a extended in the fore-and-aft direction. Center section 22 is also formed therein with aligned oil passages 152b and 153b extended in the left-and-right direction and connected to respective oil passages 152a and 153a. Mutually separate oil passages 152b and 153b, serving as kidney (supply/discharge) ports of both hydraulic motors 23L and 23R, are open at the left and right side surfaces of center section 22, onto which respective cylinder blocks 23a and 23a are slidably fitted, thereby being connected to each other in parallel. Therefore, total of displacements of the left and right motors, determined by the tilt angles of movable swash plates 43L and 43R, becomes the overall motor displacement of the transaxle.

Pipe ports 154a and 154b are formed at the front side of center section 22 so as to outwardly open respective oil passages 152a and 153a. Joints 156a and 156b of respective hydraulic oil pipes 155a and 155b are fitted into respective pipe ports 154a and 154b. In this regard, axle casing 2 is bored through by holes 157a and 157b coinciding with respective pipe ports 154a and 154b in center section 22, so that joints 156a and 156b of hydraulic oil pipes 155a and 155b are inserted into pipe ports 154a and 154b through holes 157a and 157b, respectively. To prevent joints 156a and 156b from slipping out of pipe ports 154a and 154b due to high pressure, joints 156a and 156b have respective diametrically expanded basal parts 158a and 158b, which are sandwiched between the open surfaces of insertion hole 157a and 157b and a clamping plate 59 fastened onto axle casing 2 with bolts.

High-pressurized hydraulic oil is supplied into center section 22 via one of hydraulic pipes 155a and 155b, and hydraulic oil after driving cylinder blocks 23a and 23b is discharged via the other piping 155b or 155a.

In hydraulic drive unit 120 having the above-mentioned configuration, hydraulic motors 23L and 23R are arranged substantially symmetrically (bilaterally in the present embodiment), thereby mutually canceling their axial loads caused by reciprocation of pistons 23p, 23p, . . . in cylinder blocks 23a and 23a, and being balanced in load.

Furthermore, since axle casing 2 supporting the pair of left and right axle drive shafts 125L and 125R is provided with opening 60 at one of front and rear sides thereof, hydraulic drive unit 120 having hydraulic motors 23L and 23R, as an assembly, can be easily installed through opening 60 into axle casing 2 so as to drivingly connect hydraulic motors 23L and 23R to respective axle drive shafts 125L and 125R.

In addition, hydraulic drive unit 120 is integrally provided with cover 61 for closing opening 60 of axle casing 2 before it is installed into axle casing 2. Therefore, opening 60 is closed by cover 61 simultaneously with installation of hydraulic drive unit 120 into axle casing 2, thereby reducing the number of assembly processes.

Description will now be given of the structure of hydraulic motors 23L and 23R.

As shown in FIGS. 16 and 17, bilaterally symmetric hydraulic motors 23L and 23R have respective mutually facing cylinder blocks 23a and 23a with center section 22 therebetween.

In hydraulic motors 23L and 23R, surfaces of movable swash plates 43L and 43R opposite to respective cylinder blocks 23a and 23a contact semicircular guide surfaces 146a and 146a formed on respective swash plate supports 146L and 146R (cf. FIG. 16), penetrated by holes 146b and 146b for passing therethrough motor shafts 23b and 23b of hydraulic motors 23L and 23R. Motor shafts 23b and 23b are rotatably supported by bearings 129 and 129 fitted to the inside surfaces of holes 146b and 146b.

Furthermore, as shown in FIG. 17, swash plate supports 146L and 146R are provided on front sides thereof with respective fittings 168 and 168, such as pins, which are fitted into respective recesses 12a and 12a formed in axle casing 2, thereby being positioned relative to axle casing 2.

As described above, in hydraulic drive unit 120, hydraulic motors 23L and 23R are provided with respective swash plate supports 146L and 146R, which support respective movable swash plates 43L and 43R, and also have fittings 168 and 168 so as to easily position hydraulic drive unit 120 relative to axle casing 2, thereby facilitating assembly, and preventing axial misalignment of motor shafts 23L and 23R.

Similarly, center section 22 is also provided on the front side thereof with a fitting 169, such as a pin, which is fitted into a recess 12b formed in axle casing 2, thereby further improving the precision of positioning entire hydraulic drive unit 120 relative to axle casing 2.

Similarly, as shown in FIG. 21, center section 22 is also provided on the rear side thereof with a fitting 165, such as a pin, which is fitted into a recess 61b formed in cover 61, so as to be accurately positioned relative to cover 61, thereby further improving the precision of positioning the entire assembly of hydraulic drive unit 120 including cover 61 relative to axle casing 2.

As shown in FIGS. 17 and 18, movable swash plates 43L and 43R are engaged with engaging portions 147a and 147a of control arms 147L and 147R turned with control shafts 144L and 144R, respectively.

Ends of control shafts 144L and 144R opposite to the control arms 147L and 147R are passed through respective holes 61a and 61a penetrating cover 61 and protrude backward from cover 61. Base end parts 149L and 149R of control arms 145L and 145R are fixed onto the protruding ends of control shafts 144L and 144R, respectively. Due to this configuration, by rotating control arms 145L and 145R, control arms 147L and 147R are turned with control shafts 144L and 144R, so as to change tilt angles of swash plates 43L and 43R via engaging portions 147a and 147a.

Control arms 145L and 145R projecting from their respective base end parts 149L and 149R are offset from each other in the fore-and-aft direction, so as to be turnable without interfering with each other. Therefore, control arms 145L and 145R partly overlap each other in a rear view as shown in FIG. 18.

As shown in FIG. 17 to FIG. 20, hydraulic motors 23R and 23L include respective movable swash plates 43L and 43R, which are biased by respective torque springs 163R and 163L such as to be held at predetermined tilt angles. Movable swash plates 43L and 43R are interlockingly connected to one of the travel wheels via a link 81, a camshaft arm 70, etc. so that movable swash plates 43R and 43L decrease their tilt angles against the bias forces of torque springs 163R and 163L as the left or right turning angle of one of the wheels increases.

Figure 20:
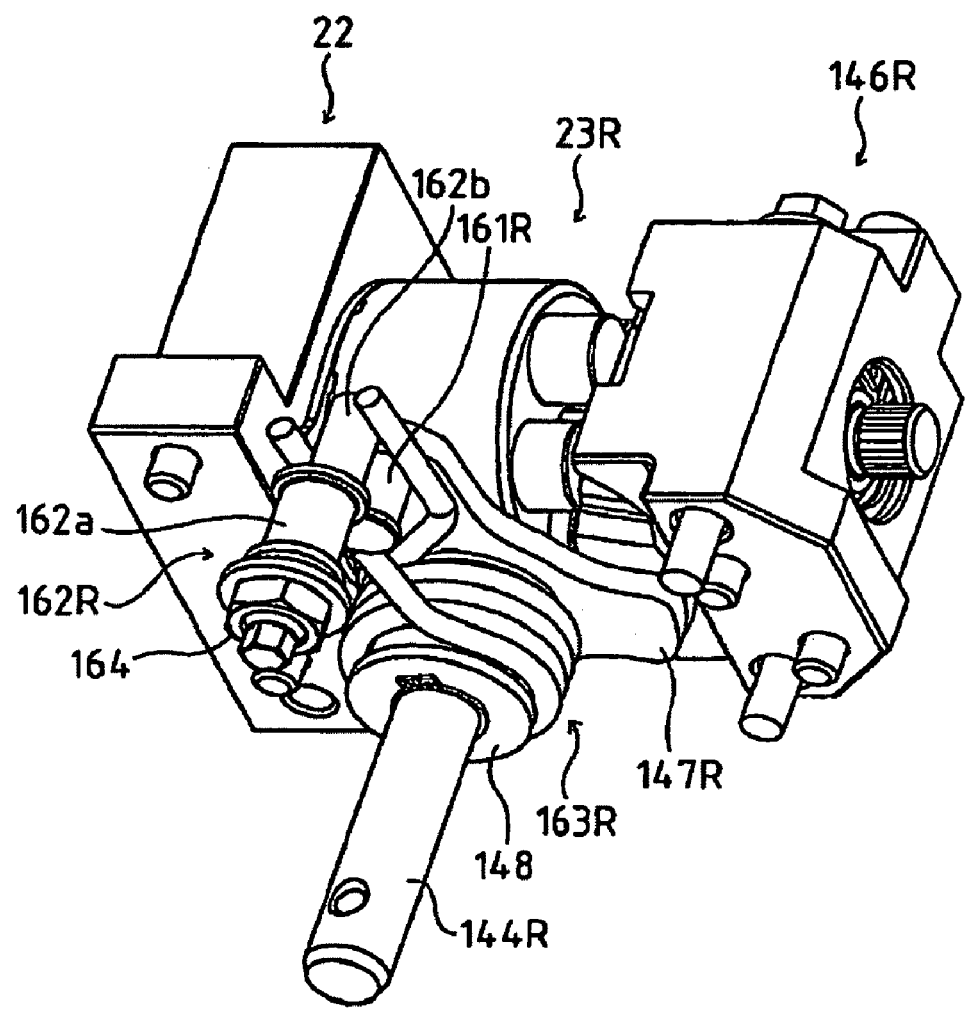
FIG. 20 is a perspective view of a hydraulic motor.
Figure 24:
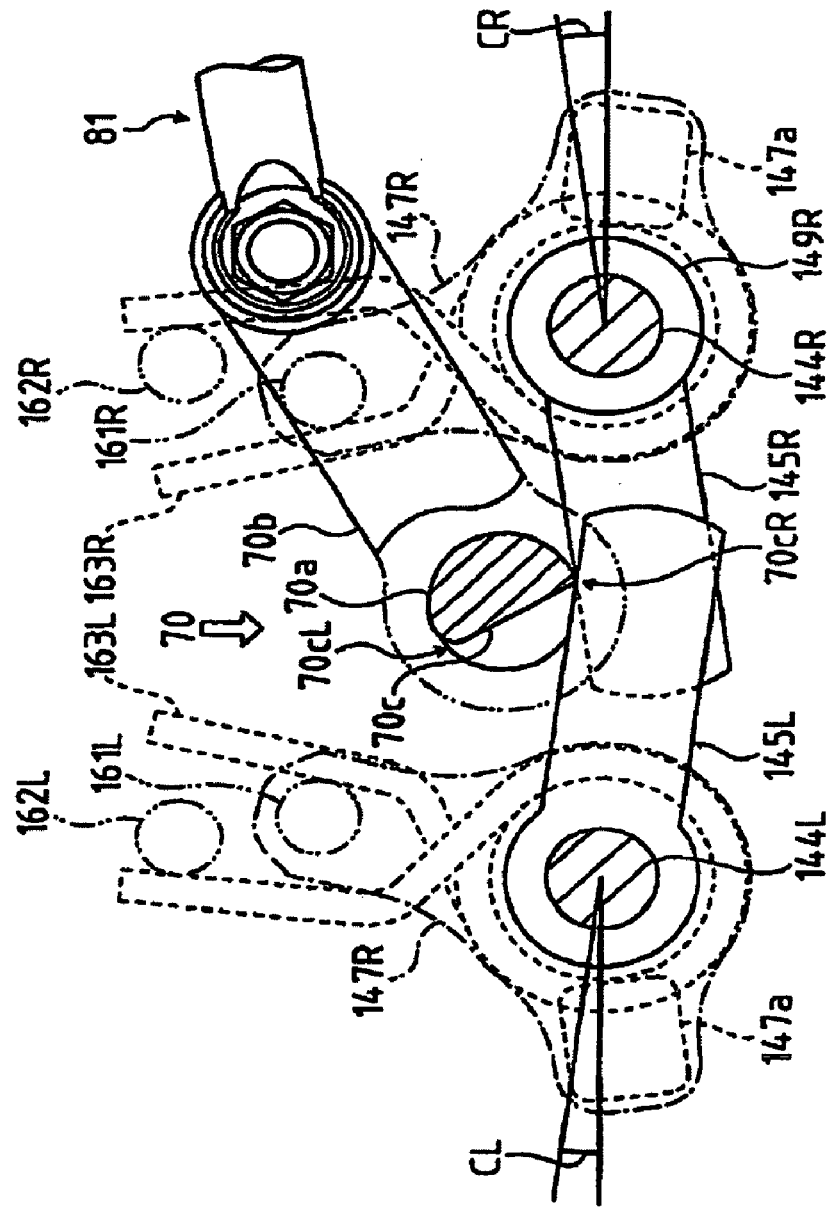
FIG. 24 is a view of action of a cam mechanism.

As shown in FIGS. 20 and 24, both ends of each of torque springs 163L and 163R cross each other and extend in the same direction so as to pinch each of engaging members 161L and 161R fixed on respective control arms 147L and 147R, and each of engaging members 162L and 162R fixed on cover 61. Therefore, each of torque springs 163L and 163R function as biasing means for generating biasing force onto each of control arms 147L and 147R, when corresponding control arm 147L or 147R is rotated in one direction, and for returning corresponding control arm 147L or 147R to the initial position. The one direction of rotating each of control arms 147L and 147R is the direction for decreasing the tilt angle of corresponding movable swash plate 43L or 43R, i.e., for decreasing the displacement of the corresponding motor.

In addition, engaging members 162L and 162R are adjustable in their fixed positions on cover 61, so as to serve as mechanisms for adjusting the initial tilt angles of movable swash plates 43L and 43R via torque springs 163L and 163R.

Therefore, the initial tilt angle positions of movable swash plates 43L and 43R are determined, and movable swash plates 43L and 43R are held in that position unless control arms 145L and 145R are operated.

As shown in FIGS. 20 and 24, each of torque springs 163L and 163R is fittingly put around a control-shaft-connecting portion 148 of each of control arms 147L and 147R (cf. FIG. 20). Pin-like engaging members 161L and 161R project from respective control arms 147L and 147R in parallel to control shafts 144L and 144R.

As shown in FIG. 21, engaging members 162L and 162R are fixedly planted into cover 61 in the vicinities of respective control shafts 144L and 144R.

Both ends of each of torque springs 163L and 163R cross each other and extend towards each of engaging members 161L and 161R and each of engaging members 162L and 162R, so as to nip each of engaging members 161L and 161R and each of engaging members 162L and 162R.

According to the above mechanism, as control arms 145L and 145R are turned for speed-changing, as illustrated in FIG. 24, the relative distances between engaging members 161R and 162R and between engaging members 161L and 162L are increased so as to push one end of each of torque springs 163L and 163R from the other end, thereby making torque springs 163L and 163R generate biasing forces for returning control arms 145L and 145R to their initial angle positions. On the other hand, when control arms 145L and 145R are released from operational forces, engaging member 161L (161R) is pushed back toward engaging member 162L (162R) by the returning force of torque springs 163L and 163R, thereby returning movable swash plates 43L and 43R to the initial angles.

Furthermore, as shown in FIGS. 20 and 21, each of engaging members 162L and 162R is a single shaft having a diametrically large part 162a and a diametrically small part 162b, which are axially eccentric to each other. Diametrically large part 162a is turnably supported and fastened to cover 61, and diametrically small part 162b is fitted onto one end portion of each of torque springs 163L and 163R on the inside of cover 61. The outer portion of diametrically large part 162a protruding from cover 61 is fastened to cover 61 with an angle-adjusting nut 164 so that the fixed angle of each of engaging members 162L and 162R relative to cover 61 can be adjusted to any angle. Therefore, the initial angles of movable swash plates 43L and 43R can be adjusted by loosening respective angle-adjusting nuts 164 and rotating respective engaging member 162L and 162R.

Therefore, the vehicle traveling straight gets a regular speed level determined by keeping movable swash plates 43L and 43R at the preset initial angles. If the vehicle having the present transaxle is a four-wheel drive vehicle, the initial tilt angles of movable swash plates 43L and 43R can be adjusted so as to adjust the relative speed of front wheels to rear wheels.

As shown in FIGS. 18 and 21, a camshaft 70a for operating control arms 145L and 145R is turnably supported by cover 61 at a portion equally distant from the center axes of control shafts 144L and 144R. The axial direction of camshaft 70a coincides with those of control shafts 144L and 144R. Camshaft 70a is extending from cover 61 beyond control arms 145L and 145R, and fixedly provided on the extended end thereof with a base end portion of a camshaft arm 70b.

The other end of camshaft arm 70b is connected via link 81 to steerable casing 30b of wheel support unit 30R (cf. FIG. 15), so that link 81 senses motion of one of the left and right travel wheels, representing the leftward or rightward turning angles of the left and right wheels supported by both left and right wheel support units 30L and 30R, and transmits the detection value to camshaft arm 70b. In this way, during the vehicle turns, link 81 is moved to rotate camshaft arm 70b. Referring to FIG. 18, in the present configuration, camshaft arm 70b is turned counterclockwise during left turning of the vehicle, and turned clockwise during right turning of the vehicle.

Figure 22:
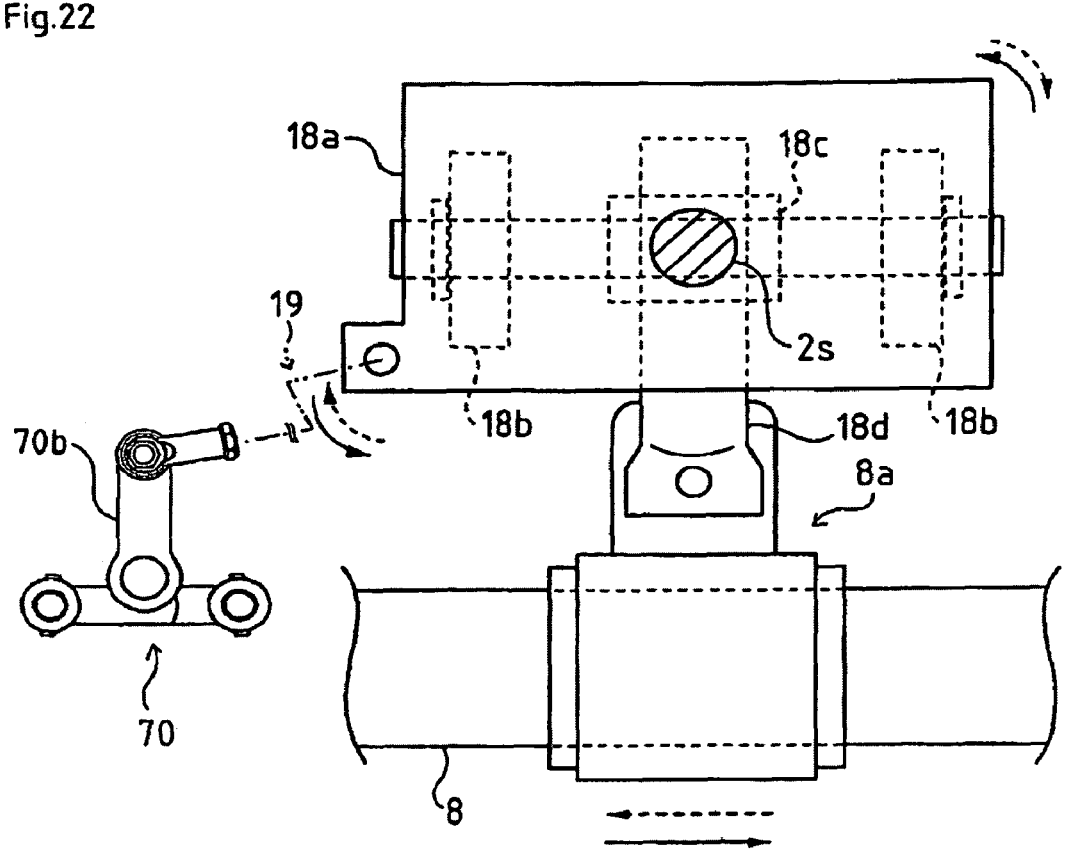
FIG. 22 is a plan view of a configuration for inputting movement of a tie rod to a camshaft arm.
Figure 23:
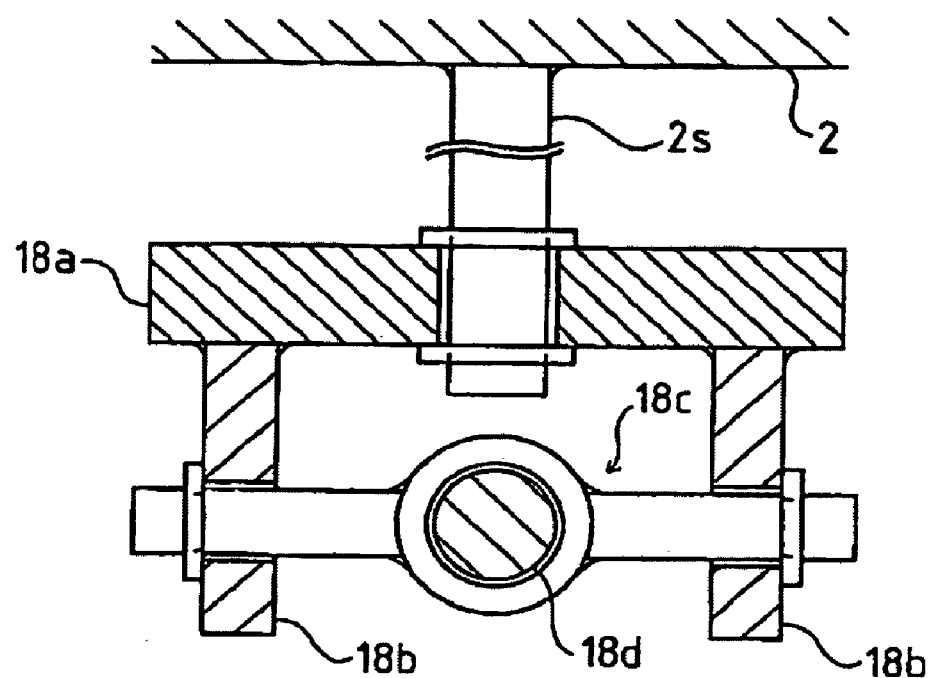
FIG. 23 is a rear view partly in section of the connection configuration of FIG. 22.

Alternatively, to input the detection leftward or rightward turning angles of the travels wheels, camshaft arm 70b can be connected not to axle casing 30c of wheel support unit 30R, but to tie rod 8 via an interlocking mechanism 18 and a link 19, as shown in FIGS. 22 and 23.

Interlocking mechanism 18 comprises a plate 18a, a connecting sleeve 18c and a connecting shaft 18d. Plate 18a is turnably provided on a support shaft 2s protruding from axle casing 2. Support portions 18b and 18b protrude from plate 18a to turnably support connecting sleeve 18c. Connecting shaft 18d is slidably passed through connecting sleeve 18c and turnably connected to a connecting portion 8a formed on the middle of tie rod 8. Therefore, the lateral movement of tie rod 8 is converted into rotational movement of plate 18a for rotating camshaft arm 70b.

Vertical movement of tie rod 8 is absorbed because it is converted into rotation of connecting sleeve 18c, and fore-and-aft directed movement of tie rod 8 is absorbed because it is converted into sliding of connecting shaft 18d. Camshaft arm 70b is turned by only left-and-right directed movement of tie rod 8.

Camshaft arm 70b may be mechanically operated by link 81, a wire and/or the like. Alternatively, camshaft arm 70b may be operated by an actuator based on electric detection of the steered angles of the travel wheels with a photosensor, a potentiometer or the like.

Furthermore, camshaft 70a is comprised of control arms 145L and 145R and a lever contacting surface 70c as shown in FIGS. 21 and 24. Lever contacting surface 70c is formed with the lower part of cam shaft 70a removed away in the middle of cam shaft 70a where cam shaft 70a is overlapping with control arms 145L and 145R in the axial direction.

As shown in FIGS. 21 and 24, camshaft 70a is formed with a downwardly open lever-contacting surface 70c at a portion thereof axially overlapping control arms 145L and 145R. Control arms 145L and 145R and lever-contacting surface 70c constitute cam mechanism 70.

The portion of camshaft 70a with lever-contacting surface 70c has a substantially semilunar shape in axial section, in which lever-contacting surface 70c face downward to the top surfaces of control arms 145L and 145R.

According to the above configuration, as shown in FIG. 24, as camshaft 70a is turned by operation of camshaft arm 70b, either a right edge 70cR or a left edge 70cL of lever-contacting surface 70c comes to touch the top surfaces of control arms 145L and 145R, thereby simultaneously rotating control arms 144L and 144 R. Therefore, tilt angles of movable swash plates 43L and 43R of hydraulic motors 23L and 23R are simultaneously changed so as to simultaneously accelerate or decelerate both motor shafts 23b and 23b.

Figure 25:
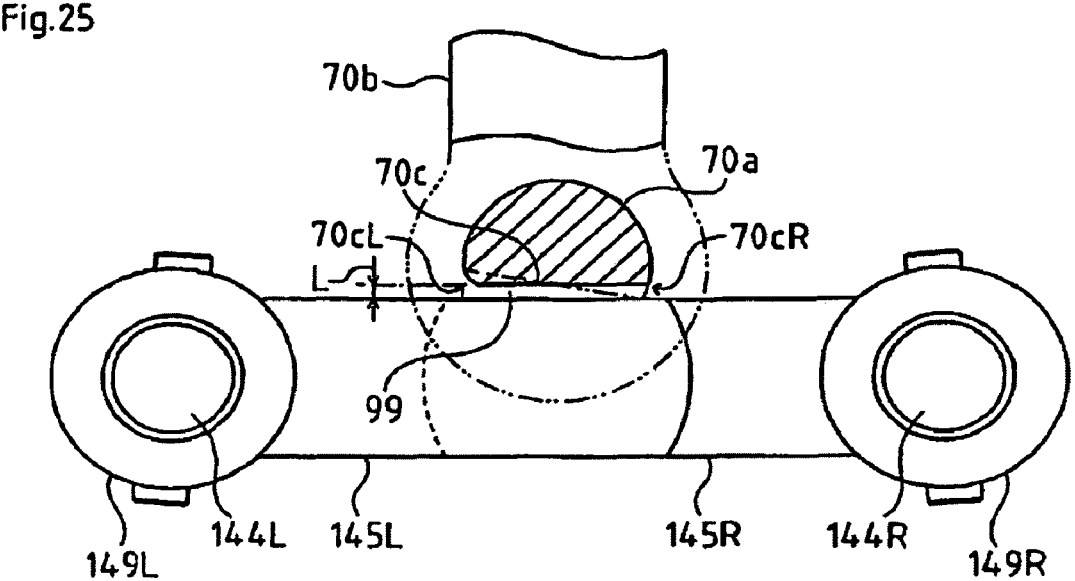
FIG. 25 is a constructive view of the cam mechanism.

In the present transaxle, the conventional Ackerman-Jeanteau steering system is employed for steering the left and right travel wheels attached to wheel support units 30L and 30R. Therefore, even if the steering wheel is turned to the same degree leftward and rightward, the steered angle of each of the left and right travel wheels differs depending upon whether it comes to inside of the turning vehicle or outside of the turning vehicle. However, in cam mechanism 70, radius corners of right and left edges 70cR and 70cL have different shapes, as shown in FIG. 25, i.e., different cam ratios, so as to equalize change of the total displacement of the hydraulic motors with rotation of control arm 145L and 145R even if the stroke of link 81 becomes different whether the corresponding travel wheel is steered rightward or leftward. In the present embodiment, left edge 70cL is shaped in a gentle arc, and the radius of left edge 70cL is designed larger than that of right edge 70cR.

Such a simple system using the single camshaft 70a engaged with one of the travel wheels can ensure equal acceleration whether the vehicle turns left or right.

In the above configuration, as shown in FIG. 27 (a), when the steering wheel is turned to the left by a certain angle, the right front wheel is turned leftward by an angle θx from the straight-travel position, and the stroke of link 81 rotates camshaft arm 70b to the right in the drawing by an angle θa. Consequently, due to the cam function of right edge 70cR, control arm 145L is turned by an angle CL, and control arm 145R is turned by an angle CR. Therefore, the total displacement X of the hydraulic motors is decreased by an amount of Y determined by the angles CL and CR from the amount corresponding to the straight travel of the vehicle. As a result, an average peripheral speed ratio of the front wheels becomes larger than an average peripheral speed ratio of the rear wheels, so as to smoothly reduce a turning radius of the vehicle without damaging the ground and the front wheels.

On the other hand, as shown in FIG. 27 (b), when the steering wheel is turned to the right by the same angle as the aforementioned certain angle, the right front wheel is turned rightward by an angle θx' (>θx) from the straight-travel position, and the stroke of link 81 rotates camshaft arm 70b to the right in the drawing by an angle θa' (>θa). Due to the cam function of gently arcuate left edge 70cL, control arm 145L is turned by the angle CR and control arm 145R is turned by the angle CL. Therefore, even when the steering wheel is turned to the right, the total displacement X of the hydraulic motors is also decreased by the same amount of Y as that in the left turning case from the amount corresponding to the straight travel of the vehicle.

As described above, the total displacement of hydraulic motors 23L and 23R can be changed by the equal amount between the right turning case and the left turning case of the vehicle so that the speed of the wheels can be equalized in both turning directions.

Figure 26:
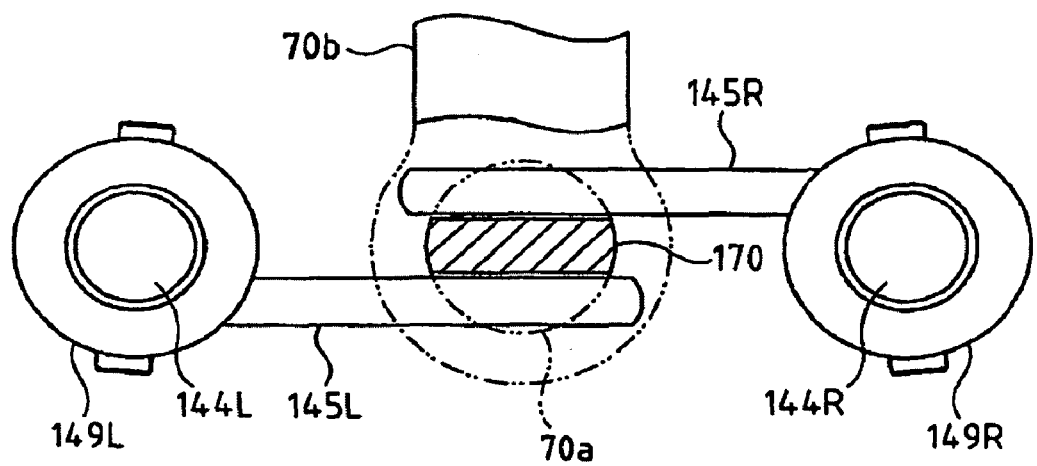
FIG. 26 is a constructive view of another cam mechanism.
Figure 29:
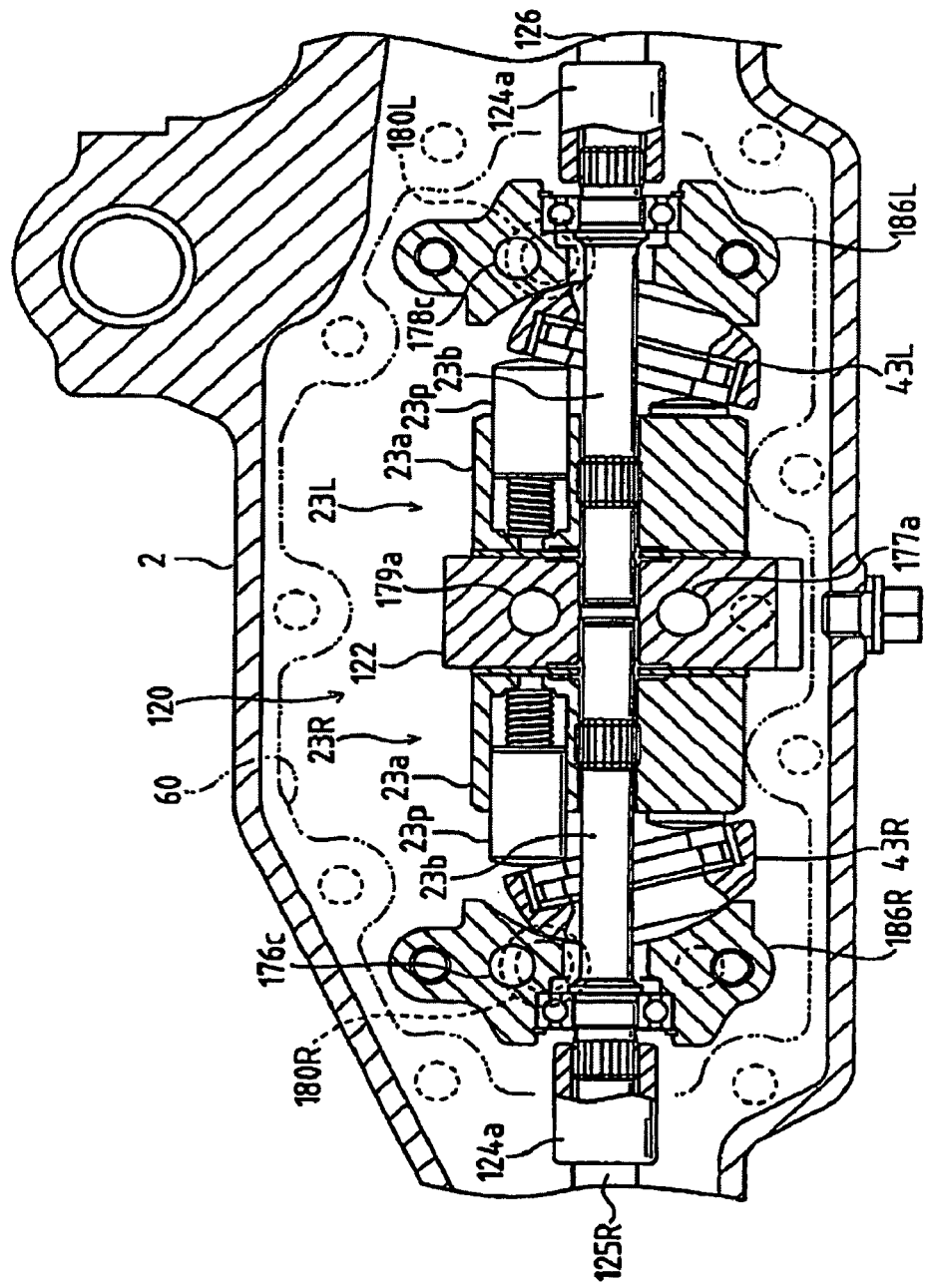
FIG. 29 is a fragmentary sectional front view of a transaxle according to an eighth embodiment.

Alternatively, as shown in FIG. 26, the cam mechanism 70 may have a plane-shaped lever-contacting portion 170 sandwiched between control arms 145L and 145R. In this case, movable swash plates 43L and 43R are disposed substantially in parallel and oil passages 152b and 153b therebetween cross each other, as shown in FIG. 28 (b), instead of the substantially V-shaped arrangement of movable swash plates 43L and 43R as shown in FIG. 28 (a) in the preceding configuration. (cf. FIG. 16).

Furthermore, as shown in FIG. 25, lever-contacting surface 70c is spaced by a predetermined clearance 99 having vertical width L from the top surfaces of control arms 145L and 145R, thereby allowing control arms 145L and 145R to move following the movements of movable swash plates 43L and 43R for adjustment of the initial tilt angles.

Due to clearance 99, the rotation of camshaft arm 70b is not directly transmitted to control arms 145L and 145R, but transmitted thereto after being reduced to some degree corresponding to the vertical width L of clearance 99.

Description of the configuration of hydraulic motors 23L and 23R is over.

The above simple configuration with link 81 and cam mechanism 70 detects the left and right steered angle of one of the travel wheels so as to change displacements of hydraulic motors 23L and 23R. If the vehicle is equipped with transaxle 1 for driving front wheels, the front wheels are accelerated according to the left and right steered angles of the wheels, thereby smoothening turning of the vehicle.

Furthermore, in the above configuration, as shown in FIG. 18, camshaft arm 70b is turned clockwise when the vehicle is turned to the left, for example. In this case, both control arms 145L and 145R are turned to increase the rotation speeds of left and right hydraulic motors 23L and 23R, thereby smoothening turning of the vehicle on a reduced radius circle.

Still further, in the above configuration, control arms 145L and 145R for controlling the tilt angles of movable swash plates of the hydraulic motors are connected via cam mechanism 70 to common link 81 which moves in response to the left and right turning of one of the travel wheels. Cam mechanism 70 is arranged so as to reduce the rotational angles of control arms 145L and 145R by a degree corresponding to the vertical width of clearance 99 (cf. FIG. 25) from the rotational angles thereof just corresponding to the movement of link 81. Therefore, even when the motion of link 81 is large, camshaft arm 70b does not need to be greatly elongated to ensure adequate operation degrees of control arms 145L and 145R for changing the tilt angles of movable swash plates 43L and 43R. In other words, the movement of link 81 can be absorbed by the vertical width L of clearance 99. This configuration has the particular advantage as a measure to solve the problem which arises when the range of movement of link 81 is designed to exceed required operational degree of control arms 145L and 145R.

Next, the steering operation of wheel support units 30L and 30R will be detailed.

As shown in FIG. 15, transaxle 1 comprises: a pair of left and right axles onto which respective travel wheels are attached; a pair of wheel support units 30L and 30R leftwardly and rightwardly steerably supporting the respective axles; and a pair of hydraulic motors 23L and 23R for driving the respective axles. Tie rod 8 is disposed on a proximal side of transaxle 1 in the fore-and-aft direction of the vehicle to interlockingly turnably connect the axles to each other. Hydraulic pipes 155a and 155b for hydraulic motors 23L and 23R are disposed on a distal side of transaxle 1 in the fore-and-aft direction of the vehicle.

Tie rod 8 is pivotally connected to connecting portions 16 and 16 of steerable casings 30b and 30b of respective left and right wheel support units 30L and 30R so as to interlockingly turn wheel casings 30c and 30c, and consequently to interlockingly turn the wheels attached onto the left and right axles. Furthermore, tie rod 8 is horizontally extended in the left-and-right direction under link 81 and cam mechanism 70 so as to be prevented from interfering with link 81 and cam mechanism 70.

According to the above arrangement, the limited space can be effectively used for distributing tie rod 8 and hydraulic pipes 155a and 155b before and behind axle casing 2 without interfering with each other. Furthermore, even if the vehicle has axle casing 2 interfered with by an obstacle ahead thereof, tie rod 8 placed behind axle casing 2 can be prevented from being damaged by the obstacle, thereby ensuring the interlocking steering operation of both left and right wheels. In this way, the steering system is also designed appropriately from the viewpoint of safety.

Furthermore, as shown in FIG. 15, a hydraulic actuator 109 for power steering is provided on either front or rear side of transaxle 1, which may be on either the proximal or distal side in the fore-and-aft direction of the vehicle, so as to be operated by operation of a steering wheel (not shown).

A cylinder 109a of hydraulic actuator 109 is disposed under cam mechanism 70 and pivotally connected to a supporting portion 14 projecting from the rear side of axle casing 2. On the other hand, a rod 109b of hydraulic actuator 109 is pivotally connected to a supporting portion 15 projecting from a rear part of steerable casing 30b of left wheel support unit 30L. Furthermore, hydraulic actuator 109 is horizontally laid under link 81 and cam mechanism 70 so as to be prevented from interfering with link 81 and cam mechanism 70. Alternatively, hydraulic actuator 109 may be placed in front of axle casing 2. In this case, supporting portion 14 may project forward from axle casing 2, and supporting portion 15 may project from a front part of steerable casing 30b.

According to the above-described configuration, hydraulic actuator 109 can be integrally assembled together with transaxle 1, so as to reduce the number of assembly processes required after mounting transaxle 1 on the vehicle, and to improve convenience in handling transaxle 1 as a unit.

Furthermore, as shown in FIG. 15, link 81 and cam mechanism 70 are disposed on the in the proximal side of transaxle 1 in the fore-and-aft direction of the vehicle.

According to this arrangement, even if the traveling vehicle has transaxle 1 interfered with by an obstacle ahead thereof, link 81 and cam mechanism 70 can be undamaged.

Embodiment 8

Description will be given of transaxle 1 according to Embodiment 8.

This is an alternative embodiment using an assembly replacing the assembly of Embodiment 7 with the cover and the hydraulic drive unit.

According to the present embodiment, as shown in FIGS. 29 to 33, a series of oil passages are provided through a cover 91, swash plate supports 186L and 186R and a center section 122. Hydraulic oil is supplied and discharged to and from the passages via connection ports 180L and 180R provided on cover 91.

Figure 31:
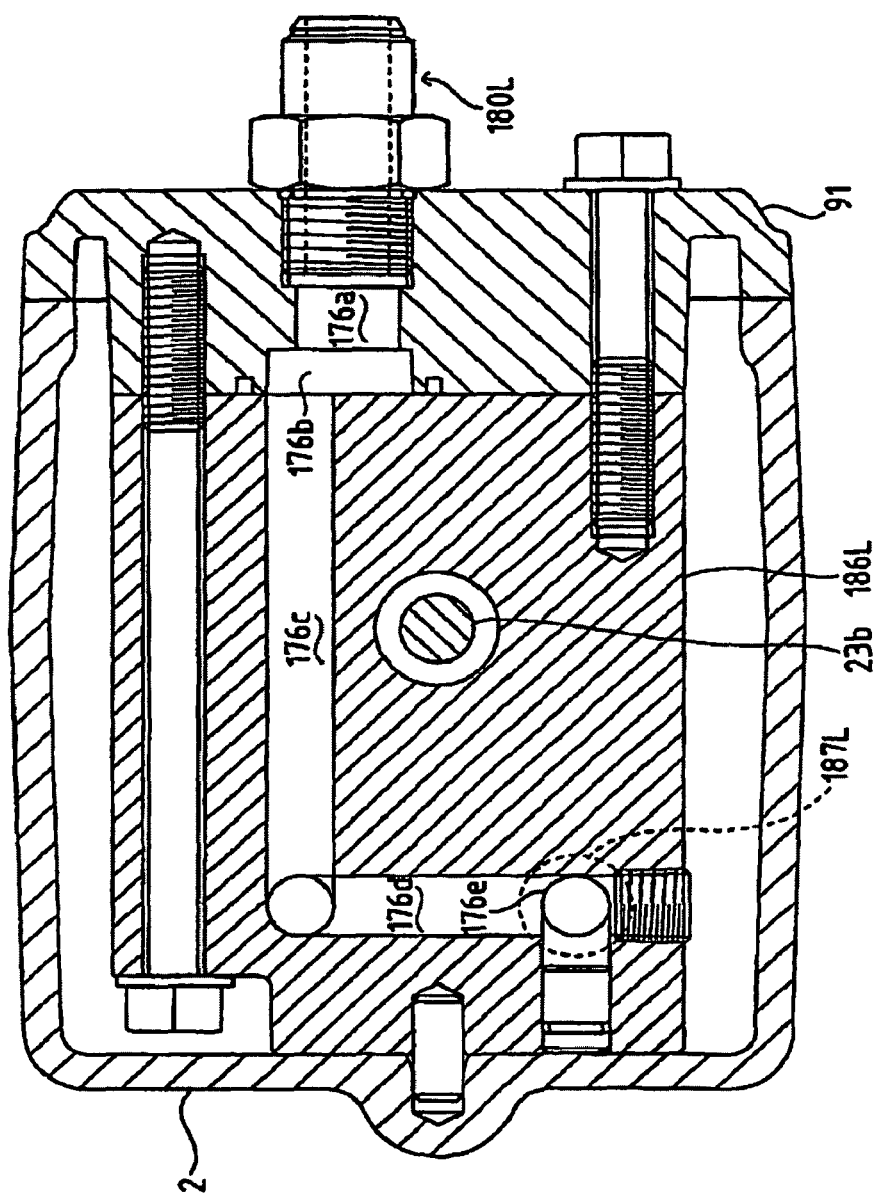
FIG. 31 is a cross sectional view taken along an A-A line of FIG. 30.
Figure 32:
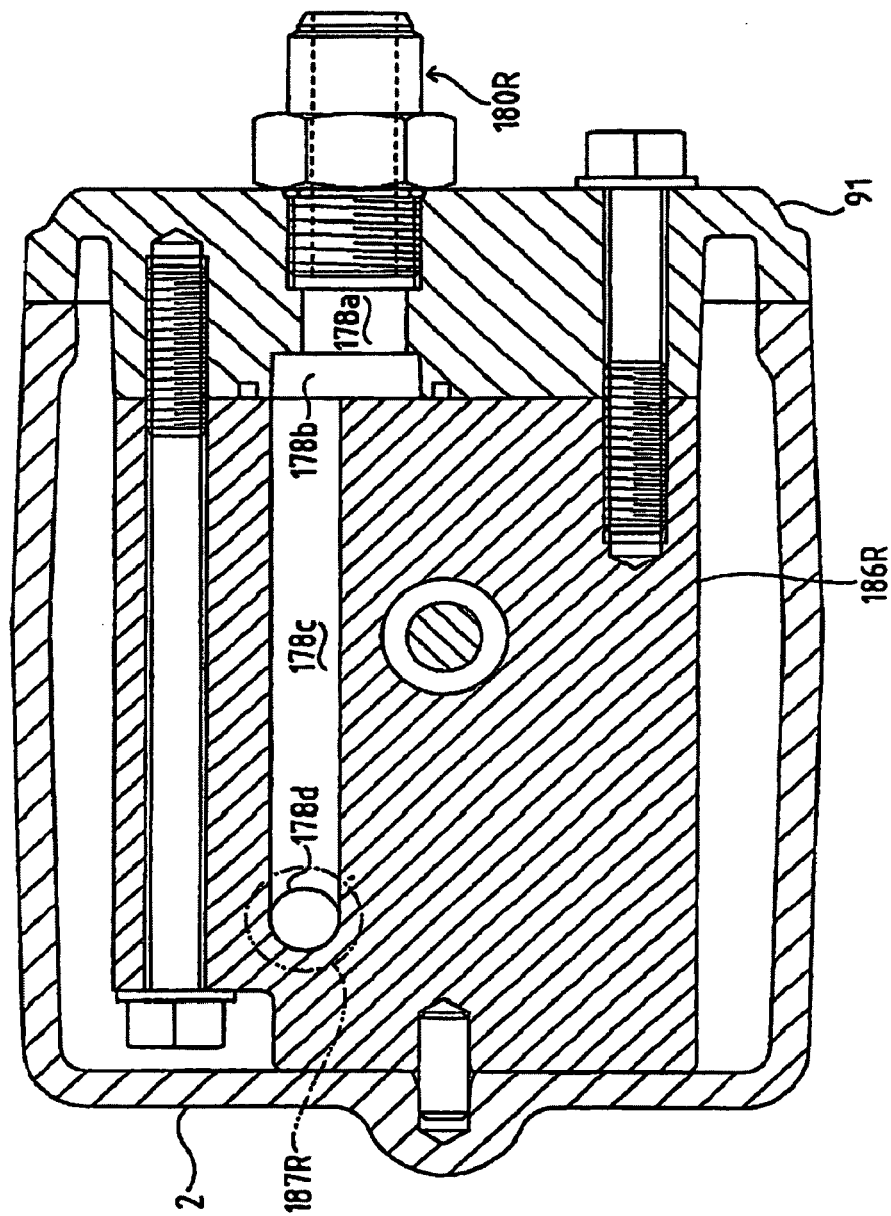
FIG. 32 is a cross sectional view taken along a C-C line of FIG. 30.
Figure 33:
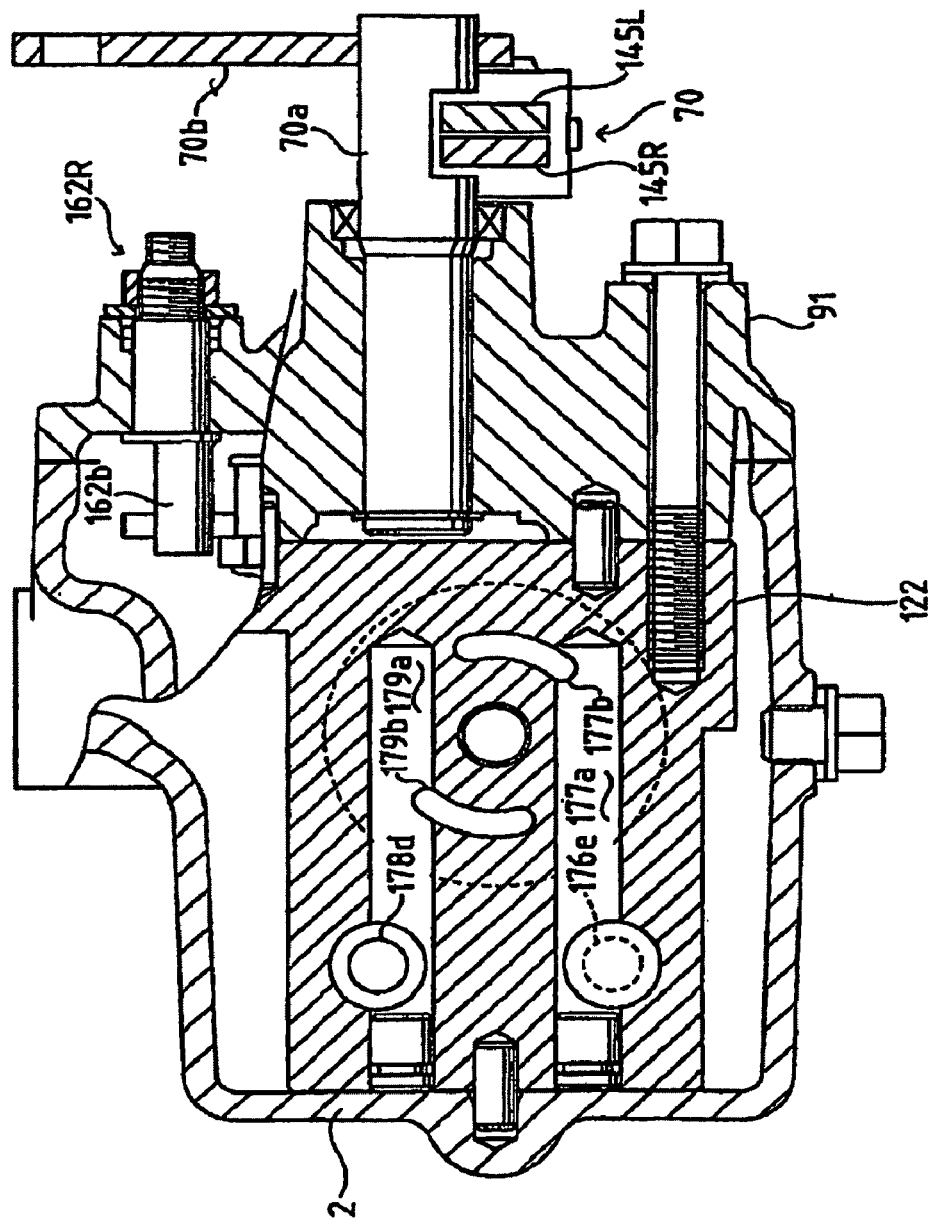
FIG. 33 is a cross sectional view taken along a B-B line of FIG. 30.

As shown in FIGS. 31 and 32, cover 91 is fixed on swash plate supports 186L ad 186R with bolts. Cover 91 is also fixed on center section 122 with a bolt as shown in FIG. 33. In this way, they are united as an assembly.

Figure 30:
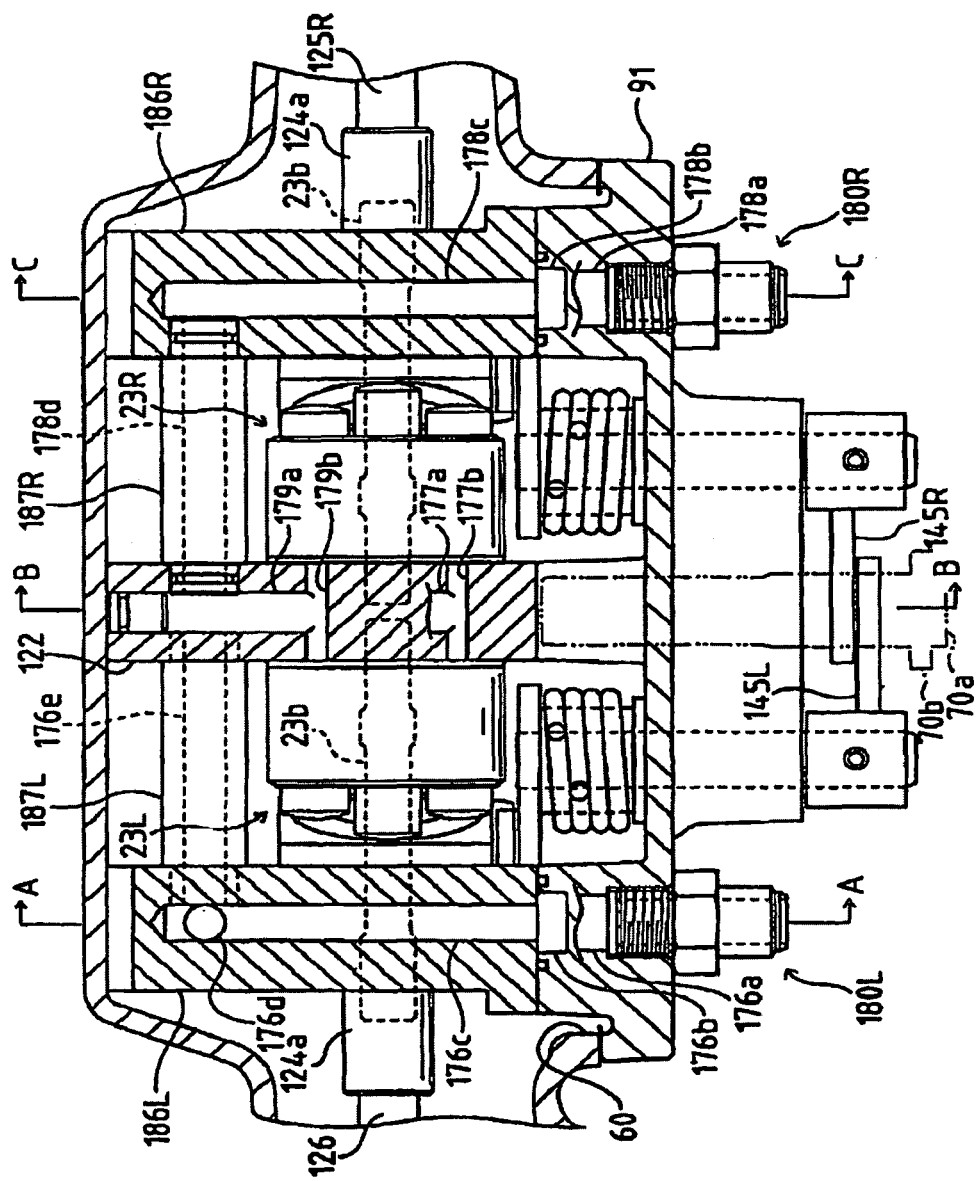
FIG. 30 is a fragmentary sectional plan view of the transaxle.

As shown in FIGS. 29 to 32, connection ports 180L and 180R are provided on cover 91 at positions just backward from respective swash plate supports 186L and 186R (as best shown in FIG. 30). In cover 91, oil passages 176a and 176b are serially extended to the rear end surface of swash plate support 186L, and oil passages 178a and 178b to the rear end surface of swash plate support 186R. An oil passage 176c is formed in swash plate support 186L to be connected to oil passage 176b, and an oil passage 178c in swash plate support 186R to be connected to oil passage 178b.

A connecting member 187L, formed therethrough with an oil passage 176e, is provided between left swash plate support 186L and center section 122 (see FIG. 30), and a connecting member 187R, formed therethrough with an oil passage 178d, is provided between right swash plate support 186R and center section 122.

Left swash plate support 186L is formed therein with an oil passage 176d, extended downward from the front end of oil passage 176c and connected at the bottom end thereof to oil passage 176e provided in connecting member 187L.

On the other hand, in right swash plate support 186R, oil passage 178c is connecting at the front end thereof to oil passage 178d provided in connecting member 187R.

In center section 122, as shown in FIGS. 30 and 33, parallel separate oil passages 177a and 179a are extended in the fore-and-aft direction, and parallel oil passages 177b and 179b are extended in the left-and-right direction in connection with respective oil passages 177a and 179a. Oil passages 177b and 179b have openings at left and right side surfaces of center section 122 for slidable-fitting of respective cylinder blocks 23a and 23a so as to serve as mutually separate kidney (supply/discharge) ports.

In this way, connection port 180L is led into oil passages 177a and 177b in center section 122 via the series of oil passages 176a to 176e, and connection port 180R is led to oil passages 179a and 179b in center section 122 via the series of oil passages 178a to 178d.

Connection ports 180L and 180R are connected to respective hydraulic oil pipes so that one of connection ports 180L and 180R is provided for supplying hydraulic oil, and the other for discharging hydraulic oil, so as to drive hydraulic motors 23L and 23R.

The different point of this configuration from the preceding Embodiment 7 is the connection of hydraulic pipes to cover 91, thereby positioning piping parts behind transaxle 1. This has the great advantage of reducing the piping lengths, in particular, in the case where the hydraulic oil source, such as a hydraulic pump, is disposed on the cover 91 side. Furthermore, the piping parts disposed behind axle casing 2 can be undamaged even if transaxle 1 is interfered with by an obstacle ahead thereof.

Furthermore, since there is no piping part disposed on the front side of transaxle 1, the fore-and-aft dimension occupied by transaxle 1 can be reduced so as to minimize entire transaxle 1.

Embodiment 9

Description will be given of transaxle 1 according to Embodiment 9.

This is an alternative embodiment for the assembly according to Embodiment 8 with a cover and a hydraulic drive unit.

Figure 34:
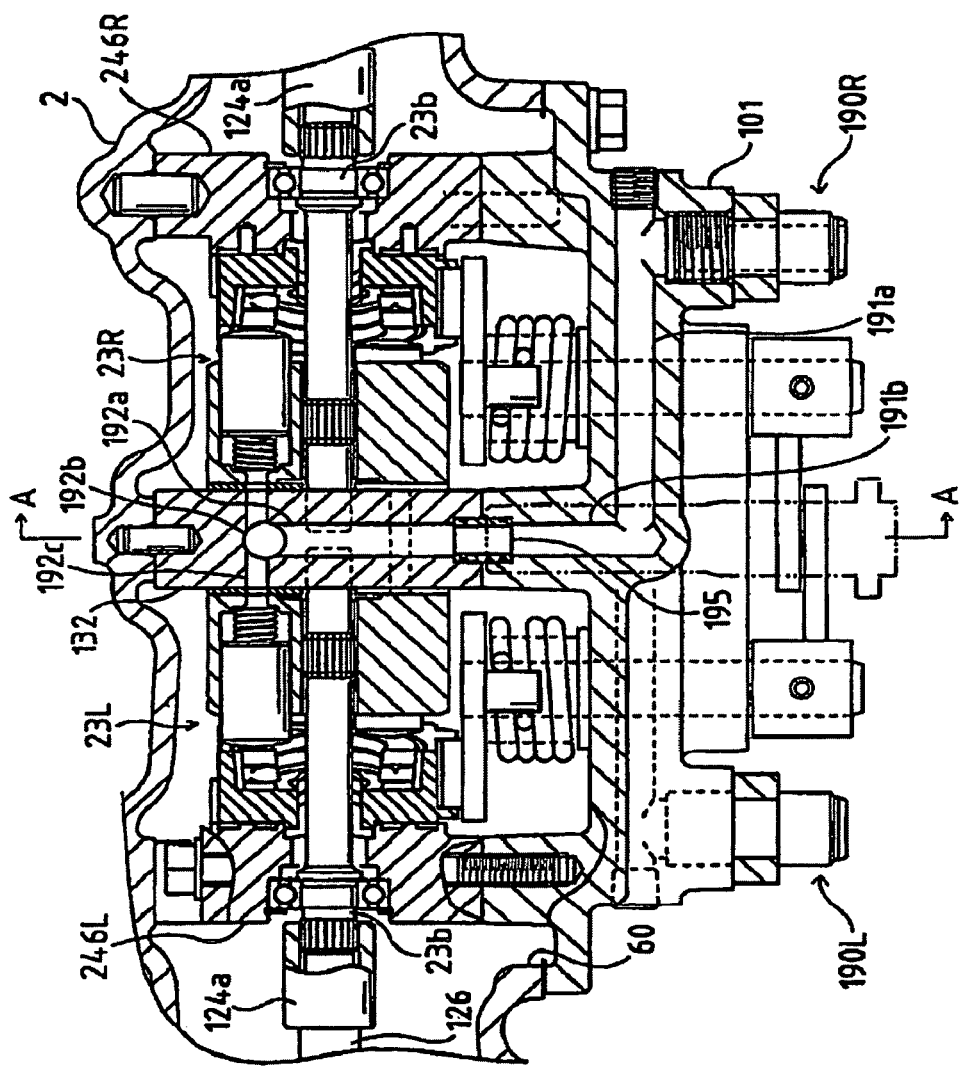
FIG. 34 is a sectional rear view of a part of a transaxle according to a ninth embodiment showing a hydraulic drive unit therein.
Figure 35:
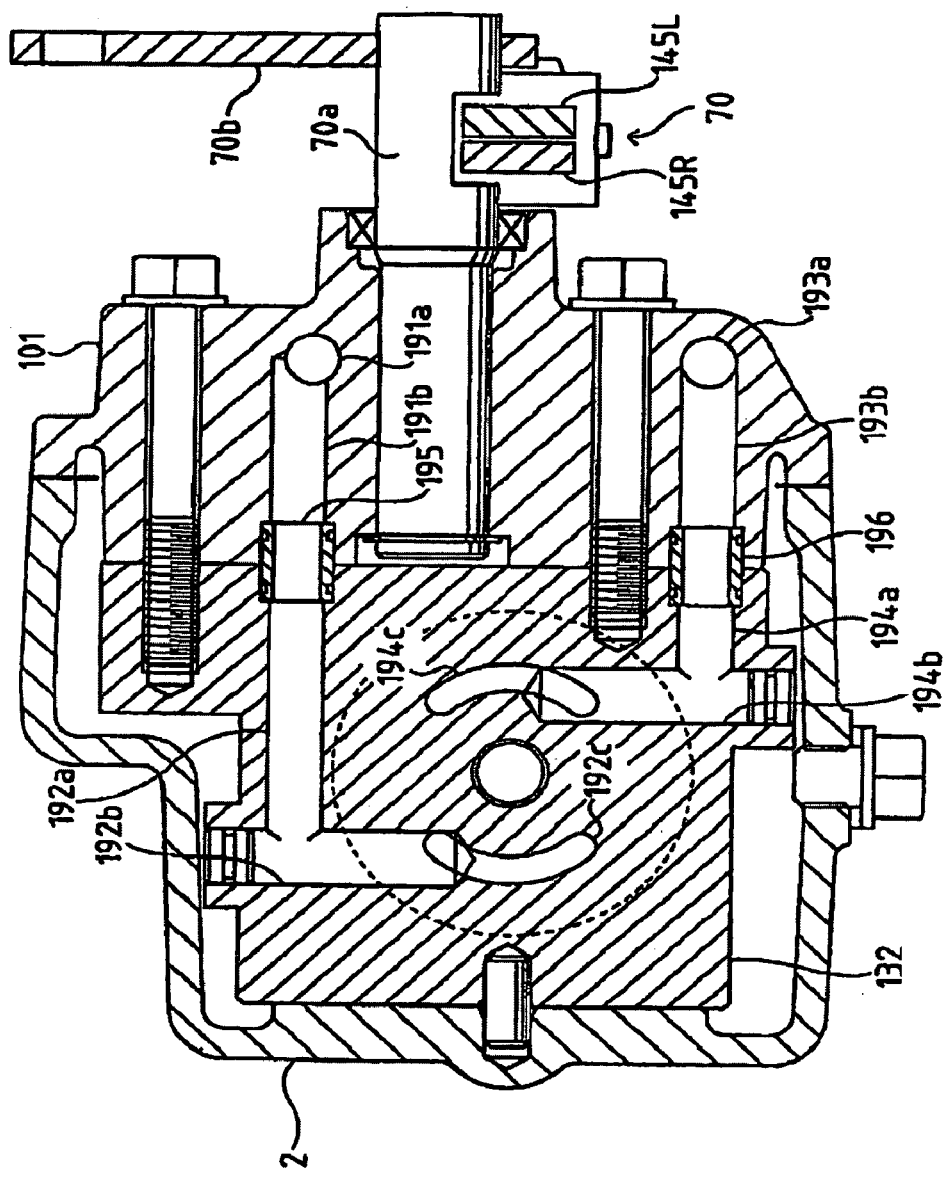
FIG. 35 is a cross sectional view taken along an A-A line of FIG. 34.
Figure 36:
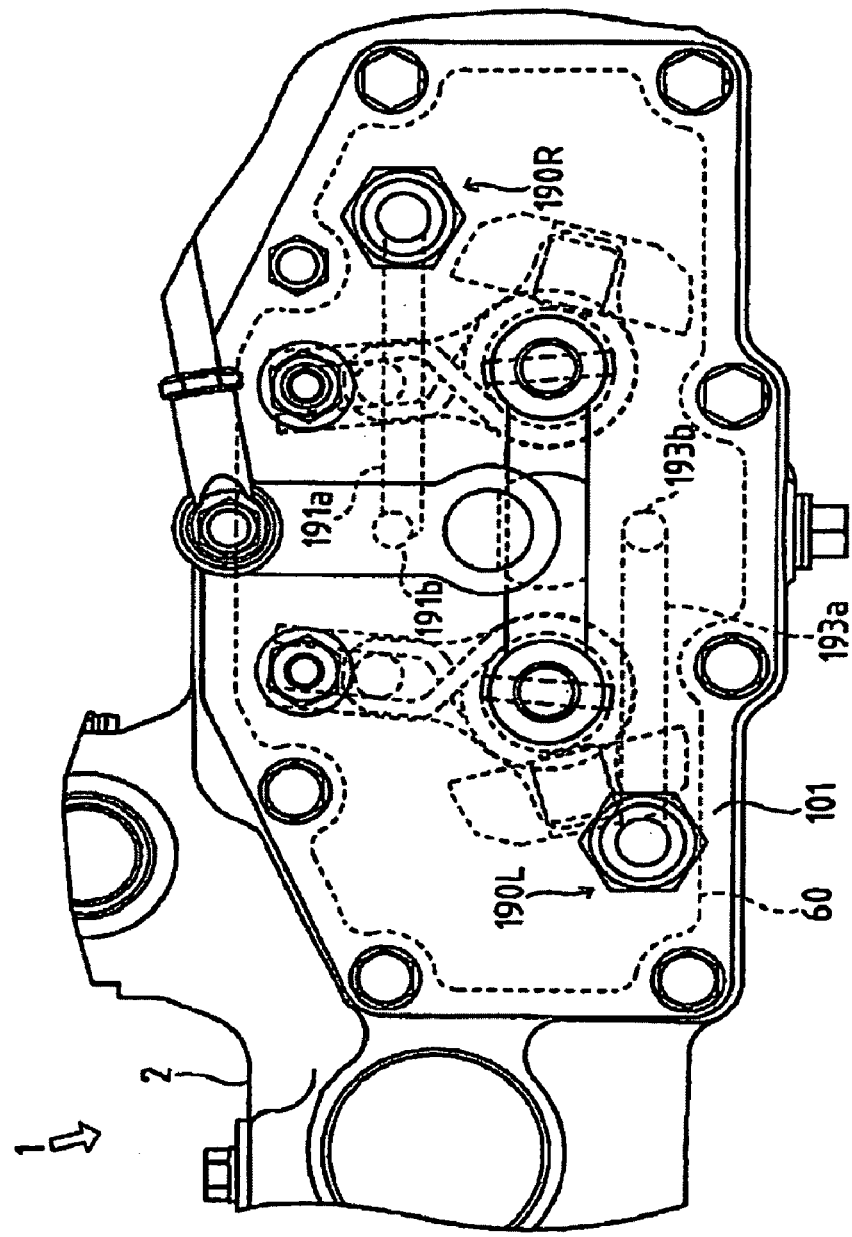
FIG. 36 is a rear view of a part of the transaxle according to the ninth embodiment showing a cover thereon.

As shown in FIGS. 34 to 36, axle casing 2 has opening 60 on a proximal side thereof in the fore-and-aft direction of the vehicle. Axle casing 2 is formed therein with a pair of oil passages 192a and 192b and a pair of oil passages 194a and 194b, which are connected to respective supply/discharge ports (respective oil passages 192c and 194c) for hydraulically connecting hydraulic motors 23L and 23R to each other, and hydraulically connecting through cover 101 to a hydraulic oil source such as a hydraulic pump.

In the present embodiment, a series of oil passages are formed through cover 101 and a center section 132, and supply and discharge hydraulic oil via connection ports 190L and 190R provided on cover 101.

As shown in FIG. 34, cover 101 is fixed onto swash plate supports 246L and 246R with bolts, and as shown in FIG. 35, cover 101 is also fixed onto center section 132 with bolts. In this way, they are united as an assembly.

As shown in FIG. 36, connection ports 190L and 190R provided on cover 101 are vertically offset from each other with center section 132 at the left-and-right center therebetween. Cover 101 is formed therein with an oil passage 191a extended leftward from right connection port 190R, and an oil passage 191b extended from a left end of oil passage 191a toward center section 132. Cover 101 is also formed therein with an oil passage 193a extended rightward from left connection port 190L, and an oil passage 193b extended from a right end of oil passage 193a toward center section 132.

As shown in FIG. 35, center section 132 has a surface contacting cover 101, and is formed therein with parallel separate oil passages 192a and 194a extending forward from the surface contacting cover 101. In this regard, oil passages 192a and 194a are connected to respective oil passages 191b and 193b in cover 101 via respective seal pipes 195 and 196. Seal pipes 195 and 196 also serve as members for positioning cover 101 relative to center section 132.

Furthermore, in center section 132, oil passage 192b is extended downward from a front end of oil passage 192a, and oil passage 194b is extended upward from a front end of oil passage 194a. Oil passages 192c and 194c connected to respective oil passages 192b and 194b are disposed in parallel in the left-and-right direction. Oil passages 192c and 194c are open at left and right side surfaces of center section 132 slidably contacting respective cylinder blocks 23a and 23a so as to serve as mutually separate kidney (supply/discharge) ports.

In this way, connection port 190R is led to oil passages 192a, 192b and 192c in center section 132 via oil passages 191a and 191b and seal pipe 195. Connection port 190L is led to oil passages 194a, 194b and 194c in center section 132 via oil passages 193a and 193b and seal pipe 196.

Hydraulic pipes are connected to respective connection ports 190L and 190R so as to supply hydraulic oil supplied via one of connection ports 190L and 190R and discharge hydraulic oil via the other port 190R or 190L, thereby driving hydraulic motors 23L and 23R.

The different point of the present configuration from the above Embodiment 7 is the connection of pipes to cover 101 such as to position piping parts behind transaxle 1. This arrangement has the great advantage of reducing the piping lengths, in particular, in the case where a hydraulic pump is disposed on the cover 101 side.

Furthermore, since there is no piping part disposed on the front side of transaxle 1, the fore-and-aft dimension occupied by transaxle 1 can be reduced so as to minimize entire transaxle 1. Still further, the piping parts disposed behind axle casing 2 are undamaged even if transaxle 1 is interfered with by an obstacle ahead thereof.

Furthermore, since the oil passages for connecting hydraulic pipes to center section 132 are concentrated within cover 101, swash plate supports 246L and 246R can be simplified with no oil passage therein, so as to reduce the fore-and-aft width of hydraulic drive unit 120 and minimize entire transaxle 1.

In the above-described configuration, oil passages 192a and 194a are hydraulically connected to the hydraulic oil source via oil passages 191a and 191b and oil passages 193a and 193b formed in cover 101. Alternatively, for example, oil passages 192a and 194a of center section 132 may be extended to a distal outside of axle casing 2 in the fore-and-aft direction so as to be hydraulically connected to a hydraulic oil source.

Embodiment 10

Description will be given of transaxle 1 according to Embodiment 10, which is any of those shown in Embodiments 7 to 9, equipped on a four-wheel drive vehicle.

Figure 37:
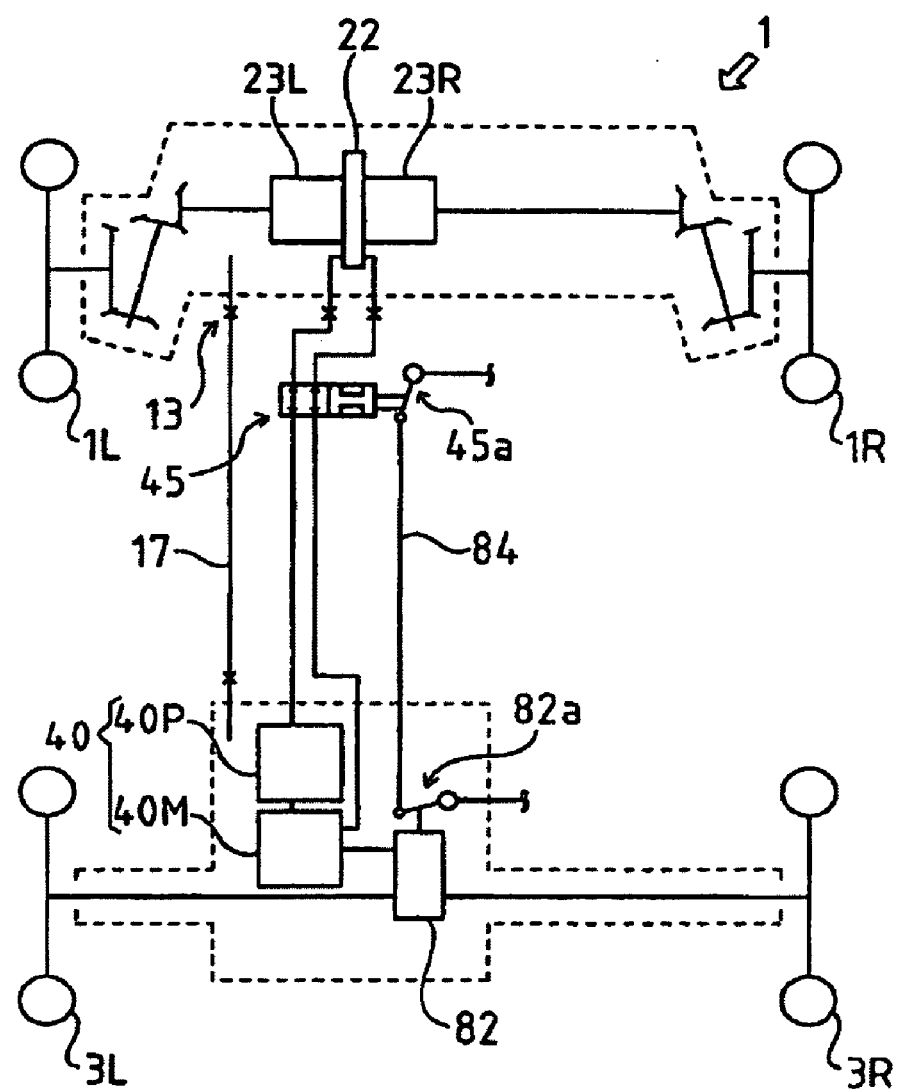
FIG. 37 is a hydraulic circuit diagram of a drive system of a vehicle according to a tenth embodiment.

As shown in FIG. 37, the four-wheel drive vehicle is provided with transaxle 1 for driving and steering front wheels, and with rear transaxle 3 for driving rear wheels.

Rear transaxle 3 is provided therein with an HST 40 (hydrostatic stepless transmission). HST 40 includes variable displacement hydraulic pump 40P, which receives power from the engine (not shown), and fixed displacement hydraulic motor 40M, which is driven by hydraulic oil supplied from hydraulic pump 40P. A gear type secondary transmission 82 is disposed on the output side of HST 40 and on the upstream of mechanical differential gears differentially connecting the rear wheels, so as to selectively set either high or low travel speed mode of the vehicle.

Furthermore, hydraulic oil supplied from hydraulic pump 40P of HST 40 is supplied via control valve 45 to transaxle 1 on the front wheel side, so as to drive hydraulic motors 23L and 23R in transaxle 1, then returned to rear transaxle 3 to drive hydraulic motor 40M, and sucked into hydraulic pump 40P. Such a serial circuit establishes the four-wheel drive of the vehicle.

Furthermore, an operation portion 45a of control valve 45 is connected via link 84 to a clutch operation portion 82a of secondary transmission 82 so that control valve 45 and second transmission 82 are interlockingly operated by operating either operation portion 45a or 82a.

When the four-wheel drive vehicle is set into the high travel speed mode, secondary transmission 82 is put in a high-speed gear mode, and simultaneously, control valve 45 is closed to prevent hydraulic oil from being supplied to transaxle 1 so as to set the vehicle into a two-wheel drive mode, where only rear wheels 3L and 3R are driven at high speed.

On the other hand, when the four-wheel drive vehicle is switched into the low travel speed mode, control valve 45 is opened to supply hydraulic oil to transaxle 1 so as to set the vehicle into a four-wheel drive mode where front wheels 1L and 1R and rear wheels 3L and 3R are driven at low speed.

Due to the above configuration of the four-wheel drive vehicle, when the vehicle does not require high torque during unloaded travel, light-loaded traction or the like, the vehicle can be set into the high travel speed mode, i.e., two-wheel drive mode, so as to save power loss from supplying hydraulic oil to the front wheels. When the vehicle requires high torque during working travel, heavy-to-light-loaded traction or the like, the vehicle is set into the low travel speed mode, i.e., four-wheel drive mode, so as to correspond to the load on the vehicle.

Any interlocking operation between control valve 45 and secondary transmission 82, as well as the above-described interlocking mechanism with link 84, may be appreciated. For example, control valve 45 may be operated with the aid of a sensor which electrically monitors the position of a gearshift lever of secondary transmission 82 operated by an operator, or may also be operated corresponding to a travel speed of the vehicle detected by a vehicle speed sensor.

Embodiment 11

Description will be given of transaxle 1 according to Embodiment 11, in which transaxle 1 is provided with an alternative hydraulic drive unit 220.

Figure 38:
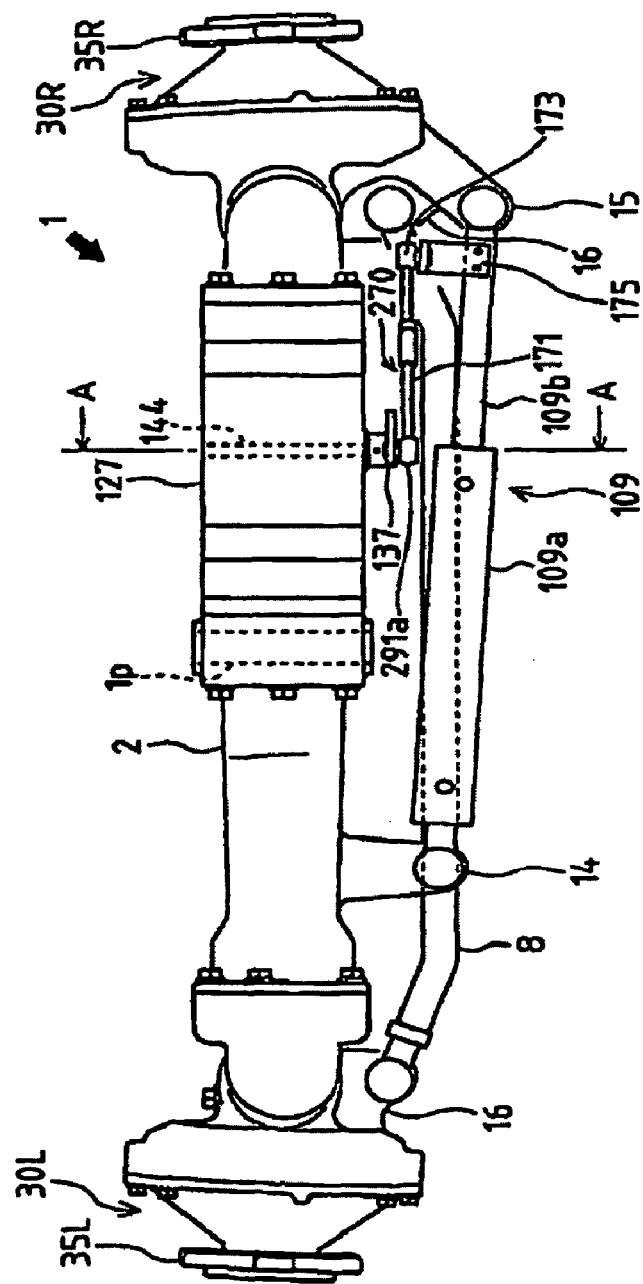
FIG. 38 is a plan view of a transaxle according to an eleventh embodiment.
Figure 39:
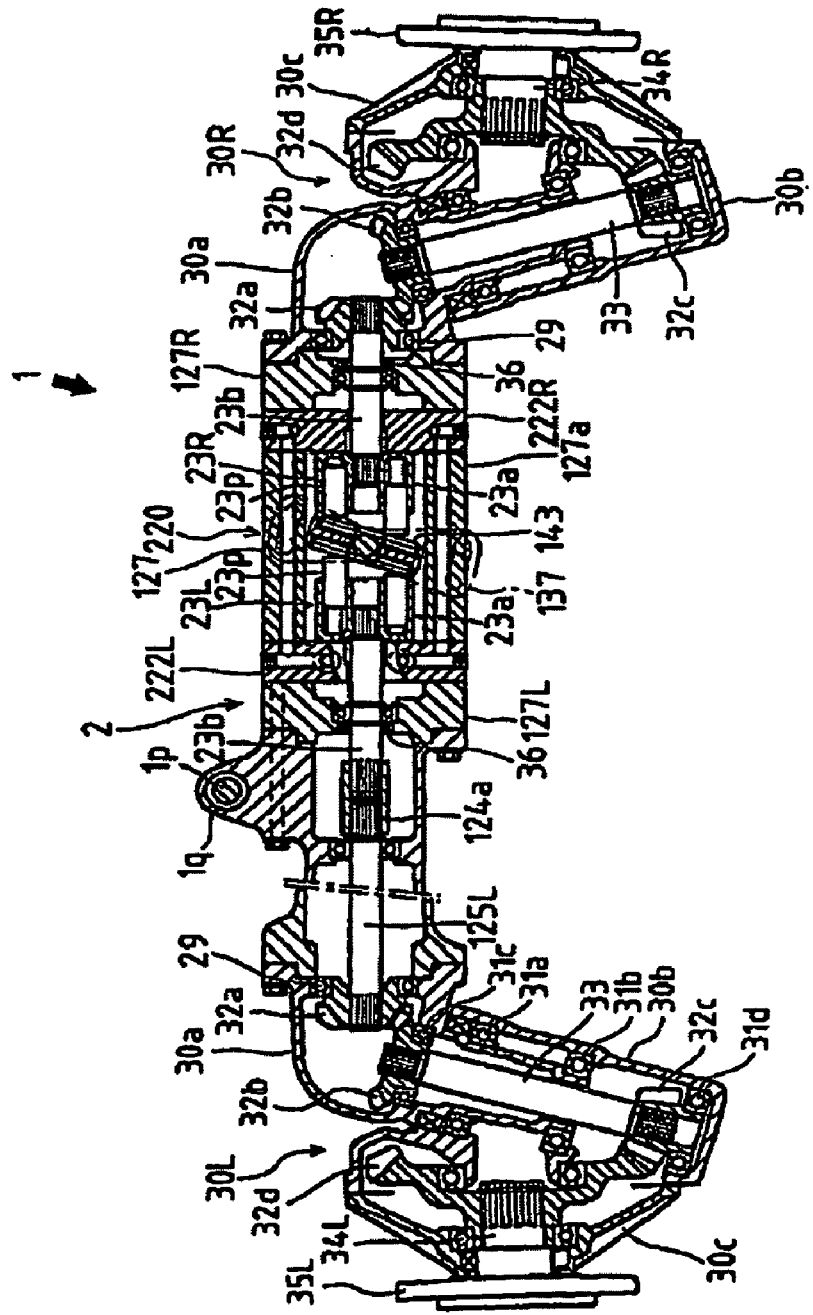
FIG. 39 is a sectional rear view of the transaxle.

As shown in FIG. 38, transaxle 1 comprises axle casing 2, left and right wheel support units 30L and 30R, a motor housing 127, an interlocking mechanism 270, and hydraulic actuator 109. Wheel support units 30L and 30R are disposed on left and right sides of axle casing 2 and steerably interlocked with each other via tie rod 8. Motor housing 127 contains hydraulic drive unit 220 including two variable displacement hydraulic motors 23L and 23R (FIG. 39). Interlocking mechanism 270 is provided for controlling the tilt angles of the swash plates of variable displacement hydraulic pumps 23L and 23R. Hydraulic actuator 109 is provided for inputting the steered angles of wheel support units 30L and 30R.

As shown in FIGS. 38 and 39, wheel support units 30L and 30R, mutually steerably interlocked via tie rod 8, are disposed on the left and right sides of axle casing 2. Hydraulic actuator 109 is worked by steering operation so as to change angles of unshown wheels supported by wheel support units 30L and 30R.

Cylinder 109a of hydraulic actuator 109 is pivotally supported by a support portion 14 projecting backward from axle casing 2, and rod 109b of hydraulic actuator 109 is pivotally supported at a tip thereof by a support portion 15 projecting from the rear part of right wheel support unit 30R. As hydraulic oil is supplied to cylinder 109a by steering operation, rod 109b expands and contracts to turn wheel support unit 30R.

Furthermore, rod 109b is connected to interlocking mechanism 270 so as to change tilt angles of the movable swash plates included in hydraulic drive unit 220, so that expansion and contraction of rod 109b of hydraulic actuator 109 by steering operation changes angles of wheel support units 30L and 30R and tilt angles of the movable swash plates.

With respect to left and right wheel support units 30L and 30R, connecting portions 16 and 16 provided on steerable casings 30b and 30b are pivotally connected to opposite ends of tie rod 8, so that left and right axle casings 30c and 30c having respective axles are turned, thereby turning the travel wheels attached to the left and right axles.

Furthermore, to prevent tie rod 8 from interfering with hydraulic actuator 109 and interlocking mechanism 270, connecting portions 16 and 16, to which tie rod 8 is pivotally connected, are disposed lower than support portions 14 and 15, to which hydraulic actuator 109 is pivotally connected, so that tie rod 8 is laterally spanned lower than hydraulic actuator 109 and interlocking mechanism 270.

In this way, a limited space is effectively used for arranging tie rod 8. Further, tie rod 8 disposed behind axle casing 2 is undamaged even if axle casing 2 on a vehicle is interfered with by an obstacle ahead thereof. Thus, this configuration is appreciated from the viewpoint of safety.

As shown in FIG. 39, motor shaft 23b of hydraulic motor 23L, disposed in the left side portion of hydraulic drive unit 220, is interlockingly connected to left axle drive shaft 125L via a spline sleeve 124a, so as to transmit driving force via axle drive shaft 125L to wheel support unit 30L, thereby driving wheel-hub disk 35L.

On the other hand, motor shaft 23b of hydraulic motor 23R, disposed in the right side portion of hydraulic drive unit 220, is directly interlockingly connected to wheel support unit 30R, so as to drive wheel-hub disk 35R.

Each of left and right motor shafts 23b and 23b is rotatably supported by bearing 29 fitted in an end portion of each of left and right wall members 127L and 127R, serving as left and right side walls of motor housing 127. Further, sealing member 36 is filled in a gap between axle casing 2 and each of motor shafts 23b and 23b so as to seal gear casing 30a of each of wheel support units 30L and 30R off from motor housing 127 containing hydraulic drive unit 220.

The structure of hydraulic drive unit 220 will be described.

Figure 40:
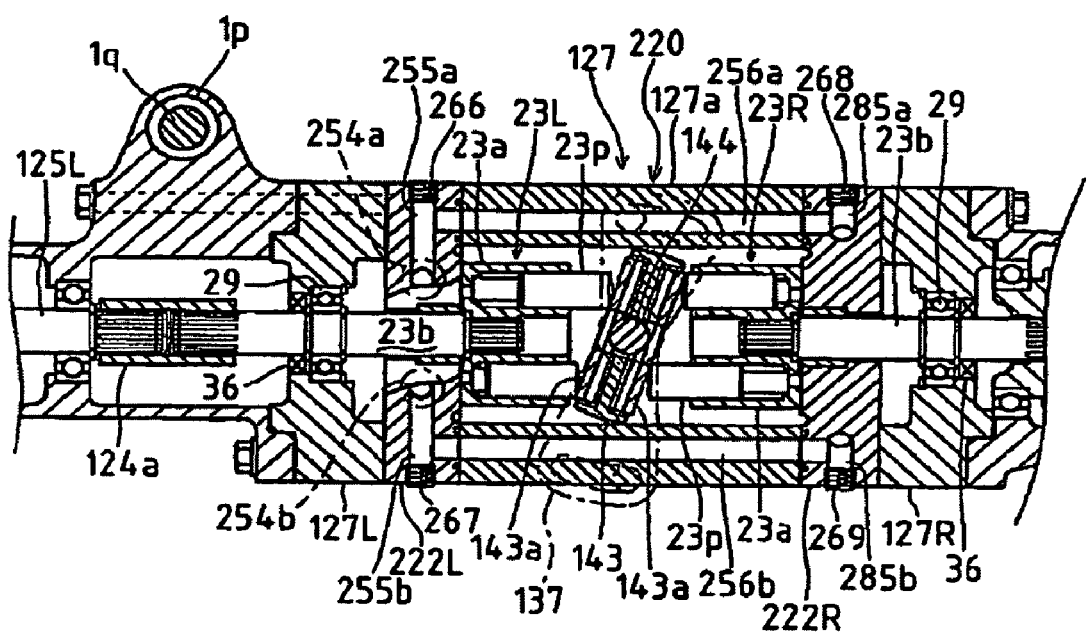
FIG. 40 is an enlarged fragmentary sectional rear view of the transaxle.

As shown in FIGS. 39 and 40, hydraulic drive unit 220 is structured as an assembly, which is contained in motor housing 127 in the rightward portion of axle casing 2, and is enclosed by wall members 127L and 127R.

Figure 45:
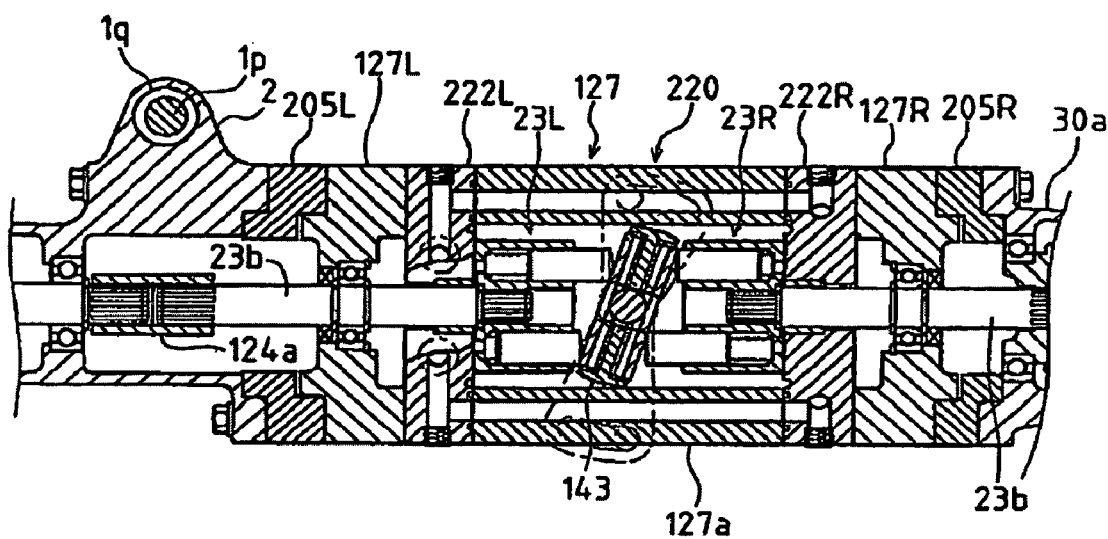
FIG. 45 is a sectional rear view of an axle casing.

Furthermore, as shown in FIG. 45, a spacer 205L can be interposed between left wall member 127L and axle casing 2, and a spacer 205R can be interposed between right wall member 127R and gear casing 30a of right wheel support unit 30R, so that the width of axle casing 2 can be increased or decreased depending upon whether spacer 205L or 205R is interposed or not, thereby changing wheel tracks as desired. Therefore, vehicles having various treads can be provided to meet demands, thereby expanding the purposes of the vehicles.

Motor housing 127 is constructed of left and right wall members 127L and 127R and a surrounding cylindrical wall member 127a formed between left and right wall members 127L and 127R, so as to form a space therein for containing the pair of hydraulic motors 23L and 23R.

Center sections 222L and 222R, formed therein with oil passages for supplying hydraulic oil to the pair of hydraulic motors 23L and 23R, are disposed on the insides of left and right wall members 127L and 127R, and hydraulic motors 23L and 23R are disposed left and right on the insides of center sections 222L and 222R. Furthermore, a movable swash plate 143 is disposed in the center portion of motor housing 127 so as to be sandwiched between left and right hydraulic motors 23L and 23R.

Movable swash plate 143 has thrust bearings 143a and 143a on opposite left and right surfaces, and has a center portion fixedly penetrated by a control shaft 144 extended in the fore-and-aft direction so as to be interlockingly turned integrally with control shaft 144.

Axial piston-type variable displacement hydraulic motors 23L and 23R are configured as follows. Left and right center sections 222L and 222R are disposed on opposite ends of hydraulic motors 23L and 23R. Cylinder blocks 23a and 23a of hydraulic motors 23L and 23R are slidably attached on respective motor attachment surfaces of center sections 222L and 222R. Cylinder blocks 23a and 23a have pistons 23p, 23p, . . . reciprocally provided therein. The reciprocating strokes of pistons 23p, 23p, . . . can be adjusted by movable swash plate 143. Motor shafts 23b and 23b are non-relatively rotatably engaged with cylinder blocks 23a and 23a, so as to serve as output shafts.

A control arm 137, fitted onto control shaft 144 fixed to the center portion of movable swash plate 143, is turned via a later-discussed interlocking mechanism 270, so as to change the tilt angle of movable swash plate 143, thereby changing rotational speeds of motor shafts 23b and 23b for accelerating or decelerating the travel wheels (not shown) in correspondence to change of the tilt angle of movable swash plate 143.

Figure 43:
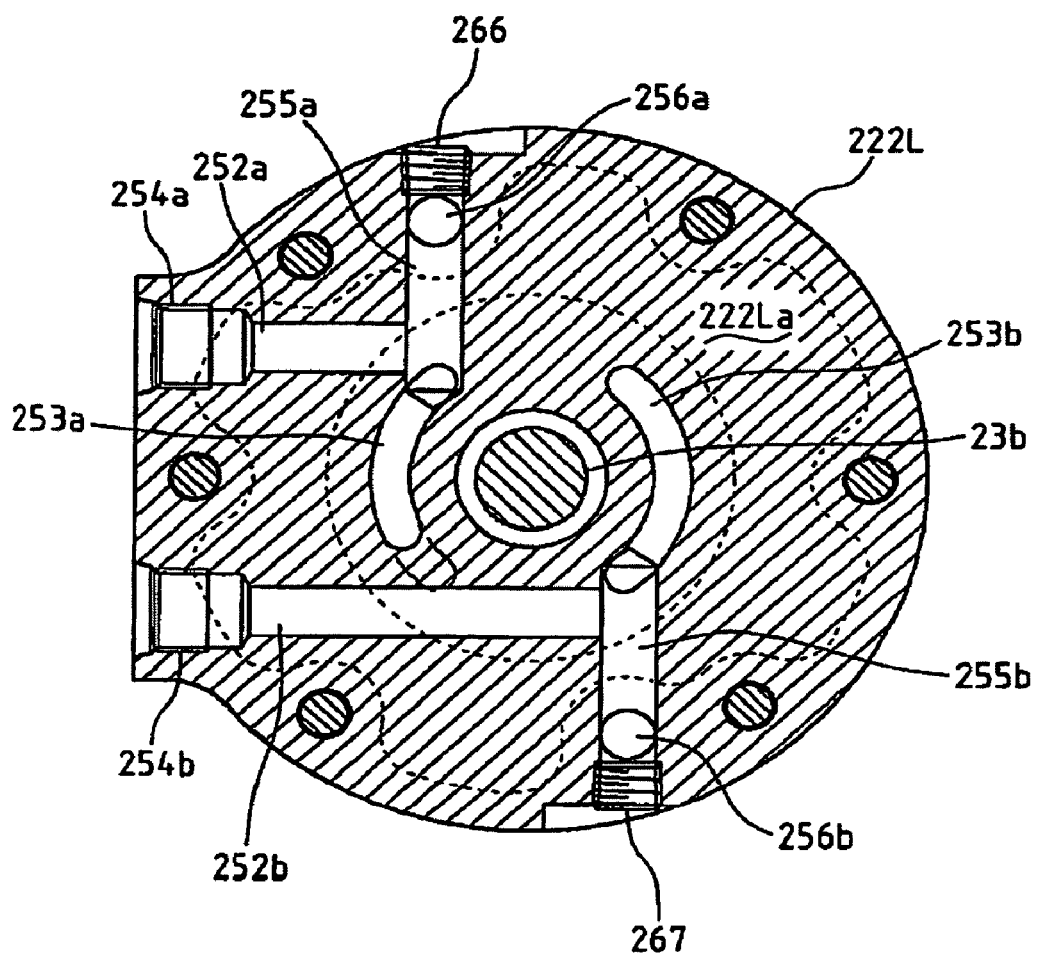
FIG. 43 is a sectional view of a left center section.

Furthermore, as shown in FIGS. 40 and 43, one of left and right center sections (in this embodiment, left center section) 222L is provided thereon with parallel upper and lower pipe ports 254a and 254b to be connected to external hydraulic pipes. Center section 222L is also formed therein with parallel upper and lower separate oil passages 252a and 252b.

Of oil passages 252a and 252b, upper oil passage 252a is connected to a vertical oil passage 255a, which is connected at its lower portion to a kidney port (supply/discharge port) 253a formed in a motor attachment surface 222La of center section 222L. The upper portion of oil passage 255a is plugged with a plugging screw 266, such as a setscrew, and connected to a left-and-right oriented oil passage 256a leading to an oil passage 285a formed in the other center section 222R.

On the other hand, of oil passages 252a and 252b, lower oil passage 252b is connected to a vertical oil passage 255b, which is connected at its upper portion to a kidney port (supply/discharge port) 253b formed in a motor attachment surface 222La. The lower portion of oil passage 255b is plugged with a plugging screw 267, and connected to a left-and-right oriented oil passage 256b. The upper portion of oil passage 255b is connected to kidney port 254b.

Figure 44:
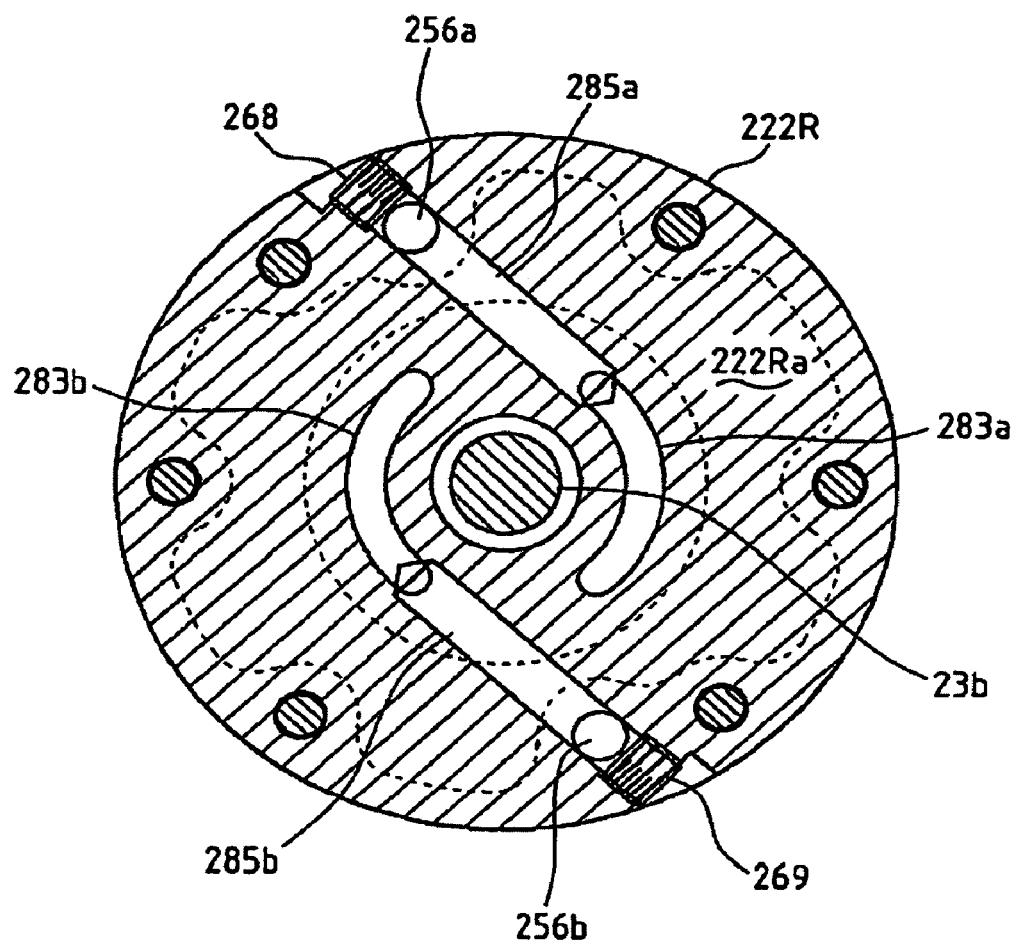
FIG. 44 is a sectional view of a right center section.

Furthermore, as shown in FIG. 44, the other of the left and right center sections (in this embodiment, right center section) 222R is formed therein with oil passage 285a, which is connected to oil passage 256a and plugged with a plugging screw 268 at its upper portion. Oil passage 285a is extended diagonally downward and forward, and connected at its lower portion to a kidney port 283a formed in a motor attachment surface 222Ra of center section 222R. Center section 222R is also formed therein with oil passage 285b, which is connected to oil passage 256b and plugged with a plugging screw 269 at its lower portion. Oil passage 285b is extended diagonally upward and backward, and connected at its upper portion to a kidney port 283b formed in motor attachment surface 222Ra.

In the above oil passage arrangement, hydraulic oil introduced through pipe port 254a is supplied through kidney port 253a to hydraulic motor 23L, thereby driving hydraulic motor 23L. Simultaneously, hydraulic oil is supplied via oil passage 256a to the other center section 222R, so as to be supplied to hydraulic motor 23R through kidney port 283a, thereby driving hydraulic motor 23R. Hydraulic oil supplied into hydraulic motor 23R is returned via oil passages 285b and 256b to center section 222L. Then, the hydraulic oil is discharged from hydraulic motor 23L through kidney port 253b and from hydraulic motor 23R through kidney port 283b, and discharged via oil passage 252b and pipe port 254b to the outside of transaxle 1.

Alternatively, the above-mentioned oil flow direction may be reversed. In this case, lower pipe port 254b serves as a suction port, and upper pipe port 254a serves as a delivery port. Further alternatively, the oil passages arrangement may be exchanged between the left and right center sections.

When the cylinder blocks are slidably attached on the attachment surfaces of the center sections, the supply/discharge ports of the hydraulic motors are brought into parallel connection to each other. Therefore, the total displacement of left and night motors, determined by the tilt angle of movable swash plate 143, becomes the overall motor displacement of the transaxle.

Figure 41:
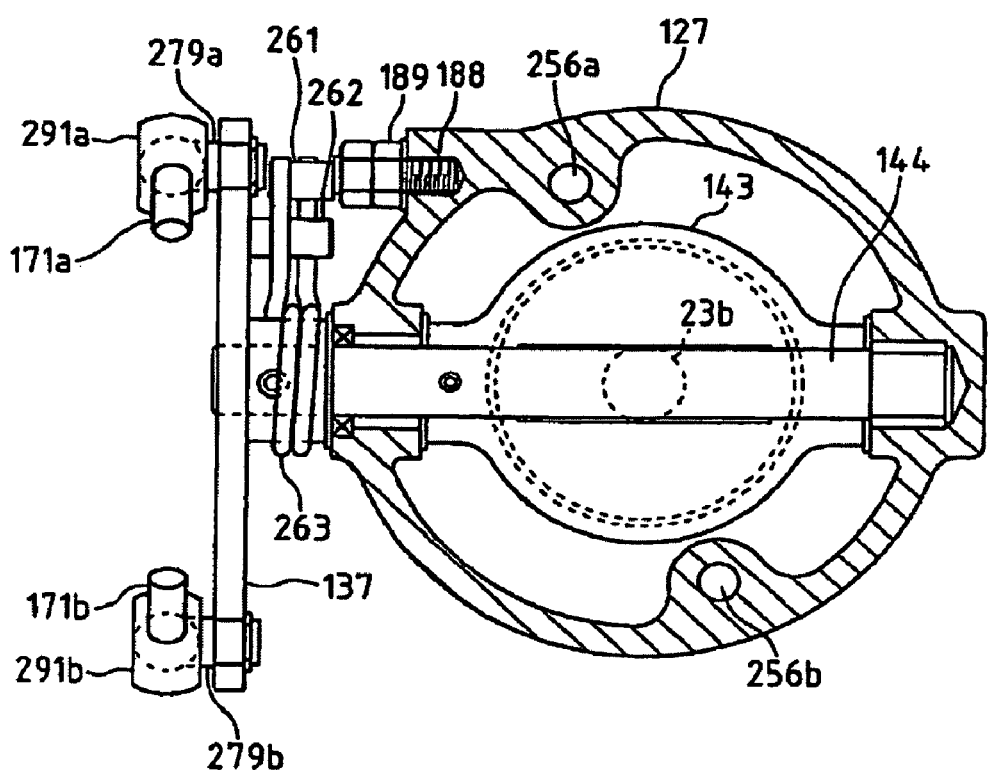
FIG. 41 is a cross sectional view taken along an A-A line of FIG. 38.

Furthermore, as shown in FIG. 41, hydraulic motors 23R and 23L include movable swash plate 143, and are provided with a torque spring 263 as biasing means to keep an initial tilt angle of movable swash plates 143. One travel wheel is interlockingly connected to movable swash plate 143 via a link so that movable swash plate 143 decrease its tilt angle against the bias force of torque spring 263 as the left or right turning angle of the one wheel increases.

Both end portions of torque spring 263 cross each other, extend in the same direction, and engage with a movable pin 262 inserted into a hole provided in control arm 137, and with a fixed pin 261 fixed to motor housing 127 with a bolt 188 and a nut 189. Therefore, when control arm 137 is turned to a certain direction, torque spring 263 works as biasing means to push control arm 137 back to its initial position. The certain turning direction of control arm 137 is determined such as to decrease the tilt angle of movable swash plate 143, or decrease the motor displacements.

Furthermore, the position of fixed pin 261 is changeable so as to adjust the initial tilt angle of movable swash plate 143 via torque spring 263.

Therefore, movable swash plate 143 is held at the preset initial angle unless steering operation is performed.

Interlocking mechanism 270 for turning movable swash plate 143 will be described.

Figure 42:
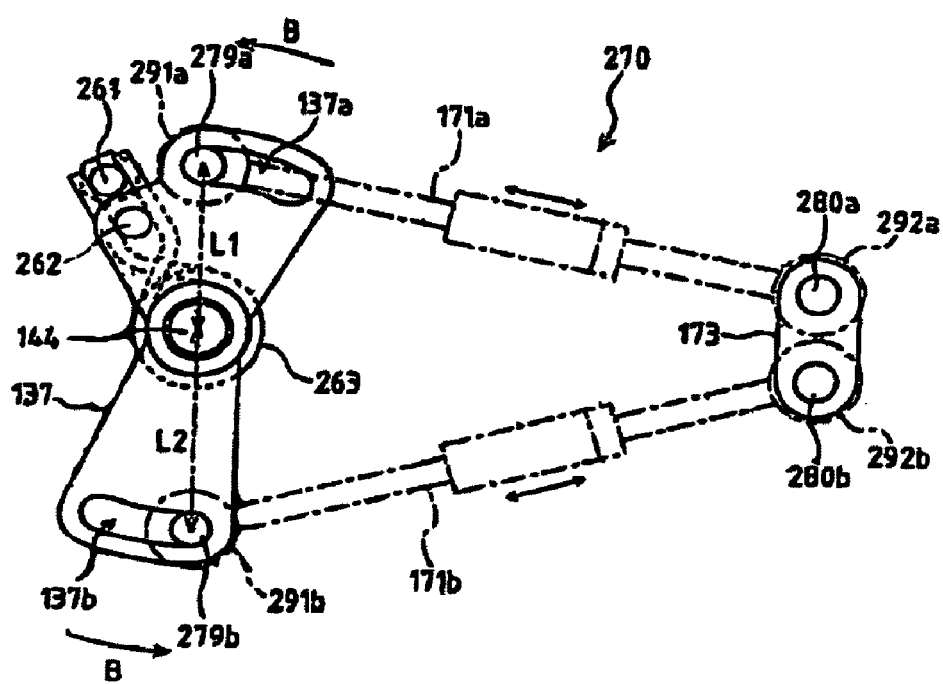
FIG. 42 is a rear view of an interlocking mechanism.

As shown in FIGS. 38, 41 and 42, interlocking mechanism 270 comprises propeller-shaped control arm 137, a stay 175, a bracket 173 and two rods 171a and 171b. Stay 175 is fixedly provided on rod 109b of actuator 109 interlocked with the steering operation device. Bracket 173 is connected to stay 175. Rods 171a and 171b are spanned between control arm 137 and bracket 173.

Control shaft 144 is fixedly inserted into a center portion of control arm 137 and is interlocked with movable swash plate 143. Therefore, the angle of movable swash plate 143 is changed as control arm 137 turns. Furthermore, arcuate slots 137a and 137b are formed in upper and lower portions of control arm 137, respectively. Pins 279a and 279b are provided on respective brackets 291a and 291b at the ends of rods 171a and 171b, and slidably inserted through slots 137a and 137b.

On the other hand, pins 280a and 280b are provided on respective brackets 292a and 292b at the other ends of rods 171a and 171b, and are pivotally supported by bracket 173 fixed on stay 175.

Furthermore, slots 137a and 137b provided in control arm 137 are arranged at different distances L1 and L2 from the center axis of control shaft 144 that serves as the turning axis of control arm 137. In this embodiment, distance L2 from the turning axis of control arm 137 to lower slot 137b is set longer than distance L1 from the turning axis of control arm 137 to upper slot 137a.

When movable swash plate 143 is disposed at the initial angle (in the state of straight travelling without steering operation), pin 279a of upper rod 171a is disposed at the farthest position (leftward in FIG. 38) in slot 137a, and pin 279b of lower rod 171b is disposed at the nearest position (rightward in FIG. 38) in slot 137b.

Description will now be given of how interlocking mechanism 270 works when rod 109b of hydraulic actuator 109 is expanded or contracted by steering operation. When rod 109b is expanded, bracket 173 fixed on stay 175 is pulled in the expanding direction of rod 109b, and rods 171a and 171b move rightward together. Upper pin 279a slides in slot 137a, and lower pin 279b turns control arm 137 engaging therewith in an arrowed direction B.

On the other hand, when rod 109b is contracted, bracket 173 fixed on stay 175 is moved in the contracting direction of rod 109b, and rods 171a and 171b move leftward together. Upper pin 279a turns control arm 137 engaging therewith in the direction B, and lower pin 279b slides in slot 137b.

As a result, control arm 137 is turned in the same direction whether hydraulic actuator 109 is expanded or contracted by steering operation.

The turning of control arm 137 changes the angle of movable swash plate 143 to simultaneously decelerate or accelerate both motor shafts 23b and 23b.

Furthermore, due to the different distances of slots 137a and 137b in control arm 137 from the turning axis, the changing rates of the turning angle of control arm 137 are set different between the case where hydraulic actuator 109 is expanded and the case where hydraulic actuator 109 is contracted.

The reason is that the Ackerman-Jeanteau steering system is employed for steering the left and right travel wheels attached to wheel support units 30L and 30R of the present transaxle. According to the system, even though the left or right one side turning angle of the steering wheel is the same as the other side turning angle thereof, the steered angle of each travel wheel differs depending upon whether the wheel travels on the inner turning circle or the outer turning circle during turning of the vehicle.

Therefore, according to the present invention, the link ratios are differentiated between the case where hydraulic actuator 109 is expanded and the case where hydraulic actuator 109 is contracted. Namely, depending upon whether one of the wheels is turned rightward or leftward, the link ratio is changed so as to equalize the total displacement change of the hydraulic motors. As a result, equal speed controlling can be achieved between the right and left turning cases.

In the illustrative example, hydraulic actuator 109 for steering operation is connected to right wheel support unit 30R. When the vehicle turns left, hydraulic actuator 109 is expanded to turn the right wheel leftward to any angle. According to the angle change of the right wheel, the left wheel is turned leftward to any angle that is larger than the angle of the right wheel.

On the contrary, when the vehicle turns right, hydraulic actuator 109 is contracted to turn the right wheel rightward to any angle. Here, in order to equalize the turning angle of this case to that of the above left turning case, the contraction stroke of hydraulic actuator 109 in the right turning case must be larger than the expansion stroke of hydraulic actuator 109 in the left turning case.

Control arm 137 compensates the difference between the expansion stroke of hydraulic actuator 109 in the left turning case and the contraction stroke of hydraulic actuator 109 in the right turning case, thereby equalizing change of the angle of movable swash plate 143 for equalizing change of the total displacement of the hydraulic motors whether the vehicle turns left or right.

Alternatively, in vehicles which does not employ the Ackerman-Jeanteau steering system, control arm 137 may be configured to equal the link ratio.

As mentioned above, interlocking mechanism 270 has a simple structure for changing turning angles of the travel wheels in association with steering operation, and can equally change the tilt angle of movable swash plate 143 for equally changing the displacements of hydraulic motors 23L and 23R whether the vehicle turns left or right. Therefore, even better turning performance will be provided for the vehicles equipped with transaxle 1 for driving its front wheels, wherein the front wheels are accelerated in response to the left and right turning angles of the wheels.

According to the present embodiment, in order to change the tilt angle of movable swash plate 143, interlocking mechanism 270 is linked to power steering hydraulic actuator 109. Alternatively, interlocking mechanism 270 may be interlockingly connected to a tie rod, a kingpin, or the like. Furthermore, alternatively, the tilt angle of movable swash plate 143 may be electrically controlled without mechanical interlocking mechanism 270 of the present embodiment.

Description will be given of a vehicle 200 equipped at its front portion with transaxle 1 according to the present embodiment.

Figure 46:
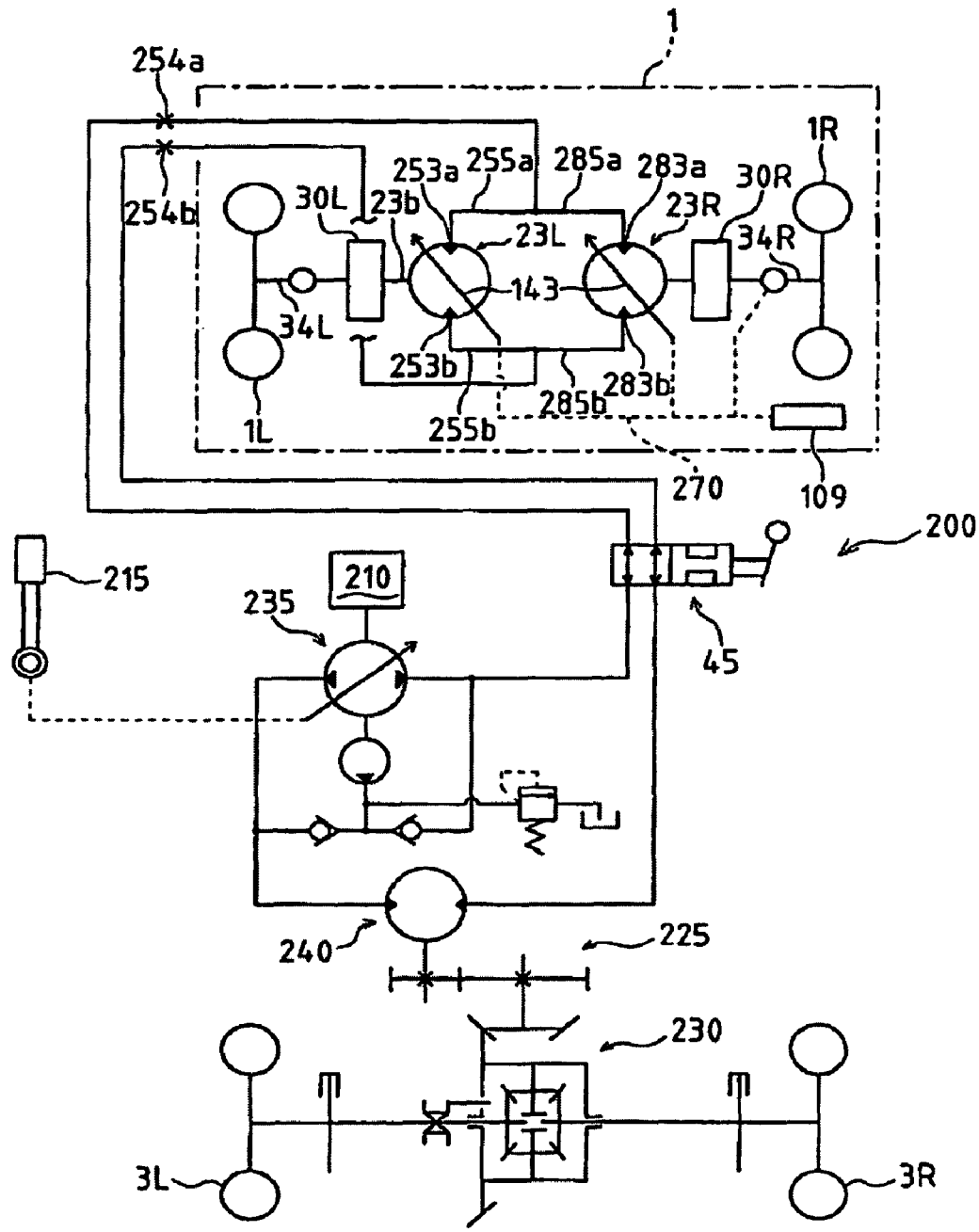
FIG. 46 is a hydraulic circuit diagram of a drive system of a vehicle having the transaxle according to the eleventh embodiment.

As shown in FIG. 46, vehicle 200 is equipped with transaxle 1 according to the present invention on the front wheel 1L and 1R side, and with a variable displacement hydraulic pump 235 and a fixed displacement hydraulic motor 240.

Hydraulic pump 235 receives power from a prime mover 210 and drives hydraulic motor 240. The driving power of hydraulic motor 240 is transmitted via a reduction gear train and a differential gear 230 to the rear axles, thereby driving rear wheels 3L and 3R.

The displacement of variable displacement hydraulic pump 235 can be controlled by operation of a shift lever 215 connected to a movable swash plate of pump 235.

Hydraulic pump 235 and hydraulic motor 240 are hydraulically connected via control valve 45 to pipe ports 254a and 254b that serve as supply/discharge ports of transaxle 1. By control valve 45 as a changeover switch, the driving state of vehicle 200 can be changed between a four-wheel drive mode, where hydraulic oil is supplied to all hydraulic motor 240 for driving the rear wheels and hydraulic motors 23L and 23R in transaxle 1, and a two(rear)-wheel drive mode, where hydraulic oil is supplied not to transaxle 1, but to hydraulic motor 240 for the rear wheels.

When vehicle 200 travels in the four-wheel drive mode, hydraulic oil is supplied into transaxle 1 via pipe port 254a or 254b so as to drive the pair of hydraulic motors 23L and 23R, which are hydraulically connected in parallel to each other via kidney ports 253a and 283a.

More precisely, hydraulic oil supplied from pipe port 254a is passed through oil passages 252a and 255a to drive left hydraulic motor 23L, and simultaneously, it is passed through oil passages 256a and 285a to drive right hydraulic motor 23R. Hydraulic oil after driving hydraulic motor 23R is passed through oil passages 252b and 255b and through oil passages 256b and 285b, and discharged from pipe port 254b.

Driving forces of hydraulic motors 23L and 23R are transmitted to motor shafts 23b and 23b, and to axles 34L and 34R, thereby driving front wheels 1L and 1R, respectively.

The flow of hydraulic oil will be described more in detail. During forward travel of the vehicle, oil delivered from hydraulic pump 235 flows into hydraulic motors 23L and 23R in transaxle 1, after driving hydraulic motor 240 for driving the rear wheels. Therefore, grounding rear wheels 3L and 3R are surely driven, even if the vehicle starts suddenly and front wheels 1L and 1R arise from the ground for a short time. Incidentally, during backward travel of the vehicle, hydraulic oil flows from hydraulic pump 235 to hydraulic motors 23L and 23R before it flows to hydraulic motor 240.

Common movable swash plate 143 for controlling hydraulic motors 23L and 23R is interlockingly connected with power steering hydraulic actuator 109. As movable swash plate 143 is turned by expansion or contraction of hydraulic actuator 109, both hydraulic motors 23L and 23R are equally changed in displacement.

Namely, as one hydraulic motor 23L (23R) increases its displacement, the other hydraulic motor 23R (23L) increases its displacement by the same amount. Likewise, as one hydraulic motor 23L (23R) decreases its displacement, the other hydraulic motor 23R (23L) decreases its displacement by the same amount.

In the above-described hydraulic circuit, if load on hydraulic motors 23L and 23R differs because of load on front wheels 1L and 1R during turning of the vehicle or in another case, the distributed flow rate between hydraulic motors 23L and 23R is changed so as to bring differential action of left and right front wheels 1L and 1R. Therefore, a mechanical differential gear is not required, so that transaxle 1 can be compacted, and easily have enough ground clearance therebelow.

Furthermore, the mechanism for turning movable swash plate 143 can be simplified because the pair of hydraulic motors 23L and 23R are controlled with common movable swash plate 143.

Still further, due to the above hydraulic circuit configuration, vehicle 200, when set in the four-wheel drive mode, can turn smoothly on the ground while preventing the wheels from scratching turf or ground surface because the front wheels are accelerated so as to travel smoothly at set steered angles. Further, the vehicle is provided below a belly portion thereof with no drive shaft for mechanically driving front wheels 1L and 1R, but with flexible hydraulic piping, thereby ensuring a sufficient space facilitating for attachment and maintenance of a mid-mount mower below the belly portion of the vehicle. Furthermore, since no drive shaft exists, a footplate can be lowered for operators to easily get on and off the vehicle.

Furthermore, the hydraulic circuits in hydraulic motors 23L and 23R can absorb the peak torque occurring when an axle is overloaded, thereby making the effect of a torque limiter.

Embodiments 12-14

Description will now be given of transaxle 1 according to Embodiments 12-14, which shall be described with reference to FIGS. 16 and 17 and FIGS. 47-50. Embodiments 12-14 shown in FIGS. 47-50 are alternative embodiments to Embodiment 7, providing modifications to the axle driving unit 120 described above with reference to FIGS. 16 and 17. As described in detail above with reference to FIGS. 16 and 17, movable swash plates 43R,43L of hydraulic motors 23L, 23R are engaged with control arms 147R,147L, which are engaged by control shafts 144R,144L. Control shafts 144R, 144L are rotated colmterclockwise via control arms 145R, 145L, respectively, to change the tilt angles of movable swash plates 43R,43L, thereby changing rotation speed of each motor shaft 23b for accelerating or decelerating the travel wheels. FIGS. 16, 17 and 47-50 show a maximum tilt angle of movable swash plate 43R and 43L, from which the tilt angle of swash plates 43L,43R may be decreased for decreasing the displacement of the corresponding motor, such as during turning of the vehicle. The detailed description of hydraulic motors 23R,23L provided above with reference to FIGS. 16 and 17 is incorporated herein by reference, with a detailed description of the modifications thereto being described below. While FIGS. 47-50 show only hydraulic motor 23R of transaxle 1, it should be understood that hydraulic motor 23L is similarly structured, and description of motor 23L is thus omitted.

Figure 47:
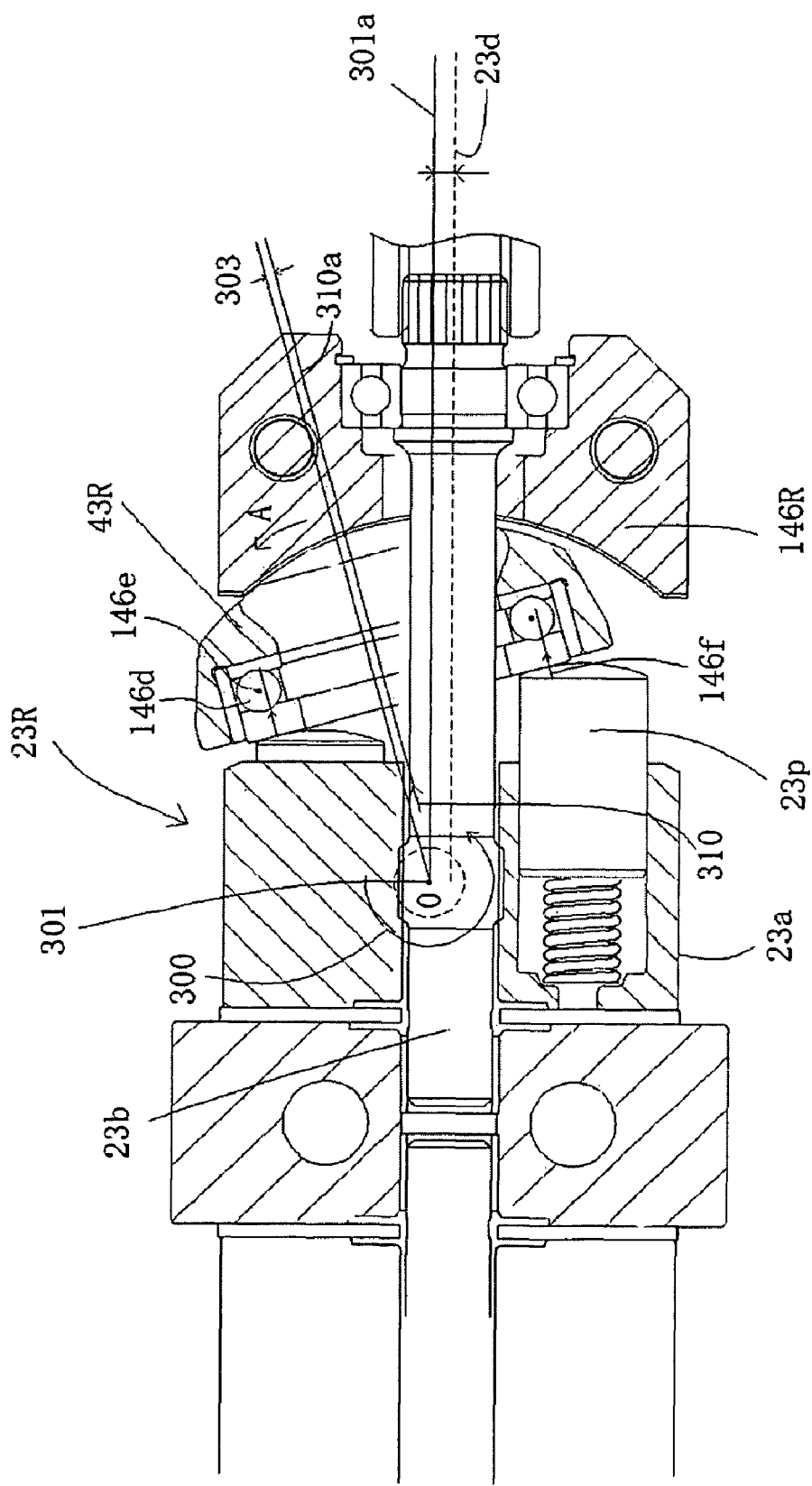
FIG. 47 is an enlarged fragmentary sectional rear view of a transaxle according to a twelfth embodiment.

FIG. 47 shows hydraulic motor 23R of transaxle 1 according to Embodiment 12. Hydraulic motor 23R is an axial piston-type variable displacement hydraulic motor, having a cylinder block 23a, which is non-relatively rotatably fitted on motor shaft 23b as the output shaft, and reciprocally provided therein with pistons 23p, whose strokes are adjusted by movable swash plate 43R. A piston push force 146f of each piston 23p acts on a respective ball 146d of thrust bearings of swash plate 43R.

Swash plate 43R has an axis of tilt, or pivot axis, 301 about which swash plate 43R pivots. Pivot axis 301 is orthogonal to a longitudinal axis 23d of motor shaft 23b, and is identified as axis 0 in the embodiment of FIG. 47. Axis 0 is offset with respect to longitudinal axis 23d of motor shaft 23b by a decentering length 301a. As a result, each piston push force 146f is provided below a center 146e of each respective ball 146d of the thrust bearings, and a resultant force 310 of pistons 23p is offset below axis 0. This offset is best illustrated in FIG. 47 as a length 303 between a line of action 310a of resultant force 310 and a parallel line extending from axis 0. Consequently, because piston push force 146f is provided below the center 146e of ball 146d, swash plate 43R is maintained toward its maximum tilt angle side in the direction of arrow A. Further, a moment force 300 about axis 0 is provided in the counterclockwise direction, which may decrease the amount of force required to tilt the angle of moveable swash plate 43R to change the displacement of motor 23R. As such, the operational force for operating a steering operation device (e.g. steering wheel) during turning of the vehicle may be decreased by counterclockwise moment force 300.

Figure 51:
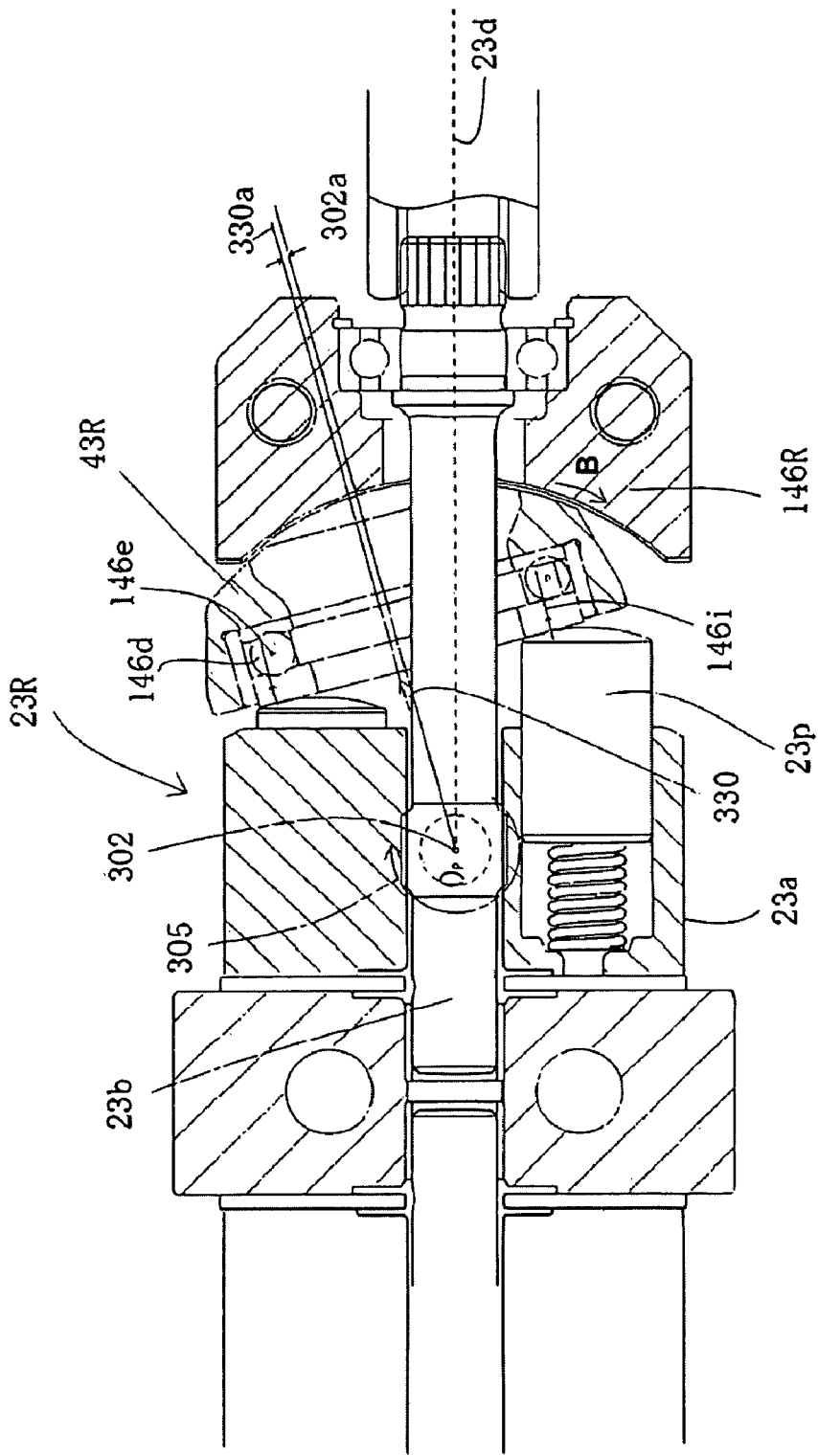
FIG. 51 is an enlarged fragmentary sectional rear view of a conventional transaxle.

In contrast to the embodiment of FIG. 47, a conventional configuration of motor 23R is shown in FIG. 51. In this conventional configuration, a swash plate pivot axis 302 is axis 0,p, which intersects axis longitudinal axis 23d of motor shaft 23b rather than being offset with respect to it. As a result, a push force 146i of each piston 23p is provided above a center 146e of respective ball 146d of the thrust bearings, and a resultant force 330 of pistons 23p is offset above axis 0,p. This offset is by a length 302a between a line of action 330a of resultant force 330 and a parallel line extending from axis 0,p. Consequently, a moment force 305 about the axis 0,p is provided in the clockwise direction, since push force 146i of each piston 23p will tend to torque swash plate 43R to its minimum tilt angle side in the direction of arrow B. As a result, the operational force for operation of the steering wheel for turning the vehicle is increased, as an increasing torque must be applied to increase the tilt angle of swash plate 43R from its minimum tilt angle side.

Figure 48:
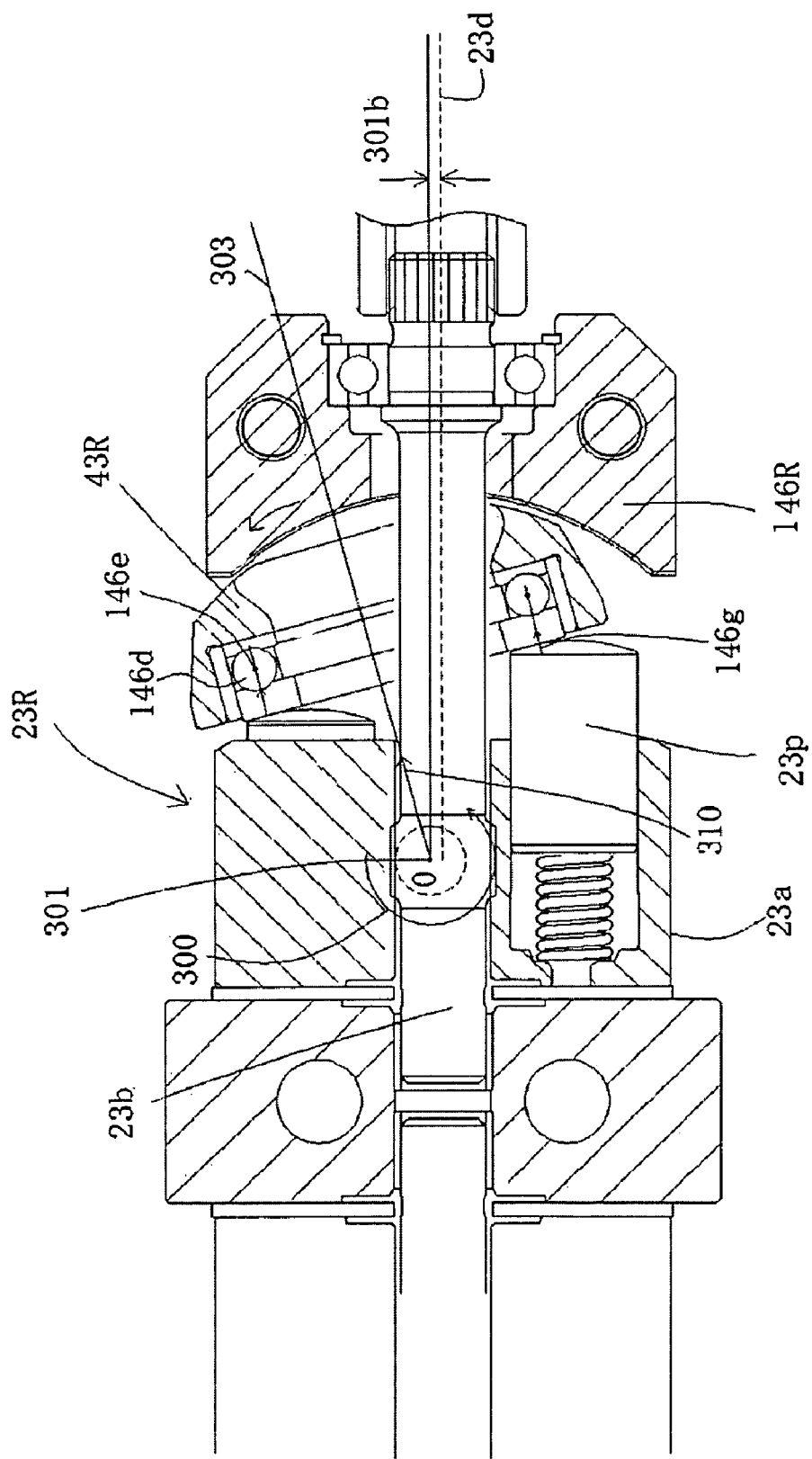
FIG. 48 is an enlarged fragmentary sectional rear view of a transaxle according to a thirteenth embodiment.

FIG. 48 shows hydraulic motor 23R of transaxle 1 according to Embodiment 13. Embodiment 13 is the same as Embodiment 12, but for pivot axis 301 (axis 0) being offset from longitudinal axis 23d of motor shaft 23b by a lesser magnitude. Specifically, axis 0 is offset with respect to longitudinal axis 23d of motor shaft 23b by a decentering length 301b, which is less then decentering length 301a of FIG. 47. As a consequence of the lesser magnitude of the offset of axis 0, each piston push force 146g is provided at center 146e of each respective ball 146d of the thrust bearings, whereby the thrust bearings may be more durable than in the embodiment of FIG. 47. Counterclockwise moment force 300 occurs about axis 0, and in contrast with embodiment of FIG. 47, resultant force 310 of pistons 23*p* has a line of action 303 that goes through axis 0.

Thus, in the embodiments of FIGS. 47 and 48, pivot axis 301 (axis 0) is offset from conventional pivot axis 302 (axis 0,p of FIG. 51) so that moment force 300 about axis 0 is in the counterclockwise direction. Resultant push forces 146*f* (FIG. 47) and 146*g* (FIG. 48) maintain swash plate 43R to its maximum tilt angle side, reducing the torque required to tilt swash plate 43R from this position and thus decreasing the operational force for operation of the steering wheel.

Figure 49:
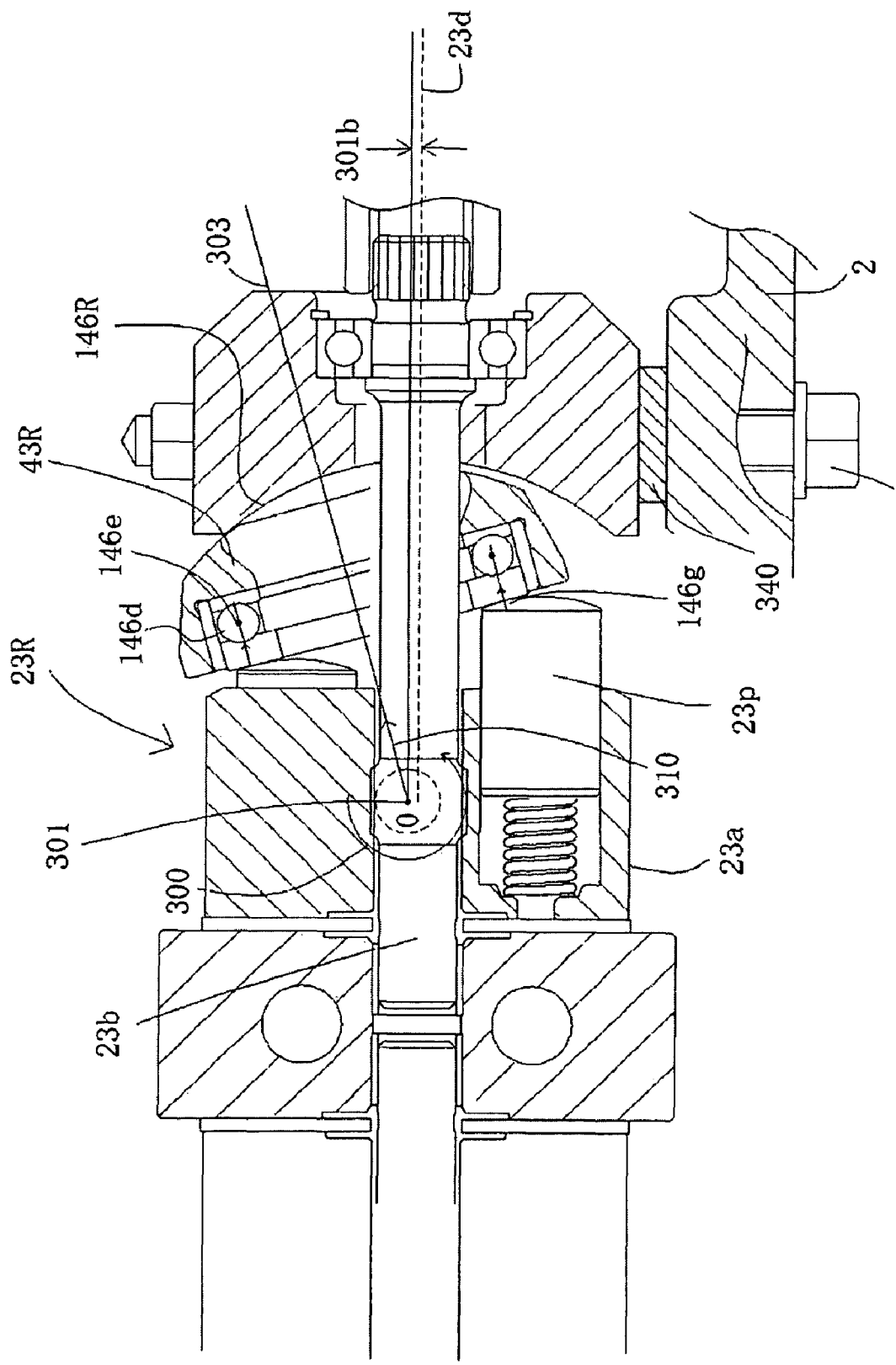
FIG. 49 is an enlarged fragmentary sectional rear view of a transaxle according to a fourteenth embodiment.
Figure 50:
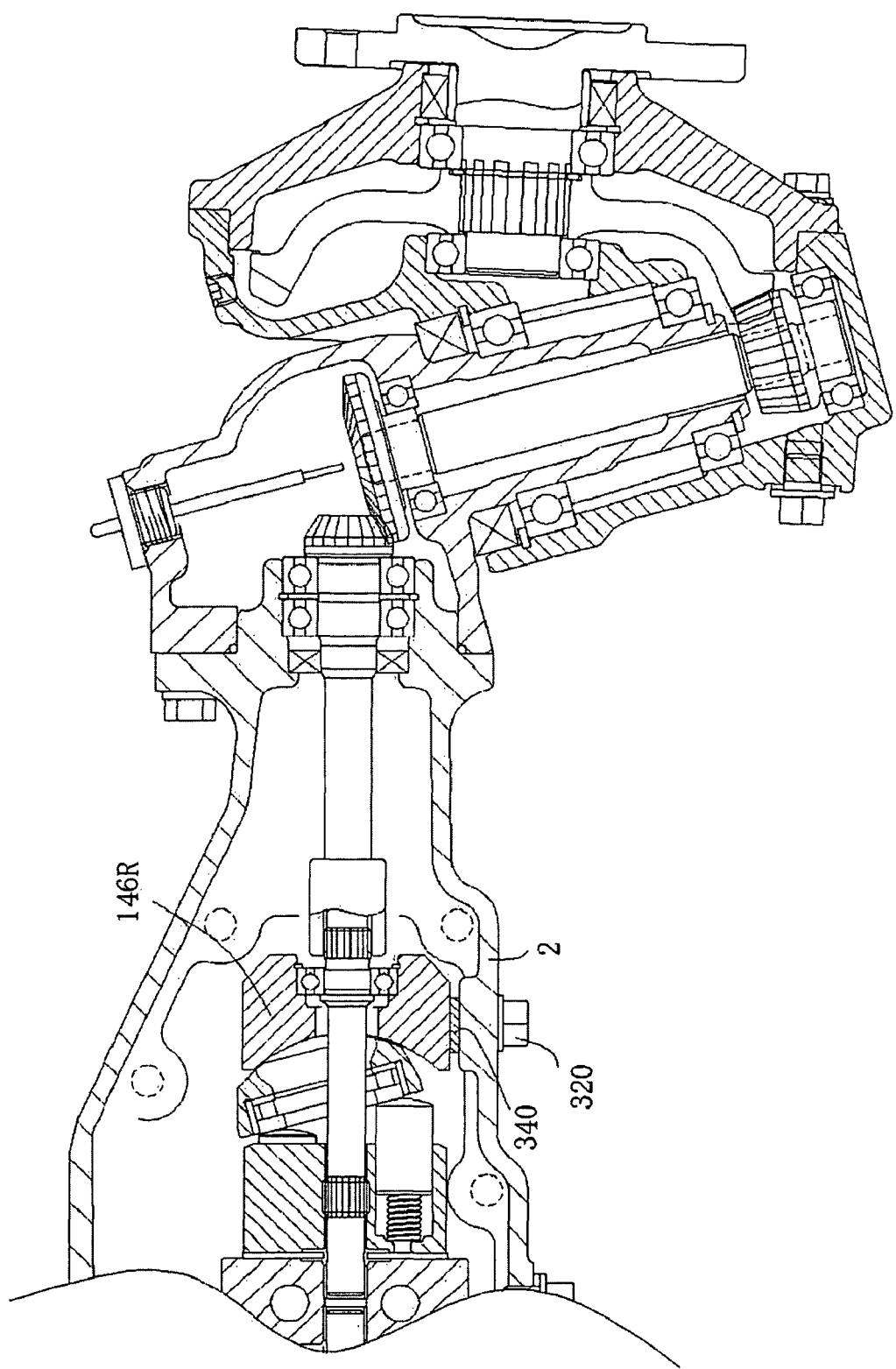
FIG. 50 is a fragmentary sectional rear view of the transaxle of FIG. 49.

FIGS. 49 and 50 show a part of transaxle 1 according to Embodiment 14. In this embodiment, an adjustment member 340 is disposed between axle casing 2 and swash plate support 146R, and is secured thereto by fastener member 320, such as a bolt. Since swash plate 43R and pivot axis 301 move together with swash plate support 146R, adjustment member 340 serves to shift pivot axis 301 (axis 0) of movable swash plate 43R from conventional pivot axis 302 (axis 0,p of FIG. 51) to offset pivot axis 301 from longitudinal axis 23*d* of motor shaft 23*b*. A thickness of adjustment member 340 correlates with a magnitude of the offset of the pivot axis. In the embodiment shown, axis 0 is offset with respect to longitudinal axis 23*d* of motor shaft 23*b* by decentering length 301*b*. Thus, the offset of pivot axis 301 is the same magnitude as the offset of the pivot axis shown in Embodiment 13 of FIG. 48, so that each piston push force 146*g* is provided at center 146*e* of respective ball 146*d* of the thrust bearings. In other embodiments (not shown), the thickness of adjustment member 340 may be varied so as to achieve any desired offset of pivot axis 301 from longitudinal axis 23*d* of motor shaft 23*b*. For example, adjustment member 340 may have a thickness to achieve the offset of pivot axis 301 shown in the embodiment of FIG. 47.

Although the present invention has been described in its preferred embodiments, it will be apparent to those skilled in the art that numerous variations and modifications may be made, without departing from the spirit and the scope of the invention.

INDUSTRIAL APPLICABILITY

As described above, the transaxle according to the present invention is applicable for various industrial vehicles such as agricultural tractors, riding mowers, construction vehicles, facilitating assembly in manufacturing processes and providing smooth feeling in turning of the vehicles.

What is claimed is:

1. A hydraulic transaxle comprising:
    an axle casing; and
    a pair of hydraulic motors disposed in the axle casing and having respective motor shafts and respective moveable swash plates, wherein the pair of moveable swash plates are operatively engaged to a steering operation device, and
    wherein each moveable swash plate pivots about a pivot axis that is offset with respect to a longitudinal axis of its respective motor shaft.

2. A hydraulic transaxle according to claim 1, wherein each moveable swash plate is operatively connected to a respective control shaft, and wherein a tilt angle of each moveable swash plate is changed by counterclockwise rotation of its respective control shaft.

3. A hydraulic transaxle according to claim 2, wherein each hydraulic motor includes a plurality of pistons that strike against its respective swash plate, and wherein the pivot axis of each moveable swash plate is offset with respect to the longitudinal axis of its respective motor shaft so that a resultant force of the pistons striking against the swash plate provides a counterclockwise moment force about the pivot axis.

4. A hydraulic transaxle according to claim 3, wherein the operational force for operation of the steering operation device is decreased by the counterclockwise moment force about the pivot axis of each moveable swash plate.

5. A hydraulic transaxle according to claim 1, wherein each hydraulic motor includes a plurality of pistons that strike against its respective swash plate, and wherein the pivot axis of each moveable swash plate is offset with respect to the longitudinal axis of its respective motor shaft so that a resultant force of the pistons striking against the swash plate maintains the respective swash plate at a maximum tilt angle.

6. A hydraulic transaxle according to claim 1, wherein each hydraulic motor includes a plurality of pistons that each strike against balls of thrust bearings of the respective swash plate, wherein a push force of each piston is provided below a center of each ball of the thrust bearings.

7. A hydraulic transaxle according to claim 1, wherein each hydraulic motor includes a plurality of pistons that each strike against balls of thrust bearings of the respective swash plate, wherein a push force of each piston is provided at a center of each ball of the thrust bearings.

8. A hydraulic transaxle according to claim 1, further comprising:
    a pair of swash plate supports each supporting a moveable swash plate of one of the pair of hydraulic motors; and
    an adjustment member, wherein the adjustment member is disposed between the axle casing and one of the swash plate supports, wherein the adjustment member positions the respective swash plate support so that the pivot axis of the respective swash plate is offset with respect to the longitudinal axis of its respective motor shaft.

9. A hydraulic transaxle according to claim 8, wherein a fastening member secures the adjustment member to the axle casing and to the respective swash plate support.

10. A hydraulic transaxle according to claim 8, wherein a thickness of the adjustment member corresponds with a magnitude of the offset of the pivot axis of the respective swash plate with respect to the longitudinal axis of its respective motor shaft.

* * * * *